( 12 ) United States Patent
Guo et al.

(10) Patent No.: US 12,114,264 B2
(45) Date of Patent: Oct. 8, 2024

(54) SYSTEM AND METHOD FOR DOWNLINK CONTROL SIGNALING

(71) Applicant: ZTE CORPORATION, Guangdong (CN)

(72) Inventors: Qiujin Guo, Shenzhen (CN); Xiaoying Ma, Shenzhen (CN); Mengzhu Chen, Shenzhen (CN); Jun Xu, Shenzhen (CN)

(73) Assignee: ZTE Corporation, Shenzhen (CN)

(*) Notice: Subject to any disclaimer, the term of this patent is extended or adjusted under 35 U.S.C. 154(b) by 414 days.

(21) Appl. No.: 17/511,154

(22) Filed: Oct. 26, 2021

(65) Prior Publication Data

US 2022/0240187 A1 Jul. 28, 2022

Related U.S. Application Data

(63) Continuation of application No. PCT/CN2019/085312, filed on Apr. 30, 2019.

(51) Int. Cl.
H04W 72/044 (2023.01)
H04W 52/02 (2009.01)
H04W 72/23 (2023.01)
H04W 76/30 (2018.01)

(52) U.S. Cl.
CPC ..... *H04W 52/0232* (2013.01); *H04W 72/044* (2013.01); *H04W 72/23* (2023.01); *H04W 76/30* (2018.02)

(58) Field of Classification Search
CPC ........... H04W 52/0232; H04W 72/044; H04W 72/23; H04W 76/30; H04W 52/0235; H04W 52/0229; H04W 52/0212; H04L 5/0053; Y02D 30/70
See application file for complete search history.

(56) References Cited

U.S. PATENT DOCUMENTS

| 8,576,758 | B2* | 11/2013 | He ................ H04W 52/0235 340/7.32 |
| 9,113,469 | B2* | 8/2015 | Choi .................... H04W 72/51 |
| 10,271,321 | B1 | 4/2019 | Patel et al. |
| 2018/0249413 | A1* | 8/2018 | Sun .................. H04W 52/0229 |
| 2019/0097756 | A1 | 3/2019 | Chatterjee et al. |

(Continued)

FOREIGN PATENT DOCUMENTS

| CN | 104684050 A | 6/2015 |
| CN | 105493433 A | 4/2016 |

(Continued)

OTHER PUBLICATIONS

Intel Corporation, "On PDCCH-based power saving signal" 3GPP TSG-RAN WG1 #96bis, R1-1904317, Apr. 12, 2019, Xi'an, China (8 pages).

(Continued)

*Primary Examiner* — Julio R Perez
(74) *Attorney, Agent, or Firm* — Foley & Lardner LLP

(57) ABSTRACT

A system and method for providing control signaling are disclosed herein. In one embodiment, the system and method are configured to generate a control signal and transmit the control signal from a wireless network device to N wireless user devices. The control signal includes one of: a first type of control signal and a second type of control signal. The N is an integer that is at least 1.

14 Claims, 6 Drawing Sheets

(56) References Cited

U.S. PATENT DOCUMENTS

| | | | |
|---|---|---|---|
| 2022/0240187 A1* | 7/2022 | Guo | H04L 5/0053 |
| 2023/0096178 A1* | 3/2023 | Wu | H04L 5/005 |
| | | | 370/329 |
| 2023/0171699 A1* | 6/2023 | Huang | H04W 76/40 |
| | | | 370/311 |
| 2023/0209682 A1* | 6/2023 | Kumar | H05B 47/185 |
| | | | 315/291 |

FOREIGN PATENT DOCUMENTS

| | | | | |
|---|---|---|---|---|
| CN | 109246723 A | 1/2019 | | |
| CN | 109496457 A | 3/2019 | | |
| WO | WO-2018082173 A1 * | 5/2018 | | H04L 5/0053 |
| WO | WO-2020019756 A1 * | 1/2020 | | H04L 5/0053 |

OTHER PUBLICATIONS

Partial Supplementary European Search Report for EP Appl. No. 19927272.5, dated Nov. 4, 2022 (15 pages).

VIVO, "PDCCH-based power saving signal/channel design" 3GPP TSG RAN WG1 #96bis, R1-1904103, Apr. 12, 2019, Xi'an, China (7 pages).

International Search Report and Written Opinion for PCT Appl. No. PCT/CN2019/085312, mailed Feb. 5, 2020 (6 pages).

Zte et al.: "PDCCH procedure and DCI carried by PDSCH region" 3GPP TSG RAN WG1 Meeting #88; R1-1701588; Feb. 17, 2017; Athens, Greece (4 pages).

First Office Action for CN Appl. No. 201980095903.3, dated Mar. 2, 2023 (with English translation, 15 pages).

Z. Qin et al., "Improvement and Implementation of DRX in TD-LTE System", Key Laboratory of Mobile Communication Technology, Chongqing University of Posts and Telecommunication, Jun. 20, 2013, Chongqing, China (5 pages).

* cited by examiner

SYSTEM AND METHOD FOR DOWNLINK CONTROL SIGNALING

CROSS-REFERENCE TO RELATED APPLICATION

This application claims the benefit of priority under 35 U.S.C. § 120 as a continuation of PCT Patent Application No. PCT/CN2019/085312, filed on Apr. 30, 2019, the disclosure of which is incorporated herein by reference in its entirety.

TECHNICAL FIELD

The disclosure relates generally to wireless communications and, more particularly, to systems and methods for downlink control signaling.

BACKGROUND

The power consumption of a user equipment is an important factor which affects the user experiences. In wireless communication system, user equipment can perform power saving operation using a connected Mode Discontinuous Reception (C-DRX) technique. The C-DRX allows a user equipment to discontinuously receive data in connected state. User equipment can have larger power consumption when communication on the user equipment is associated with unnecessary PDCCH monitoring or unsuitable large BWP, etc. In RAN1 #96bis meeting of 3GPP, a PDCCH-based power saving signal/channel is proposed to trigger user equipment to perform power saving behavior. The PDCCH-based power saving signal/channel is a downlink control signaling or a downlink control signal carrying downlink control information (DCI). Some fields of the DCI can be used by the user equipment to reduce power consumption.

SUMMARY

The example embodiments disclosed herein are directed to solving the issues relating to one or more of the problems presented in the prior art, as well as providing additional features that will become readily apparent by reference to the following detailed description when taken in conjunction with the accompany drawings. In accordance with various embodiments, example systems, methods, devices and computer program products are disclosed herein. It is understood, however, that these embodiments are presented by way of example and are not limiting, and it will be apparent to those of ordinary skill in the art who read the present disclosure that various modifications to the disclosed embodiments can be made while remaining within the scope of this disclosure.

In one embodiment, a method performed by a wireless network device includes generating a control signal and transmitting the control signal to N wireless user devices. The control signal includes one of: a first type of control signal and a second type of control signal. The N is an integer that is at least 1.

In another embodiment, a method performed by N wireless user devices includes receiving a control signal from a wireless network device. The control signal includes one of: a first type of control signal and a second type of control signal. The N is an integer that is at least 1.

In yet another embodiment, an apparatus includes a processor configured to implement a method. The method includes generating a control signal and transmitting the control signal to N wireless user devices. The control signal includes one of: a first type of control signal and a second type of control signal. The N is an integer that is at least 1.

In yet another embodiment, a computer readable medium having code stored thereon to perform a method. The method includes generating a control signal and transmitting the control signal to N wireless user devices. The control signal includes one of: a first type of control signal and a second type of control signal. The N is an integer that is at least 1.

The above and other aspects and their implementations are described in greater detail in the drawings, the descriptions, and the claims.

BRIEF DESCRIPTION OF THE DRAWINGS

Various example embodiments of the present solution are described in detail below with reference to the following figures or drawings. The drawings are provided for purposes of illustration only and merely depict example embodiments of the present solution to facilitate the reader's understanding of the present solution. Therefore, the drawings should not be considered limiting of the breadth, scope, or applicability of the present solution. It should be noted that for clarity and ease of illustration, these drawings are not necessarily drawn to scale.

DETAILED DESCRIPTION OF EXAMPLE EMBODIMENTS

Figure 1:
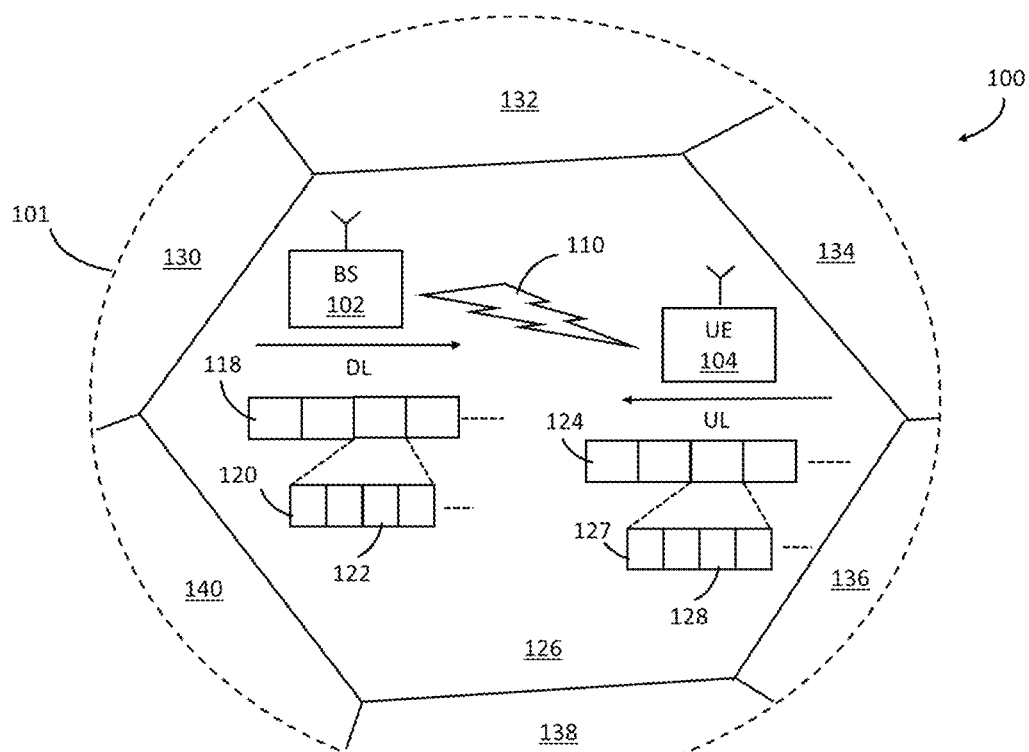
FIG. 1 illustrates an example cellular communication network in which techniques and other aspects disclosed herein may be implemented, in accordance with an embodiment of the present disclosure.

Various example embodiments of the present solution are described below with reference to the accompanying figures to enable a person of ordinary skill in the art to make and use the present solution. As would be apparent to those of ordinary skill in the art, after reading the present disclosure, various changes or modifications to the examples described herein can be made without departing from the scope of the present solution. Thus, the present solution is not limited to the example embodiments and applications described and illustrated herein. Additionally, the specific order or hierarchy of steps in the methods disclosed herein are merely example approaches. Based upon design preferences, the specific order or hierarchy of steps of the disclosed methods or processes can be re-arranged while remaining within the scope of the present solution. Thus, those of ordinary skill in the art will understand that the methods and techniques disclosed herein present various steps or acts in a sample order, and the present solution is not limited to the specific order or hierarchy presented unless expressly stated otherwise.

In the existing long-term evolution and 5G NR communication system, the UE performs power saving operation with C-DRX configuration configured by MAC layer. When DRX (Discontinuous Reception) is configured, the UE does not continuously monitor PDCCH (Physical Downlink Control Channel). Furthermore, for NR Rel-16, the current C-DRX technique is not satisfied with the requirement of UE power saving, e.g. a larger power consumption of unnecessary PDCCH monitoring and a larger power consumption caused by a unsuitable large BWP, etc. In RAN1 #96bis meeting of 3GPP, the PDCCH-based power saving signal/channel is proposed to trigger UE to perform power saving operation. The PDCCH-based power saving signal/channel is a downlink control signaling carrying DCI. Some fields of the DCI are used for UE to reduce power consumption. However, in NR Rel-15, there are no indicated fields related to power saving among all current DCI format 0_0/0_1/1_0/1_1 and DCI format 2_0/2_1/2_2/2_3.

It is advantageous to provide a new downlink control signal or modify an existing downlink control signal to trigger UE(s) to perform various power saving operations under certain conditions. The present disclosure provides systems and methods for downlink control signaling that has lower overhead and higher reliability for triggering UE to perform various power saving operations with slighting impact on current 5G specification.

In some implementations, the systems and methods for downlink control signaling uses one or more new DCI formats and. In some implementations, the size of a new DCI format may be the same size as an existing DCI format's size. In some implementations, the new DCI format may have a different size compared to the existing DCI. In some implementations, the systems and methods of the present disclosure provides downlink control signaling by enhancing an existing DCI with one or more additional new fields. In some implementations, the systems and methods of the present disclosure provides downlink control signaling by re-purposing one or more fields of an existing DCI. In some implementations, the downlink control signaling of the present disclosure may indicate one or more power saving associated operations and support configurability (e.g., 0, 1, 2, . . . X bits, etc.) in one or more information fields. In some implementations, potential DCI contents in the downlink control signaling of the present disclosure include wake-up or go to sleep content. These wake-up and go to sleep content is essential for various UE functions, such as: C-DRX, cross-slot scheduling, triggering RS transmission, CSI report indication, single vs. multi-cell operation, BWP/SCell, MIMO layer adaptation/number of Antenna adaptation, indication of CORESET/search space/candidate of subsequent PDCCH decoding, PDCCH monitoring periodicity, or PDCCH skipping.

FIG. 1 illustrates an example wireless communication network, and/or system, 100 in which techniques disclosed herein may be implemented, in accordance with an embodiment of the present disclosure. In the following discussion, the wireless communication network 100 may be any wireless network, such as a cellular network or a narrowband Internet of things (NB-IoT) network, and is herein referred to as "network 100." Such an example network 100 includes a base station 102 (hereinafter "BS 102") and a user equipment device 104 (hereinafter "UE 104") that can communicate with each other via a communication link 110 (e.g., a wireless communication channel), and a cluster of cells 126, 130, 132, 134, 136, 138 and 140 overlaying a geographical area 101. In FIG. 1, the BS 102 and UE 104 are contained within a respective geographic boundary of cell 126. Each of the other cells 130, 132, 134, 136, 138 and 140 may include at least one base station operating at its allocated bandwidth to provide adequate radio coverage to its intended users.

For example, the BS 102 may operate at an allocated channel transmission bandwidth to provide adequate coverage to the UE 104. The BS 102 and the UE 104 may communicate via a downlink radio frame 118, and an uplink radio frame 124 respectively. Each radio frame 118/124 may be further divided into sub-frames 120/127 which may include data symbols 122/128. In the present disclosure, the BS 102 and UE 104 are described herein as non-limiting examples of "communication nodes," generally, which can practice the methods disclosed herein. Such communication nodes may be capable of wireless and/or wired communications, in accordance with various embodiments of the present solution.

Figure 2:
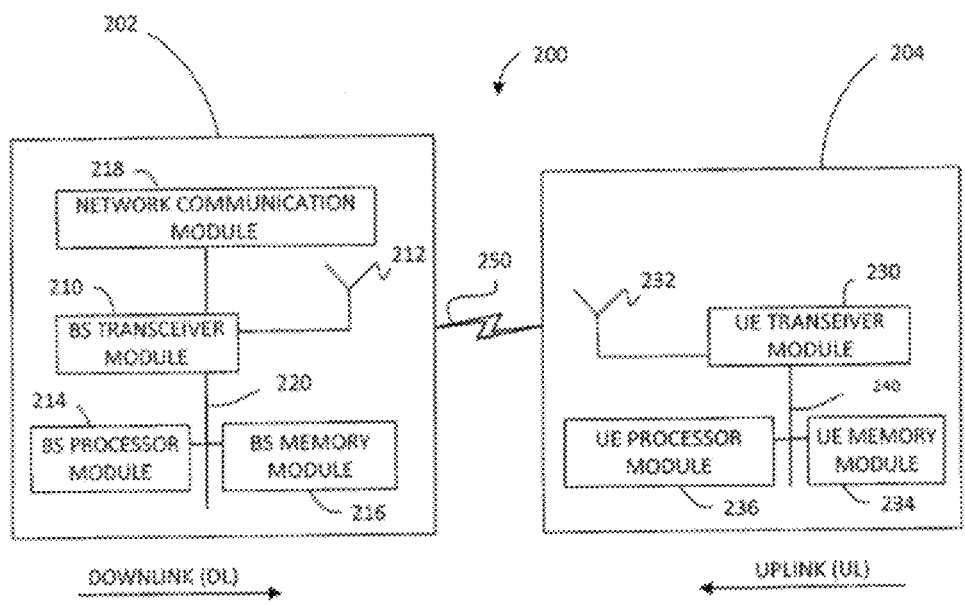
FIG. 2 illustrates block diagrams of an example base station and a user equipment device, in accordance with some embodiments of the present disclosure.

FIG. 2 illustrates a block diagram of an example wireless communication system 200 for transmitting and receiving wireless communication signals, e.g., OFDM/OFDMA signals, in accordance with some embodiments of the present solution. The system 200 may include components and elements configured to support known or conventional operating features that need not be described in detail herein. In one illustrative embodiment, system 200 can be used to communicate (e.g., transmit and receive) data symbols in a wireless communication environment such as the wireless communication environment 100 of FIG. 1, as described above.

System 200 generally includes a base station 202 (hereinafter "BS 202") and a user equipment device 204 (hereinafter "UE 204"). The BS 202 includes a BS (base station) transceiver module 210, a BS antenna 212, a BS processor module 214, a BS memory module 216, and a network communication module 218, each module being coupled and interconnected with one another as necessary via a data communication bus 220. The UE 204 includes a UE (user equipment) transceiver module 230, a UE antenna 232, a UE memory module 234, and a UE processor module 236, each module being coupled and interconnected with one another as necessary via a data communication bus 240. The BS 202 communicates with the UE 204 via a communication channel 250, which can be any wireless channel or other medium suitable for transmission of data as described herein.

As would be understood by persons of ordinary skill in the art, system 200 may further include any number of modules other than the modules shown in FIG. 2. Those skilled in the art will understand that the various illustrative blocks, modules, circuits, and processing logic described in connection with the embodiments disclosed herein may be implemented in hardware, computer-readable software, firmware, or any practical combination thereof. To clearly illustrate this interchangeability and compatibility of hardware, firmware, and software, various illustrative components, blocks, modules, circuits, and steps are described generally in terms of their functionality. Whether such functionality is implemented as hardware, firmware, or software can depend upon the particular application and design constraints imposed on the overall system. Those familiar with the concepts described herein may implement such functionality in a suitable manner for each particular application, but such implementation decisions should not be interpreted as limiting the scope of the present disclosure.

In accordance with some embodiments, the UE transceiver 230 may be referred to herein as an "uplink" transceiver 230 that includes a radio frequency (RF) transmitter and a RF receiver each comprising circuitry that is coupled to the antenna 232. A duplex switch (not shown) may alternatively couple the uplink transmitter or receiver to the uplink antenna in time duplex fashion. Similarly, in accordance with some embodiments, the BS transceiver 210 may be referred to herein as a "downlink" transceiver 210 that includes a RF transmitter and a RF receiver each comprising circuitry that is coupled to the antenna 212. A downlink duplex switch may alternatively couple the downlink transmitter or receiver to the downlink antenna 212 in time duplex fashion. The operations of the two transceiver modules 210 and 230 can be coordinated in time such that the uplink receiver circuitry is coupled to the uplink antenna 232 for reception of transmissions over the wireless transmission link 250 at the same time that the downlink transmitter is coupled to the downlink antenna 212. In some embodiments, there is close time synchronization with a minimal guard time between changes in duplex direction.

The UE transceiver 230 and the base station transceiver 210 are configured to communicate via the wireless data communication link 250, and cooperate with a suitably configured RF antenna arrangement 212/232 that can support a particular wireless communication protocol and modulation scheme. In some illustrative embodiments, the UE transceiver 210 and the base station transceiver 210 are configured to support industry standards such as the Long Term Evolution (LTE) and emerging 5G standards, and the like. It is understood, however, that the present disclosure is not necessarily limited in application to a particular standard and associated protocols. Rather, the UE transceiver 230 and the base station transceiver 210 may be configured to support alternate, or additional, wireless data communication protocols, including future standards or variations thereof.

In accordance with various embodiments, the BS 202 may be an evolved node B (eNB), a serving eNB, a target eNB, a femto station, or a pico station, for example. In some embodiments, the UE 204 may be embodied in various types of user devices such as a mobile phone, a smart phone, a personal digital assistant (PDA), tablet, laptop computer, wearable computing device, etc. The processor modules 214 and 236 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

Furthermore, the steps of a method or algorithm described in connection with the embodiments disclosed herein may be embodied directly in hardware, in firmware, in a software module executed by processor modules 214 and 236, respectively, or in any practical combination thereof. The memory modules 216 and 234 may be realized as RAM memory, flash memory, ROM memory, EPROM memory, EEPROM memory, registers, a hard disk, a removable disk, a CD-ROM, or any other form of storage medium known in the art. In this regard, memory modules 216 and 234 may be coupled to the processor modules 210 and 230, respectively, such that the processors modules 210 and 230 can read information from, and write information to, memory modules 216 and 234, respectively. The memory modules 216 and 234 may also be integrated into their respective processor modules 210 and 230. In some embodiments, the memory modules 216 and 234 may each include a cache memory for storing temporary variables or other intermediate information during execution of instructions to be executed by processor modules 210 and 230, respectively. Memory modules 216 and 234 may also each include non-volatile memory for storing instructions to be executed by the processor modules 210 and 230, respectively.

The network communication module 218 generally represents the hardware, software, firmware, processing logic, and/or other components of the base station 202 that enable bi-directional communication between base station transceiver 210 and other network components and communication nodes configured to communication with the base station 202. For example, network communication module 218 may be configured to support internet or WiMAX traffic. In a typical deployment, without limitation, network communication module 218 provides an 802.3 Ethernet interface such that base station transceiver 210 can communicate with a conventional Ethernet based computer network. In this manner, the network communication module 218 may include a physical interface for connection to the computer network (e.g., Mobile Switching Center (MSC)). The terms "configured for," "configured to" and conjugations thereof, as used herein with respect to a specified operation or function, refer to a device, component, circuit, structure, machine, signal, etc., that is physically constructed, programmed, formatted and/or arranged to perform the specified operation or function.

Figure 3:
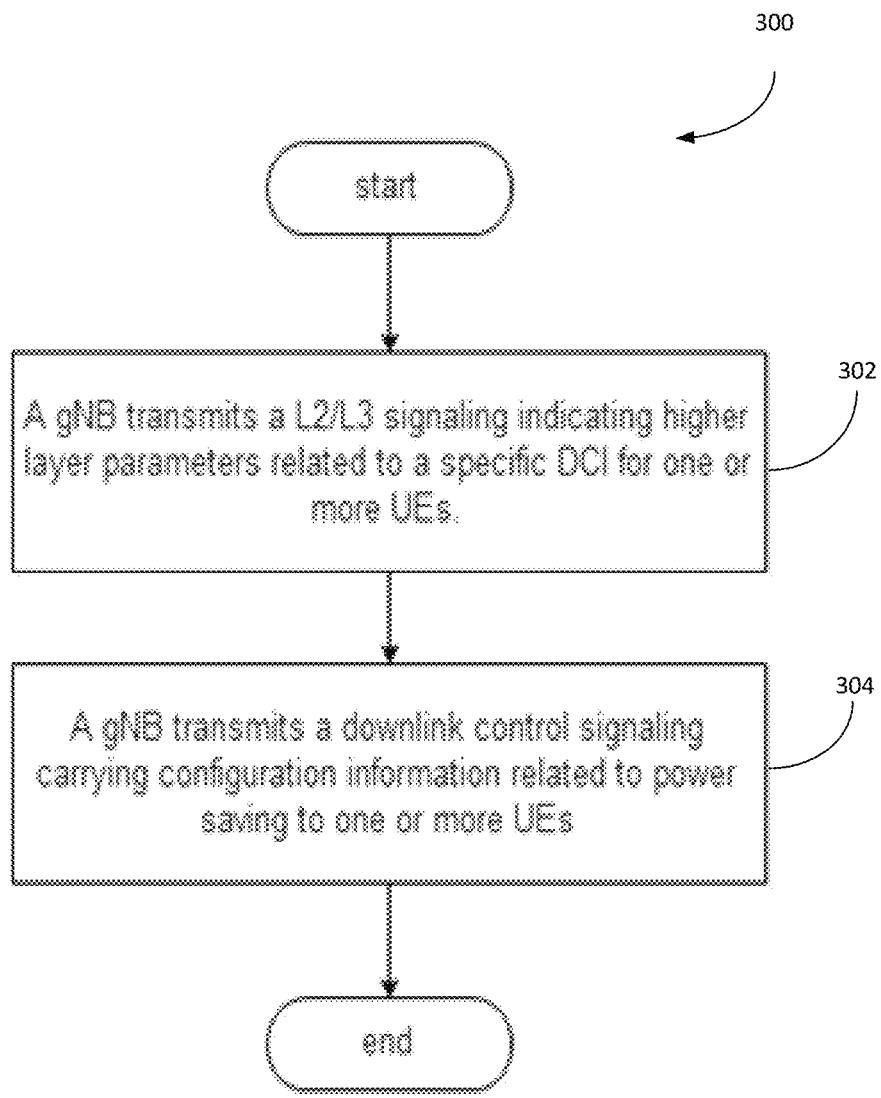
FIG. 3 illustrates a flow diagram of a process 300 for providing downlink control signaling in accordance with some embodiments of the present disclosure.

Referring to FIG. 3, a flow diagram of a process 300 for providing downlink control signaling is shown according to some example implementations. At step 302, a wireless network device (e.g., a gNB) transmits a signal indicating higher layer parameters related to a specific DCI for one or more UEs according to some implementations.

At step 304, the wireless network device transmits a downlink control signal to one or more UEs according to some implementations. The downlink control signal carries configuration information related to power saving for the one or more UEs according to some implementations. The downlink control signal includes one or more data blocks that indicate a certain number of triggering states of the one or more UEs according to some implementations. The triggering states indicate configuration information of each of the one or more UEs according to some implementations. In some implementations, the downlink control signal includes a control signaling format identifier. In some implementations, the downlink control signal includes a certain number of functionality indicators. In some implementations, the downlink control signal indicates a detection behavior of a subsequent downlink control signal.

Figure 4:
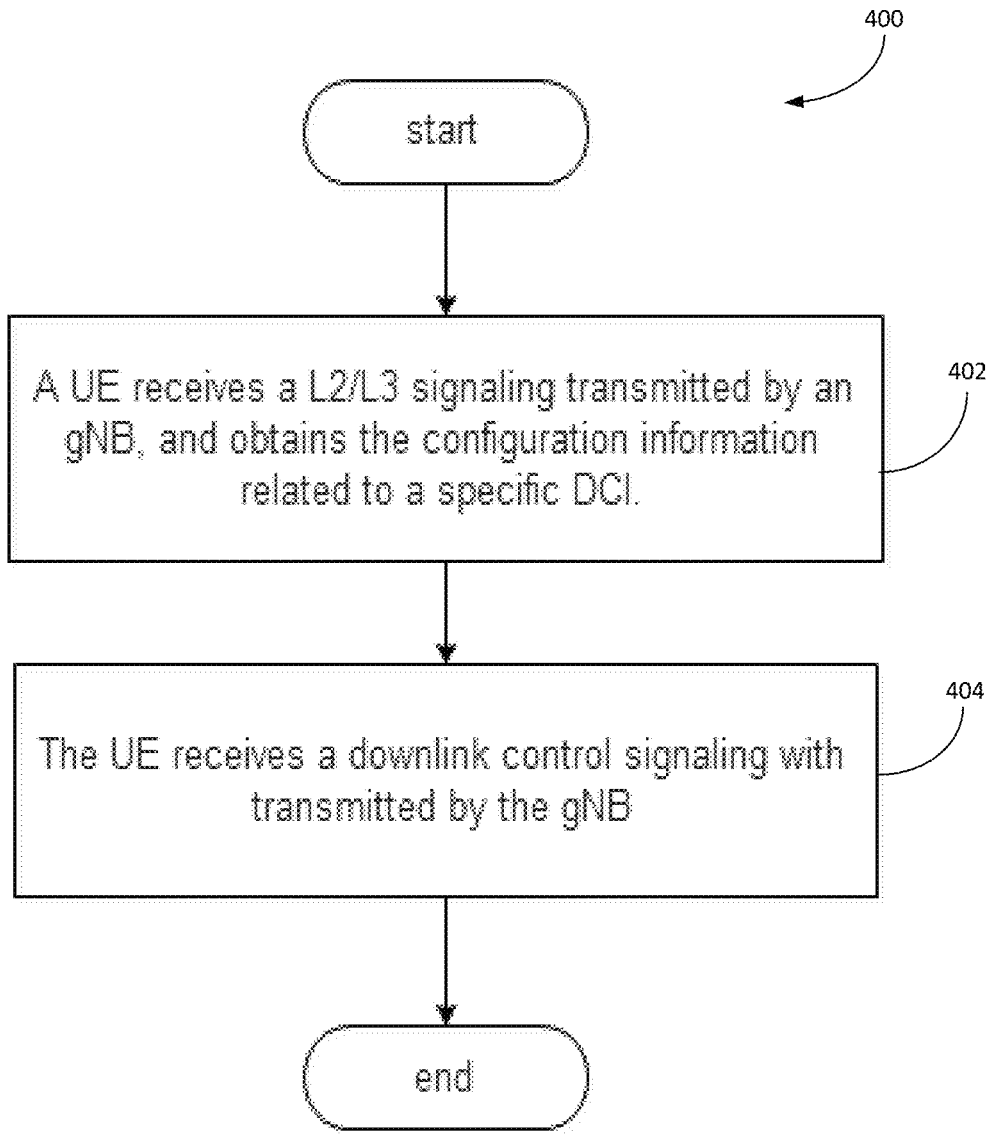
FIG. 4 illustrates a flow diagram of a process 400 for providing downlink control signaling in accordance with some embodiments of the present disclosure.

Referring to FIG. 4, a flow diagram of a process 400 for providing downlink control signaling is shown according to some example implementations. At step 402, a UE receives a signal (e.g., L2/L3 signal) from a wireless network device according to some implementations. The signal from the wireless network device includes configuration information related to a specific DCI according to some implementations.

At step 404, the UE receives a downlink control signal (sometimes referred herein as control signal or downlink control signaling) according to some implementations. In some implementations, the downlink control signal includes one or more data blocks that indicate one or more triggering states of one or more user devices. In some implementations, the triggering states indicate configuration information of the one or more user devices. In some implementations, the downlink control signaling includes a control signaling format identifier. In some implementations, the control signaling includes a certain number of functionality indicators. In some implementations, the downlink control signaling can indicate a detection behavior of a subsequent downlink control signal.

In some implementations, a single user device is configured with one data block. In some implementations, the fields of the data block is defined in the Table 1. The number of the fields of the data block is N that is a natural number. For example, for the UE configured with the data block, the triggering state-0 of the $2^{nd}$ field is indicated by the value of "00" of the data block, the triggering state-1 of the $2^{nd}$ field is indicated by the value of "01" of the data block, the triggering state-2 of the $2^{nd}$ field is indicated by the value of "10" of the data block, the triggering state-3 of the $2^{nd}$ field is indicated by the value of "11" of the data block. In some implementations, the bit width of each field in one code block is equal to or larger than 1. In some implementations, the configuration information/triggering states reuse the fields in the DCI format 0_0/1_0 or DCI format 0_1/1_1. In some implementations, the triggering states in a field are jointly coded with other triggering states in other fields. Thus the payload of the DCI can be reduced.

TABLE 1

| | Configuration information/<br>Triggering state |
|---|---|
| The $1^{st}$ field<br>of the data block | |
| 0 | Triggering state-0 |
| 1 | Triggering state-1 |
| The $2^{nd}$ field<br>of the data block | |
| 00 | Triggering state-0 |
| 01 | Triggering state-1 |
| 10 | Triggering state-2 |
| 11 | Triggering state-3 |
| ... | ... |
| The $N^{th}$ field<br>of the data block | |
| 00 | Triggering state-0 |
| 01 | Triggering state-1 |
| 10 | Triggering state-2 |
| 11 | Triggering state-3 |

In some implementations, the data block size N is equal to 1. In some implementations, the data block size is same as that of DCI format 0_0/1_0. In some implementations, the data block size includes some padding bits added at the end of the data block to align with the budget sizes of the current DCI format 1_0. In some implementations, the triggering states of the single user device are mapped to a subset of a certain number of higher layer parameters. In some implementations, the triggering states of a certain number of fields are jointly coded in one code block. In some implementations, the triggering states of the single user device are coded in a new DCI payload. Thus, the reliability is higher compared with a scheme that adds the triggering states in DCI format 0_0/1_0 or DCI format 0_1/1_1 according to some implementations.

In some implementations, a group of user devices is configured with a group of data blocks. The number of user devices in the group is M1, and the number of data blocks in the group is M2. M1 is equal to or larger than M2 according to some implementations. In some implementations, the fields of the group of data blocks are defined in the Table 2. The number of the fields of data blocks in the group are $\{N_1, N_2, N_3, \ldots, N_{M2}\}$ which are all natural numbers. For example, for the UE configured with the data block, the triggering state-0 of the $2^{nd}$ field is indicated by the value of "00" of the data block, the triggering state-1 of the $2^{nd}$ field is indicated by the value of "01" of the data block, the triggering state-2 of the $2^{nd}$ field is indicated by the value of "10" of the data block, the triggering state-3 of the $2^{nd}$ field is indicated by the value of "11" of the data block. In some implementations, the bit width of each field in one code block is equal to or larger than 1. In some implementations, the configuration information/triggering states are indicated in reused fields in the DCI format 0_0/1_0 or DCI format 0_1/1_1. In some implementations, the triggering states of a certain number of fields are jointly coded in one code block.

TABLE 2

| | Configuration information/<br>Triggering state |
|---|---|
| The $1^{st}$ data block<br>The $1^{st}$ field | |
| 0 | Triggering state-0 |
| 1 | Triggering state-1 |
| The $2^{nd}$ field<br>of the data block | |
| 00 | Triggering state-0 |
| 01 | Triggering state-1 |
| 10 | Triggering state-2 |
| 11 | Triggering state-3 |
| ... | ... |
| The $N_1^{th}$ field<br>of the data block | |
| 00 | Triggering state-0 |
| 01 | Triggering state-1 |
| 10 | Triggering state-2 |
| 11 | Triggering state-3 |
| ... | ... |
| The $M2^{th}$ data block<br>The $1^{st}$ field | |
| 0 | Triggering state-0 |
| 1 | Triggering state-1 |
| The $2^{nd}$ field<br>of the data block | |
| 00 | Triggering state-0 |
| 01 | Triggering state-1 |
| 10 | Triggering state-2 |
| 11 | Triggering state-3 |
| ... | ... |
| The $N_{M2}^{th}$ field<br>of the data block | |
| 00 | Triggering state-0 |
| 01 | Triggering state-1 |

TABLE 2-continued

|  | Configuration information/<br>Triggering state |
|---|---|
| 10 | Triggering state-2 |
| 11 | Triggering state-3 |

In some implementations, the number of data blocks in the group M2 is equal to 1. In some implementations, the size of each data block in a group is equal to or less than L bits. In some implementations, L is equal to or larger than 0 and equal to or smaller than 12 (or other value). In some implementations, the size of the group of data blocks adds some padding bits at the end of one or more data blocks to align with the budget sizes of the current DCI format 1_0. In some implementations, the triggering states of the group of user devices are mapped to a set of higher layer parameters. In some implementations, the triggering states of the group of user devices are coded in a new DCI payload. In these implementations, the bit width of one data block in a group is different with that of the other data blocks in the group, or varied configured by the L1/L2/L3 signaling. In some implementations, the triggering states of a field for a user device are jointly coded with that of the field for other user devices. Thus, the reliability is higher compared with the scheme that adds the triggering states in DCI format 0_0/1_0 or DCI format 0_1/1_1 for significantly reducing the payload of the DCI.

In some implementations, the fields of a data block is configured with flexibility so that one or more user devices are configured with a subset of all the fields. In some implementations, a new DCI for one or more user devices is configured with a mapping information that informs the UE the information of determining a start position and/or a length of its data block and extracting the triggering state to obtain the configuration information from the new DCI payload. In some implementations, the mapping information includes a starting position of a data block. In some implementations, the starting position includes an index to the block number. In some implementations, the starting position includes a bit width of the data block or the size of the data block field. In some implementations, the starting position is configured by a higher layer signal. In some implementations, the size of the new DCI for a group of user devices is configured by a higher layer parameter. In some implementations, the starting position of the data block in the new DCI for each user device in the group is configured by a higher layer parameter. In some implementations, the higher layer signal includes a RRC signal or MAC CE.

For example, a UE-Specific DCI with four fields indicating several triggering states is transmitted to a user device by a wireless network device in a predefined resource set. The predefined resource set represents at least one of a BWP, a serving cell, an active time, a CORESET, a search space, a PDCCH monitoring occasion, or a specific RNTI type configured by MAC CE or RRC signal. When the UE-Specific DCI transmission has been received at the predefined resource set in some embodiments, the user device obtains the indication information based on Table 3 for instance.

TABLE 3

| $1^{st}$ field<br>of the data block | Configuration information/<br>Triggering state of DCI indicator |
|---|---|
| 0 | not wake-up |
| 1 | wake-up |
| $2^{nd}$ field<br>of the data block | Configuration information/<br>Triggering state of BWP indicator |
| 00 or 0 | BWP #1 |
| 01 or 1 | BWP #2 |
| 10 | BWP #3 |
| 11 | BWP #4 |
| $3^{rd}$ field<br>of the data block | Configuration information/<br>Triggering state of time domain<br>resource allocation indicator |
| 00000~11111 | The indication of the minimum value of k0, k1, k2, the minimum value of A-CSI-RS trigger offset and the minimum value of A-SRS triggering offset |
| $4^{th}$ field<br>of the data block | Configuration information/<br>Triggering state of RS<br>transmission |
| 00 | index0 in subset of RS transmission parameters |
| 01 | index1 in subset of RS transmission parameters |
| 10 | index2 in subset of RS transmission parameters |
| 11 | index3 in subset of RS transmission parameters |

A Subset of RS Transmission Parameters

|  | Configuration information/<br>Triggering state of RS transmission | | |
|---|---|---|---|
| index | CSI report | CSI-RS request | SRS request |
| 00 | Y | N | N |
| 01 | N | N | N |
| 10 | N | Y | N |
| 11 | N | Y | Y |

In this example, the $1^{st}$ field is used to indicate two triggering states. The $2^{nd}$ field is a reused field in DCI formats in Rel-15 specification. The $3^{rd}$ field is used to indicate the minimum value of the k0/k1/k2, the minimum value of A-CSI-RS trigger offset, and/or the minimum value of A-SRS trigger offset. The content of the $3^{rd}$ field is indicated by jointly coding all triggering states (e.g., '00000' indicates that the value of the five parameters are all zeros) according to some implementations. The content of the $3^{rd}$ field is indicated by indicating an entry of the resource table configured by RRC signaling e.g., '00001' indicates the entry 1 of a time domain resources assignment (TDRA) table for PDSCH/PUSCH according to the set or table or list of TDRA parameters configured by MAC CE or RRC signaling. In some implementations, the content of the $3^{rd}$ field is indicated by indicating a table configured by a RRC signal according to some implementations. For example, '010xx' indicates the second table of multiple TDRA tables for PDSCH/PUSCH configured by the RRC signal. 'xxx00' indicates that the minimum value of aperiodic CSI-RS/SRS triggering offset are equal to zeros, which is configured by the RRC signal or with the configuration of QCL-TypeD of a CSI-RS in a TCI state indicated by a MAC CE activation command. The $4^{th}$ field is used to indicate the index of a RS transmission table configured by MAC CE or RRC signal.

In another example, a UE group-specific DCI with two fields indicating several triggering states is transmitted to a group of user devices by the wireless network device in a predefined resource set. The predefined resource set represents at least one of a BWP, a serving cell, an active time, a CORESET, a search space, a PDCCH monitoring occasions, or a specific RNTI type configured by MAC CE or RRC signaling, for instance. When the UE group-specific DCI transmission has been received at the predefined resource set in some embodiments, the user devices can obtain the indication information based on Table 4 for instance.

TABLE 4

|  | $1^{st}$ field of the data block | Configuration information/ Triggering state of DCI indicator |
|---|---|---|
| block 1, block 2, block 3, . . . , block N | 0 1 | not wake-up wake-up |

|  | $2^{nd}$ field of the data block | Configuration information/ Triggering state of BWP indicator |
|---|---|---|
| block 1, block 2, block 3, . . . , block N | 00 01 10 11 | BWP #1 BWP #2 BWP #3 BWP #4 |

In this example, the downlink control signaling includes N data blocks for N user devices. Each field of a data block is used to indicate a certain number of triggering states respectively. The $1^{st}$ field is used to indicate two triggering states of wake-up and not wake-up. The $2^{nd}$ field is a field reusing one of the fields in DCI formats in Rel-15 specification.

In another example, a UE group-specific DCI with two fields indicating several triggering states is transmitted to a group of user devices by the wireless network device in a predefined resource set. The predefined resource set represents at least one of a BWP, a serving cell, an active time, a CORESET, a search space, a PDCCH monitoring occasions, or a specific RNTI type configured by MAC CE or RRC signaling. When the UE group-specific DCI transmission has been received at the predefined resource set, the user devices can obtain the indication information based on Table 5 for instance.

TABLE 5

| index | Configuration information/Triggering state of DCI indicator |
|---|---|
| 0 | not wake-up/go-to-sleep and sleep duration |
| 1 | wake-up |
| 2 | wake-up and the indication of RS transmission |
| 3 | wake-up and the indication of TDRA parameters |
| . . . |  |
| N | wake-up and BWP indicator |

In this example, the downlink control signal includes N data blocks for N user devices. All indication information of all user devices are jointly coded in one data block and used to indicate a certain number of triggering states respectively. The $1^{st}$ triggering state is used to indicate not wake-up or go-to-sleep and sleeping duration information. The $2^{nd}$ field is used to indicate a wake-up and the indication of RS transmission.

In some implementations, a data block in a new DCI for a user device can indicate a certain number of triggering states. In some implementations, the triggering state includes at least one of identifier of power saving DCI format, a wake-up indication, a go-to-sleep indication, a PDCCH (Physical Downlink Control Channel) monitoring periodicity indication, a PDCCH skipping duration indication, a BWP (Bandwidth Part) indicator, a spatial information, a time domain resource allocation, a QCL (Quasi-co-location) information, a SRS (Sounding Reference Signals) request, or a CSI (Channel State Information) request. For example, a triggering state is represented as {PS-conf-1, PS-conf-2, . . . , PS-conf-n} for multiple user device. In some implementations, the 'n' is an integer and larger than 1. For another example, a data block including a certain number of indicators/fields with a specific number of triggering states is represented as {PS-field-1, PS-field-2, . . . , PS-field-n} for a single user device. n some implementations, the 'n' is an integer and equal to or larger than 1. In some implementations, the "PS-conf-1" represents a wake-up state indication. In some implementations, the "PS-conf-2" represents information of PDCCH skipping duration indication. In some implementations, a certain number of the triggering states can be configured for UEs within a group. In some implementations, the triggering states are configured with flexibility. In some implementations, the "PS-field-1" represents a wake-up indicator. In some implementations, the "PS-field-2" represents information of TDRA parameter indicator. In some implementations, a certain number of the triggering states can be configured for a UE.

In some implementation, the wake-up indication indicates whether a UE needs to monitor a subsequent PDCCH corresponding to a certain set of PDCCH candidates in a predefined period. In some implementation, the wake-up indication indicates whether a UE monitors PDCCH in a predefined period. In some implementation, the wake-up indication indicates a transition of active time/DRX-ON to inactive time/DRX-Off.

In some implementations, the wake-up indication includes a not wake-up or go-to-sleep indication. In some implementations, the go-to-sleep indication indicates that a UE is not required to monitor a subsequent PDCCH corresponding to a certain set of PDCCH candidates in a predefined period. In some implementations, the go-to-sleep indication indicates that a UE does not need to or is not required to monitor PDCCH in a predefined period. In some implementations, the go-to-sleep indication indicates a transition of DRX-on or active time to DRX-off or inactive time.

In some implementations, a size of wake-up indication is equal to or less than 2 bits. In some implementations, the wake-up indication can indicate wake-up and not wake-up (go-to-sleep) by different triggering states for a single user device.

In some implementations, when a data block transmission has not been received in a predefined resource set, the user device keeps or remains in a wake-up state. In some implementations, when a data block transmission has been received in a predefined resource set, the user device performs operation in a subsequent predefined period corresponding to the information of wake-up indication. In some implementations, when a data block transmission has not been received, the user device keeps sleeping over a duration of a predefined PS-detect-timer, and wakes up to monitor PDCCH when the predefined PS-detect-timer is expired. In some implementations, 'has not been received' means that at least one of the following situations can occur: 1) the CRC of the DCI is not decoded successfully; 2) the RNTI is not descrambled successfully; 3) the data block is not decoded successfully.

In some implementations, the predefined period includes at least one of following C1 DRX cycles with a specific set of PDCCH candidates. In some implementations, C1 is an integer and larger than 0. In some implementations, the predefined period includes following C2 PDCCH monitoring periodicity with a specific set of PDCCH candidates. In some implementations, C2 is an integer and larger than 0.

In some implementations, the predefined period is associated with a PDCCH monitoring behavior treated per search space. For example, when the UE is configured with two PDCCH search spaces, search space 1 is associated with periodicity 1, and search space 2 is associated with periodicity 2, assuming that the information conveyed in the DCI indicates that the UE does not need to monitor PDCCH in the following 2 PDCCH monitoring cycles. In some implementations, for the search space 1, the UE does not need to monitor PDCCH candidates in the following duration of 2 times periodicity 1. For the search space 2, the UE does not need to monitor PDCCH candidates in the following duration of 2 times periodicity 2.

In some implementations, the PDCCH monitoring cycle equals to the maximum or minimum periodicity of all the search spaces. In some implementations, the PDCCH monitoring cycle equals to the maximum or minimum periodicity of the search spaces of the second set of PDCCH candidates. For example, the UE is configured with two PDCCH search spaces (e.g., search space 1 with periodicity 1 and search space 2 with periodicity 2) and periodicity 1 is smaller than periodicity 2, assuming that the information conveyed in the DCI indicates that the UE does not need to monitor PDCCH in the following 2 PDCCH monitoring cycles. In this example, for both search space 1 and search space 2, the UE does not need to monitor PDCCH candidates in the following duration of 2 times periodicity 1. The duration of the inactive time of the UE is 2 times of the maximum of periodicity of periodicity 1 and periodicity 2. The inactive time is a time period during which the UE is not required to monitor PDCCH.

In some implementations, the subsequent or specific set of PDCCH candidates includes at least one of the following: a DCI format with CRC scrambled by C-RNTI, CS-RNTI, MCS-C-RNTI, TC-RNTI, SP-CSI-RNTI, P-RNTI, SI-RNTI, RA-RNTI, TC-RNTI, SFI-RNTI, INT-RNTI, TPC-PUSCH-RNTI, TPC-PUCCH-RNTI, DCI format 0-0, DCI format 0-1, DCI format 1-0, DCI format 1-1, DCI format 2-0, DCI format 2-1, DCI format 2-2, or DCI format 2-3.

In some implementations, the first set of PDCCH candidates include DCI format with CRC scrambled by PS-RNTI. In some implementations, PS-RNTI is a new RNTI scrambling the DCI to indicate at least one of the above triggering states.

In some implementations, the wake-up indication can indicate the duration of the PDCCH monitoring skipping duration. In some implementations, the unit of skipping duration can be a slot (e.g., 10 slots), a millisecond (10 ms), or a PDCCH occasion (e.g., K*PDCCH periodicity). In some implementations, with the indication of wake-up information, the UE does not need to wake up or can skip monitoring PDCCH, which is beneficial to the power consumption.

In some implementations, the configuration information may include a BWP (bandwidth part) indicator. If the UE does not support active BWP change via DCI, the UE ignores the BWP indication.

In an example, a bit width for the configuration information is determined as $\lceil \log_2(n_{BWP}) \rceil$ bits, where $n_{BWP} = n_{BWP,RRC}+1$ if $n_{BWP,RRC} \leq 3$, in which case the bandwidth part indicator is equivalent to an ascending order of a higher layer parameter BWP-Id according to some implementations. In some implementations, the $n_{BWP,RRC}$ is the number of DL BWPs configured by higher layers, excluding the initial DL bandwidth part. In some implementations, $n_{BWP}=n_{BWP,RRC}$, in which case the bandwidth part indicator is defined in Table 4.

TABLE 4

| Value of BWP indicator field 2 bits | Bandwidth part |
| --- | --- |
| 00 | Configured BWP with BWP-Id = 1 |
| 01 | Configured BWP with BWP-Id = 2 |
| 10 | Configured BWP with BWP-Id = 3 |
| 11 | Configured BWP with BWP-Id = 4 |

In another example, the bit width for this configuration information is determined as $\lceil \log_2(n_{BWP}) \rceil$ bits, where $n_{BWP}=n_{BWP,RRC}+1$ if $n_{BWP,RRC} \leq 3$, in which case the bandwidth part indicator is equivalent to an ascending order of the higher layer parameter BWP-Id. In some implementations, $n_{BWP,RRC}$ is the number of UL BWPs configured by higher layers, excluding the initial UL bandwidth part. In some implementations, $n_{BWP}=n_{BWP,RRC}$ in which case the bandwidth part indicator is defined in Table 4 for instance.

In another example, according to some implementations, the BWP switching indication can be associated with a reference signal. In this case, the triggering state in the data block indicates the BWP switching from a small BWP to a large BWP. A set of reference signals (e.g., TRS, CSI-RS, or both, or other reference signal like PT-RS) is transmitted after $T_{BWPswitchDelay}$. In this example, the UE can derive the channel condition or beam information of the large BWP soon after the BWP switching which is beneficial to improve the network performance.

For DCI-based BWP switch, after the UE receives a BWP switching request at slot n on a serving cell, the UE may be able to receive PDSCH (for DL active BWP switch) or transmit PUSCH (for UL active BWP switch) on the new BWP in the serving cell based on which BWP switching occurs no later than at slot $n+T_{BWPswitchDelay}$. A BWP switch delay is shown in Table 5.

TABLE 5

| | NR Slot length | BWP switch delay $T_{BWPswitchDelay}$ (slots) | |
| --- | --- | --- | --- |
| μ | (ms) | Type 1[Note 1] | Type 2[Note 1] |
| 0 | 1 | 1 | 3 |
| 1 | 0.5 | 2 | 5 |
| 2 | 0.25 | 3 | 9 |
| 3 | 0.125 | 6 | 17 |

Note 1:
Depends on UE capability.

Note 2:
If the BWP switch involves changing of SCS, the BWP switch delay is determined by the larger one between the SCS before BWP switch and the SCS after BWP switch.

In some implementations, the downlink control signal includes an identifier for DCI format. In some implementations, the field of the identifier for DCI format is 1 bit indicating an uplink or downlink BWP (bandwidth part). With a proper indication of a BWP indicator in the first set of PDCCH candidates, it is more beneficial for the UE to switch to larger BWP for large packet reception or transmission, and use small BWP to monitoring PDCCH candidates. In addition, the BWP switching associated with reference signal improves the network performance.

In some implementations, the configuration information includes information about PDCCH monitoring periodicity of a subsequent set of PDCCH candidates or PDCCH candidates. In some implementations, the information about PDCCH monitoring periodicity includes at least one of a PDCCH monitoring periodicity (ks), a PDCCH monitoring duration (Ts), a PDCCH monitoring offset (Os), a PDCCH monitoring pattern within a slot, a search space activation/deactivation, or a CORESET activation/deactivation. For example, when the values of a search space i in the data block are all zeros, it indicates that the UE is not need to change the PDCCH monitoring periodicity.

In some implementations, the indication of the search space deactivation indicates that the UE is not expected to monitor the corresponding PDCCH candidates of the deactivated search space. In some implementations, the indication of search space activation indicates UE needs to monitor the corresponding PDCCH candidates of the activated search space. With a dynamic indication of PDCCH monitoring occasion, it is more beneficial for UE to adapt to traffic arriving and reduce power consumption.

In some implementations, the configuration information includes spatial information. In some implementations, the spatial information includes at least one of a (maximum) number of MIMO layers, a (maximum) number of transmission layers, a (maximum) number of antenna ports, or a (maximum) number of antenna panel.

For example, in some implementations, when the values of the transport block are all zeros, it indicates that one or more spatial information is unchanged. In some implementations, the transport block is mapped onto the transmission layer or the MIMO layer. With a dynamic indication of spatial information, it is more beneficial for UE to adapt to traffic arriving and reduce power consumption.

In some implementations, the configuration information includes indication information of a time domain resource allocation as the followings:
time domain resource allocation of a DL assignment;
time domain resource allocation of a UL assignment;
The (minimum) value of k0;
The (minimum) value of k1;
The (minimum) value of k2;
The (minimum) value of A-CSI-RS (aperiodic CSI-RS) trigger offset;
The (minimum) value of A-SRS (aperiodic SRS) trigger offset.

With an indication of time domain resource allocation information, it is beneficial for UE to know the information in advance to PDCCH decoding which helps UE adapt to traffic arriving and reduce power consumption.

In some implementations, the indication of a subset of TDRA entries can be used to indicate the time domain resource allocation information for the user device in a downlink control signaling, e.g., bit-map based indication that indicates the information of all OFDM symbols in a slot. In some implementations, the indication of one active table from multiple configured TDRA tables by RRC signaling can be used to indicate the time domain resource allocation information for the user device in a data block of a downlink control signal. In some implementations, the indication of the minimum applicable value can be used to indicate the time domain resource allocation information for the user device in a downlink control signal.

In some implementations, the configuration information includes a SRS request. In some implementations, the control signal includes a SRS request. In some implementations, the control signal is associated with a SRS request. In some implementations, the SRS request includes a resource allocation indication. In some implementations, the resource allocation of SRS or PUCCH for reporting or PUSCH for reporting has a predefined offset relative to the first set of PDCCH candidates. In some implementations, the resource allocation of SRS or PUCCH for reporting or PUSCH for reporting has a predefined offset relative to DRX-on or active or the timing of SS (synchronization signal)/PBCH (physical broadcast channel). With an indication of SRS request, it is beneficial for the UE or the network to know the information of channel condition in advance which helps improve the performance.

In some implementations, the configuration information includes a CSI request. In some implementations, the control signal includes a CSI request. In some implementations, the control signal is associated with a CSI request. In some implementations, the CSI request includes a resource allocation indication. In some implementations, the resource allocation of CSI-RS or PUCCH for reporting or PUSCH for reporting has a predefined offset relative to the first set of PDCCH candidates. In some implementations, the resource allocation of CSI-RS or PUCCH for reporting or PUSCH for reporting has a predefined offset relative to DRX-on or active time or the timing of SS (synchronization signal)/PBCH (physical broadcast channel). With an indication of CSI request, it is beneficial for the UE or the network to know the information of channel condition in advance which helps improve the performance.

In some implementations, the configuration information includes beam or QCL information. In some implementations, the beam information or antenna port quasi co-location information of the second set of PDCCH candidates is associated with or determined by a first set of PDCCH candidates. In some implementations, beam information or antenna port quasi co-location information of the second set of PDCCH is indicated by the first set of PDCCH candidates. In some implementations, beam information or antenna port quasi co-location information of the second set of PDCCH may be associated with first set of PDCCH candidates if they are overlapped in some domains. In some implementations, the domain includes CORESET, search space, time resource or frequency resource. With an indication of beam or QCL information, it is beneficial for the UE or the network to know the information of channel condition in advance which helps improve the performance.

In some implementations, the configuration information includes operations of a SCell (secondary cell). Herein the operations of the primary cell and the secondary cell includes at least one of a Scell deactivation/activation indication, a dormant Scell indication, or a PDCCH monitoring occasions in scell.

In some implementations, the Scell deactivation indicates that the UE is not expected to monitor the PDCCH candidates of the deactivated Scell. In some implementations, the Scell activation indicates that the UE needs to monitor the corresponding PDCCH candidates of the activated Scell. In some implementations, the UE is not required to monitor the PDCCH in the dormant Scell. In some implementations, the UE needs to do the measurement of beam management, and/or RRM measurement, and/or CSI measurement and/or CSI acquisition in the dormant Scell. With an indication of operation of the secondary cell in a dynamic way, it is beneficial for the UE to reduce to PDCCH monitoring which helps UE adapt to traffic arriving and reduce power consumption.

In some implementations, the downlink control signal includes at least one of an identifier for DCI format, a functionality indicator, or N data blocks. In some implementations, N is equal to 1 if the new DCI is a UE-specific DCI, N is larger than 1 otherwise. In some implementations, the field of the identifier for DCI formats is 1 bit indicating an uplink or downlink BWP (bandwidth part) indicator. In some implementations, the indication bit can be separately configured for each block or can be common to all blocks. The functionality indicator of the triggering state or data block includes at least one of the following functionalities 1 to 17:

1) Wake-up information associated with C-DRX:
2) information of time domain resource allocation that including the TDRA parameters of the minimum value of k0/k1/k2, the minimum value of A-CSI-RS and A-SRS trigger offset, e.g. Cross-slot scheduling
3) Triggering RS transmission; where including RS DL/UL scheduling resource for receiving by UE or reporting to gNB, or QCL information.
4) CSI request
5) SRS request
6) TCI state indication
7) QCL type information indication
8) Carrier indicator
9) SCell operation indication
10) BWP indication
11) spatial information
12) PDCCH decoding resource indication, e.g. CORESET/search space/candidate of subsequent PDCCH decoding
13) PDCCH monitoring periodicity
14) PDCCH skipping (skipping duration)
15) Skipping number of DRX monitoring
16) SPS activation
17) DRX configuration In some implementations, the bit width for functionality indicator can be obtained based on the equation of $\log_2(M)$ by configuring at least M functionalities. In some implementations, there exists or is configured at least M functionalities. In some implementations, the bit width for functionality indicator can be fixed or reuse that of the similar fields in existing DCI formats.

In some implementation, the user devices are configured with one data block. In some implementations, a certain number of the fields of the current DCI format 0_0/1_0 in Release 15 are used to indicate another information which is the subset of the above mentioned configuration information related to functionalities. In some implementation, the another information is related to the above mentioned functionalities. In some implementation, a certain number of the fields of the DCI format 0_0/1_0 in Release 15 are the information that can be used to trigger another trigger states of the information related to the above mentioned functionalities. In some implementations, for the user device configured with the DCI, the another triggering states of the certain number of fields in the DCI format 0_0/1_0 in Release 15 are enabled by the predefined information in Rel 16 configured by MAC CE or RRC signaling. In some implementation, the predefined information includes at least one of a specific type of RNTI, a specific search space set, a specific search space type, a specific CORESET, a specific PDCCH candidates, a specific CCE AL, a specific timer, a specific PDCCH monitoring period, a specific time/frequency domain resource, a DRX On duration, or an active time. In some implementations, for the user device configured with the DCI, the another triggering states in Rel 16 and the original configuration information in Rel 15 of the certain number of fields in the DCI format 0_0/1_0 are used to indicate at the same time or simultaneously.

For example, a certain number of the fields in DCI format 1_0 in Rel 15 are used to indicate another triggering states for the user device if the DCI is scrambled by PS-RNTI or detected in a PS timer/duration configured by MAC CE or RRC signaling. In some implementations, the certain number of fields in DCI format 1_0 in Rel 15 are used to indicate another triggering states for the user device if the RNTI scrambling CRC of DCI format 1_0 in Rel 15 is C-RNTI and/or CS-RNTI and/or MCS-C-RNTI and/or TC-RNTI and the predefined information configured by MAC CE or RRC signaling. In some implementations, the certain number of fields in DCI format 1_0 in Rel 15 are used to indicate another triggering states for the user device if the PUSCH is scheduled by MAC RAR. If the "Frequency domain resource assignment" field are not of all ones, the another indication information/triggering states corresponding to a certain number of the fields in DCI format 1_0 in Rel 15 with CRC scrambled by C-RNTI are shown in Table 6. In some examples, the another indication information of a certain number of the fields in DCI format 1_0 in Rel 15 are configurable by the MAC CE or RRC signaling. In some examples, the another indication information of a certain number of the fields in DCI format 1_0 in Rel 15 are configurable by the L1 signaling.

TABLE 6

| Fields in DCI format 1_0 in Rel 15 (or Release 15) | Configuration information/ Triggering state in Rel 15 | Another possible Configuration information/Triggering state with predefined information under a predefined configuration in Rel 16 (or Release 16) |
| --- | --- | --- |
| 1. Identifier for DCI formats | 1 bits- The value of this bit field is always set to 1, indicating a DL DCI format | The field can be also used to indicate at least one of the following triggering states simultaneously: 1) enabling another configuration information/triggering states of the other fields in this DCI; 2) BWP switching operation; 3) PDCCH monitoring periodicity switching operation; 4) PDCCH skipping; |

TABLE 6-continued

| Fields in DCI format 1_0 in Rel 15 (or Release 15) | Configuration information/ Triggering state in Rel 15 | Another possible Configuration information/Triggering state with predefined information under a predefined configuration in Rel 16 (or Release 16) |
| --- | --- | --- |
| | | 5) specific TCI state or QCL type D<br>6) PDCCH monitoring operation in SCell etc.<br>The field can be also used to indicate at least one of the following triggering states non-simultaneously:<br>1) enabling another configuration information/triggering states of other fields in this DCI;<br>2) wake-up triggering state;<br>3) PDCCH monitoring periodicity switching operation;<br>4) long DRX cycle configuration;<br>5) PDCCH monitoring operation in SCell or PCell;<br>6) search space/CORESET/candidate activation/deactivation;<br>7) a specific TCI state/QCL type D; etc. |
| 2. Frequency domain resource assignment | $\lceil \log_2(N_{RB}^{DL,\,BWP}(N_{RB}^{DL,\,BWP}+1)/2)\rceil$ bits where $N_{RB}^{DL,\,BWP}$ is given by the size of CORESET 0 if CORESET 0 is configured for the cell; and the size of initial DL bandwidth part if CORESET 0 is not configured for the cell. | If the $N_{RB}^{DL,\,BWP}$ is smaller than the maximum number of RB in DL BWP, the reminding bits after $\lceil \log_2(N_{RB}^{DL,\,BWP}(N_{RB}^{DL,\,BWP}+1)/2)\rceil$ bits and X padding bits(if required) can be also transmitted and used to indicate at least one of the following indications: (wherein X is used to align the bit width with the maximum length of this field.)<br>1) 1 bit- Wake-up, go-to-sleep or skipping triggering states;<br>2) 2~4 bits- PDCCH skipping/sleeping duration or the number of skipping DRX monitoring;<br>3) 1~2 bits - BWP indicator or BWP switching;<br>4) N1 bits- CCE AL/search space/ CORESET/candidate activation/deactivation; (wherein N1 > 1.)<br>5) N2 bits - information of time domain resource allocation; (wherein N2 > 1)<br>6) N3 bits - Triggering RS transmission; (wherein N3 ≥ 1)<br>7) N4 bits - PDCCH monitoring periodicity switching; (wherein N4 ≥ 2)<br>8) N5 bits - spatial information adaptation; (wherein N5 ≥ 1)<br>9) 1~2 bits- a PDCCH monitoring operation in SCell or PCell;<br>10) 1~2 bits - QCL information indication;<br>11) 2 bits - TCI states/QCL type indicator;<br>12) 1 bits - CSI report; etc. |
| 3. Time domain resource assignment | 4 bits-the field value m of the DCI provides a row index m + 1 to an allocation table. The indexed row defines the slot offset $K_0$, the start and length indicator SLIV, or directly the start symbol S and the allocation length L, and the PDSCH mapping type to be assumed in the PDSCH reception | The field can be also used to indicate the following triggering states simultaneously:<br>4 bits - indicates the row index of another time domain resource allocation tables configured by RRC signaling.<br>The field can be also used to indicate the following triggering states non-simultaneously:<br>1) 4 bits - indicates the row index of another time domain resource allocation tables configured by RRC signaling;<br>2) 4 bits - indicates the table index of multiple time domain resource allocation tables configured by RRC signaling; |
| 4. VRB-to-PRB mapping | 1 bit according to Table 7.3.1.1.2-33 in TS 38.212 | The field can be also used to indicate at least one of the following triggering states simultaneously:<br>1) '0' indicates a non BWP switching or switching to a default/initial/smallor specific BWP; '1' indicates a BWP switching.<br>2) '0' indicates a non PDCCH monitoring periodicity switching; '1' indicates a PDCCH monitoring periodicity switching.<br>3) '0' indicates a search space/CORESET/candidate deactivation; '1' indicates a search space/CORESET/candidate activation.<br>4) '1' indicates a CSI report.<br>5) a specific TCI state or QCL type indicator<br>6) '1' indicates a TCI activation/deactivation.<br>7) '0' indicates PDCCH skipping; '1' indicates non PDCCH skipping.<br>8) '0' indicates to decrease a certain number of antenna ports or the maximum number of MIMO |

TABLE 6-continued

| Fields in DCI format 1_0 in Rel 15 (or Release 15) | Configuration information/ Triggering state in Rel 15 | Another possible Configuration information/Triggering state with predefined information under a predefined configuration in Rel 16 (or Release 16) |
|---|---|---|
| 5. Modulation and coding scheme | 5 bits - indicates the index of Table 5.1.3.1-1/2/3 to determine the modulation order ($Q_m$) and target code rate (R) in TS 38.214 | layers; '1' indicates to increase a certain number of antenna ports or the maximum number of MIMO layers; etc.<br>The field can be also used to indicate at least one of the above mentioned triggering states of the information related to the above mentioned functionalities simultaneously, e.g. if the spectrum efficiency (Qm *R) is larger than a $Thrd_{SE}$ the user device shall switching BWP to a larger BWP<br>The field can be also used to indicate at least one of the above-mentioned triggering states in of the information related to the above mentioned functionalities non-simultaneously. |
| 6. New data indicator | 1 bit | The field can be also used to indicate at least one of the following triggering states simultaneously:<br>If there is a new transmission, the field indicates at least one of the following:<br>1) PDCCH monitoring in SCell;<br>2) BWP switching;<br>3) PDCCH monitoring periodicity switching.<br>4) a search space/CORESET/candidate deactivation.<br>5) CSI report;<br>6) a specific TCI state or QCL type indicator<br>7) non PDCCH skipping<br>8) a search space/CORESET/candidate activation.<br>9) adjust the spatial domain value; etc.<br>Otherwise, the field indicates at least one of the following:<br>1) PDCCH monitoring in SCell.<br>2) BWP switching.<br>3) PDCCH monitoring periodicity switching;<br>4) a search space/CORESET/candidate activation.<br>5) CSI report;<br>6) another specific TCI state or QCL type indicator<br>10) PDCCH skipping; etc.<br>The field can be also used to indicate at least one of the above-mentioned triggering states in of the information related to the above mentioned functionalities non-simultaneously. |
| 7. Redundancy version | 2 bits as defined in Table 7.3.1.1.1-2 in TS 38.212 | If there is a new transmission, the field indicates at least one of the following non-simultaneously:<br>1) PDCCH monitoring in SCell.<br>2) BWP switching.<br>3) PDCCH monitoring periodicity switching;<br>4) a search space/CORESET/candidate deactivation;<br>5) CSI report;<br>6) a specific TCI state or QCL type indicator<br>7) non PDCCH skipping<br>8) a search space/CORESET/candidate activation/deactivation.<br>9) The spatial information adaptation; etc. |
| 8. HARQ process number | 4 bits | If there is a new transmission, the field indicates at least one of the following non-simultaneously:<br>1) PDCCH monitoring in SCell.<br>2) BWP switching.<br>3) a PDCCH monitoring periodicity switching to a frequent PDCCH monitoring behavior.<br>4) a search space/CORESET/candidate deactivation.<br>5) a CSI report;<br>6) a specific TCI state or QCL type indicator<br>7) non PDCCH skipping<br>8) a search space/CORESET/candidate activation/deactivation;<br>9) The spatial information adaptation; etc. |
| 9. Downlink assignment index | 2 bits - is defined as counter DAI denotes the accumulative number of {serving cell, PDCCH monitoring occasion}-pair(s) in which PDSCH reception(s) or SPS PDSCH release associated with DCI format 1_0 or DCI | The field indicates at least one of the following non-simultaneously:<br>1) PDCCH monitoring in SCell.<br>2) BWP switching.<br>3) PDCCH monitoring periodicity switching.<br>4) a search space/CORESET/candidate activation/deactivation.<br>5) a CSI report;<br>6) a specific TCI state or QCL type indicator<br>7) non PDCCH skipping |

TABLE 6-continued

| Fields in DCI format 1_0 in Rel 15 (or Release 15) | Configuration information/ Triggering state in Rel 15 | Another possible Configuration information/Triggering state with predefined information under a predefined configuration in Rel 16 (or Release 16) |
| --- | --- | --- |
| | format 1_1 is present, up to the current serving cell and current PDCCH monitoring occasion, first in ascending order of serving cell index and then in ascending order of PDCCH monitoring occasion index m, where 0 ≤ m < M. | 8) a search space/CORESET/candidate activation/deactivation. 9) the spatial information adaptation; etc. |
| 10. TPC command for scheduled PUCCH | 2 bits - is a TPC command value active UL BWP b of carrier f of the primary cell c that the UE detects for PUCCH transmission occasion i | If the TPC is not adjusted at this time, the field indicates at least one of the following non-simultaneously: 1) PDCCH monitoring in SCell. 2) BWP switching. 3) a PDCCH monitoring periodicity switching. 4) a search space/CORESET/candidate activation/deactivation. 5) a CSI report; 6) a specific TCI state or QCL type indicator 7) non PDCCH skipping 8) a search space/CORESET/candidate activation/deactivation. 9) the spatial information adaptation; etc. |
| 11. PUCCH resource indicator | 3 bits is mapped to values of a set of PUCCH resource indexes, as defined in Table 9.2.3-2 in TS 38.213, provided by ResourceList for PUCCH resources from a set of PUCCH resources provided by PUCCH-ResourceSet with a maximum of eight PUCCH resources. | If there are no PUCCH transmission, the field indicates at least one of the following non-simultaneously: 1) PDCCH monitoring in SCell. 2) BWP switching. 3) a PDCCH monitoring periodicity switching. 4) a search space/CORESET/candidate activation/deactivation. 5) a CSI report; 6) a specific TCI state or QCL type indicator 7) non PDCCH skipping 8) a search space/CORESET/candidate activation/deactivation. 9) the spatial information adaptation; etc. |
| 12. PDSCH-to-HARQ_feedback timing indicator | 3 bits - For DCI format 1_0, the PDSCH-to-HARQ-timing-indicator field values map to {1, 2, 3, 4, 5, 6, 7, 8}. | If there are no PUCCH transmission or the parameter is configured by other signalings, the field indicates at least one of the following non-simultaneously: 1) PDCCH monitoring in SCell. 2) BWP switching. 3) a PDCCH monitoring periodicity switching. 4) a search space/CORESET/candidate activation/deactivation. 5) a CSI report; 6) a specific TCI state or QCL type indicator 7) non PDCCH skipping 8) a search space/CORESET/candidate activation/deactivation. 9) the spatial information adaptation. |

In some implementations, at least one of the fields in Table 6 can be used to indicate the another indication information according to the predefined resource set configured by MAC CE or RRC signaling. In some implementations, at least one of the fields in Table 6 can be used to indicate the current and another indication information according to the predefined resource set configured by MAC CE or RRC signaling. In some implementations, the user device is configured with one data block. In some implementations, a certain number of the fields of the current DCI format 0_0/1_0 in Release 15 are used to indicate power saving information. In some implementations, the power saving information includes the configuration information as discussed above. In some implementations, the power saving information is related to the above mentioned functionality indicators. In some implementations, a certain number of the fields of the DCI format 0_0/1_0 in Release 15 are reused for the power saving information that can be used to trigger various trigger states. In some implementations, for the user device configured with the DCI, the various triggering states of the certain number of fields in the DCI format 0_0/1_0 in Release 15 are enabled by predefined information in Rel 16 configured by MAC CE or RRC signaling. In some implementations, the predefined information includes at least one of a specific type of RNTI, a specific search space set, a specific search space type, a specific CORESET, a specific PDCCH candidates, a specific CCE AL, a specific timer, a specific PDCCH monitoring period, a specific time/frequency domain resource, or a DRX On duration and/or an active time. In some implementations, for the user device configured with the DCI, the various triggering states in Rel 16 and the original configuration information in Rel 15 of the certain number of fields in the DCI format 0_0/1_0 are used to provide indication simultaneously.

For example, a certain number of the fields in DCI format 1_0 in Rel 15 are used to indicate the various triggering states for the user device if the DCI is scrambled by PS-RNTI or detected in a PS timer/duration configured by MAC CE or RRC signaling. In some implementations, the certain number of fields in DCI format 1_0 in Rel 15 are used to indicate various triggering states for the user device if the RNTI scrambling CRC of DCI format 1_0 in Rel 15 includes at least one of C-RNTI, CS-RNTI, MCS-C-RNTI, or TC-RNTI. In some implementations, the predefined information is configured by MAC CE or RRC signaling. In some implementations, the certain number of fields in DCI format 1_0 in Rel 15 are used to indicate the various triggering states for the user device if the PUSCH is scheduled by MAC RAR. When the "Frequency domain resource assignment" field are not of all ones, the various indication information/triggering states corresponding to a certain number of the fields in DCI format 1_0 in Rel 15 with CRC scrambled by C-RNTI are shown in Table 6 according to some implementations. In some implementations, the various indication information of a certain number of the fields in DCI format 1_0 in Rel 15 are configurable by the MAC CE or RRC signaling. In some implementations, the various indication information of a certain number of the fields in DCI format 1_0 in Rel 15 are configurable by L1 signaling.

In some implementations, at least one of the fields in the DCI format 1_0 can be used for various configuration information simultaneously configured by RRC signaling. In some implementations, at least one of the fields with index of {1, 3, 4, 5, 6} in the DCI format 1_0 can be used for the various configuration information simultaneously configured by RRC signaling.

For example, a certain number of fields in DCI format 0_0 in Rel 15 are used to indicate one or more triggering states for the user device when the DCI is scrambled by PS-RNTI or detected in a PS timer/duration configured by MAC CE or RRC signaling. In some implementations, the certain number of fields in DCI format 0_0 in Rel 15 are used to indicate one or more triggering states for the user device when the RNTI scrambling CRC of DCI format 0_0 in Rel 15 includes at least one of C-RNTI, CS-RNTI, MCS-C-RNTI, or TC-RNTI and the predefined information is configured by MAC CE or RRC signaling. In some implementations, the certain number of fields in DCI format 0_0 in Rel 15 are used to indicate one or more triggering states for the user device if the PUSCH is scheduled by MAC RAR. In some implementations, the one or more indication information/triggering states corresponding to a certain number of the fields in DCI format 0_0 in Rel 15 with CRC scrambled by C-RNTI are shown in Table 7. In some implementations, the various indication information of a certain number of the fields in DCI format 0_0 in Rel 15 are configurable by the MAC CE or RRC signaling. In some implementations, the various indication information of a certain number of the fields in DCI format 0_0 in Rel 15 are configurable by L1 signaling.

TABLE 7

| Fields in DCI | Configuration | Another possible Configuration |
|---|---|---|
| format 0_0 in Rel 15 | information/Triggering state in Rel 15 | information/Triggering state with predefined information in Rel 16 |
| 1. Identifier for DCI formats | 1 bits- The value of this bit field is always set to 0, indicating an UL DCI format | The field can be also used to indicate at least one of the following triggering states simultaneously: 1) enabling another configuration information/triggering states of the other fields in this DCI; 2) BWP switching operation; 3) PDCCH monitoring periodicity switching operation; 4) PDCCH skipping; 5) specific TCI state or QCL type D; 6) PDCCH monitoring operation in SCell etc. The field can be also used to indicate at least one of the following triggering states non-simultaneously: 1) enabling another configuration information/triggering states of other fields in this DCI; 2) wake-up triggering state; 2) PDCCH monitoring periodicity switching operation; 3) long DRX cycle configuration; 4) PDCCH monitoring operation in SCell or PCell; 5) search space/CORESET/candidate activation/deactivation; 7) a specific TCI state/QCL type D; etc. |
| 2. Frequency domain resource assignment | $\lceil \log_2(N_{RB}^{UL,BWP}(N_{RB}^{UL,BWP}+1)/2) \rceil$ bits where $N_{RB}^{UL,BWP}$ is the size of the initial UL bandwidth part. | If the $N_{RB}^{UL,BWP}$ is smaller than the maximum number of RB in DL BWP, the reminding bits after $\lceil \log_2(N_{RB}^{DL,BWP}(N_{RB}^{DL,BWP}+1)/2) \rceil$ bits and X padding bits(if required) can be also transmitted and used to indicate at least one of the following indications: (wherein X is used to align the bit width with the maximum length of this field.) 1) 1 bit- Wake-up, go-to-sleep or skipping triggering states; 2) 2~4 bits- PDCCH skipping/sleeping duration or the number of skipping DRX monitoring; |

TABLE 7-continued

| Fields in DCI | Configuration | Another possible Configuration |
|---|---|---|
| | | 3) 1~2 bits - BWP indicator or BWP switching;
4) N1 bits - CCE AL/search space/ CORESET/candidate activation/ deactivation; (wherein N1 > 1.)
5) N2 bits - information of time domain resource allocation; (wherein N2 > 1)
6) N3 bits - Triggering RS transmission; (wherein N3 ≥ 1)
7) N4 bits - PDCCH monitoring periodicity switching; (wherein N4 ≥ 2)
8) N5 bits - spatial information adaptation; (wherein N5 ≥ 1)
9) 1~2 bits - a PDCCH monitoring operation in SCell or PCell;
10) 1~2 bits - QCL information indication;
11) 2 bits - TCI states/QCL type indicator;
12) 1 bits - CSI report; etc. |
| 3. Time domain resource assignment | 4 bits-the field value m of the DCI provides a row index m + 1 to an allocation table. The indexed row defines the slot offset $K_2$, the start and length indicator SLIV, or directly the start symbol S and the allocation length L, and the PUSCH mapping type to be applied in the PUSCH transmission. | The field can be also used to indicate the following triggering states simultaneously:
4 bits - indicates the row index of another time domain resource allocation tables configured by RRC signaling.
The field can be also used to indicate the following triggering states non-simultaneously:
1) 4 bits - indicates the row index of another time domain resource allocation tables configured by RRC signaling;
2) 4 bits - indicates the table index of multiple time domain resource allocation tables configured by RRC signaling; |
| 4. Frequency hopping flag | 1 bit according to Table 7.3.1.1.1-3 in TS 38.212. | The field can be also used to indicate at least one of the following triggering states simultaneously:
1) '0' indicates a non BWP switching or switching to a default/initial/small BWP; '1' indicates a BWP switching.
2) '0' indicates a non PDCCH monitoring periodicity switching; '1' indicates a PDCCH monitoring periodicity switching.
3) '0' indicates a search space/CORESET/candidate deactivation; '1' indicates a search space/CORESET/candidate activation.
4) '1' indicates CSI report.
5) a specific TCI state or QCL type indicator
6) '1' indicates a TCI activation/deactivation.
7) '0' indicates PDCCH skipping; '1' indicates non PDCCH skipping.
8) '0' indicates to decrease a certain number of antenna ports or the maximum number of MIMO layers; '1' indicates to increase a certain number of antenna ports or the maximum number of MIMO layers; etc. |
| 5. Modulation and coding scheme | 5 bits - indicates the index of Table 5.1.3.1-1/2/3 to determine the modulation order ($Q_m$) and target code rate (R) in TS 38.214 | The field can be also used to indicate at least one of the above mentioned triggering states of the information related to the above mentioned functionalities simultaneously, e.g. if the spectrum efficiency (Qm *R) is larger than a $Thrd_{SE}$ the user device shall switching BWP to a larger BWP.
The field can be also used to indicate at least one of the above-mentioned triggering states of the information related to the above mentioned functionalities non-simultaneously. |
| 6. New data indicator | 1 bit | The field can be also used to indicate at least one of the following triggering states simultaneously:
If there is a new transmission, the field indicates at least one of the following:
1) PDCCH monitoring in SCell;
2) BWP switching;
3) PDCCH monitoring periodicity switching.
4) a search space/CORESET/candidate deactivation.
5) CSI report;
6) a specific TCI state or QCL type indicator
7) non PDCCH skipping
8) a search space/CORESET/candidate activation.
9) adjust the spatial domain value; etc.
Otherwise, the field indicates at least one of the following: |

TABLE 7-continued

| Fields in DCI | Configuration | Another possible Configuration |
|---|---|---|
| | | 1) PDCCH monitoring in SCell.<br>2) BWP switching.<br>3) PDCCH monitoring periodicity switching;<br>4) a search space/CORESET/candidate activation.<br>5) CSI report;<br>6) another specific TCI state or QCL type indicator<br>7) PDCCH skipping; etc.<br>The field can be also used to indicate at least one of the above-mentioned triggering states of the information related to the above mentioned functionalities non-simultaneously. |
| 7. Redundancy version | 2 bits as defined in Table 7.3.1.1.1-2 in TS 38.212 | If there is a new transmission, the field indicates at least one of the following non-simultaneously:<br>1) PDCCH monitoring in SCell.<br>2) BWP switching.<br>3) PDCCH monitoring periodicity switching;<br>4) a search space/CORESET/candidate deactivation;<br>5) CSI report;<br>6) a specific TCI state or QCL type indicator<br>7) non PDCCH skipping<br>8) a search space/CORESET/candidate activation/deactivation.<br>9) The spatial information adaptation; etc. |
| 8. HARQ process number | 4 bits | If there is a new transmission, the field indicates at least one of the following non-simultaneously:<br>1) PDCCH monitoring in SCell.<br>2) BWP switching.<br>3) a PDCCH monitoring periodicity switching to a frequent PDCCH monitoring behavior.<br>4) a search space/CORESET/candidate deactivation.<br>5) a CSI report;<br>6) a specific TCI state or QCL type indicator<br>7) non PDCCH skipping<br>8) a search space/CORESET/candidate activation/deactivation;<br>9) The spatial information adaptation; etc. |
| 9. TPC command for scheduled PUCCH | 2 bits - is a TPC command value active UL BWP b of carrier f of the primary cell c that the UE detects for PUCCH transmission occasion i | If the TPC is not adjusted at this time, the field indicates at least one of the following non-simultaneously:<br>1) PDCCH monitoring in SCell.<br>2) BWP switching.<br>3) a PDCCH monitoring periodicity switching.<br>4) a search space/CORESET/candidate activation/deactivation.<br>5) a CSI report;<br>6) a specific TCI state or QCL type indicator<br>7) non PDCCH skipping<br>8) a search space/CORESET/candidate activation/deactivation.<br>the spatial information adaptation; etc. |
| 10. Padding bits | If required | If there are a number of padding bits, the field can reused the bits at the specific bit locations to indicate one triggering state of go-to-sleep or same slot or PDCCH monitoring in SCell etc. as mentioned in above functionality indicators. |
| 11. UL/SUL indicator | 1 bit for UEs configured with SUL in the cell as defined in Table 7.3.1.1.1-1 in TS 38.212 and the number of bits for DCI format 10 before padding is larger than the number of bits for DCI format 0 0 before padding; 0 bit otherwise. The UL/SUL indicator, if present, locates in the last bit position of DCI format 0 0, after the padding bit(s). | The field can be also used to indicate at least one of the following triggering states simultaneously:<br>1) '0' indicates a non BWP switching or switching to a default/initial/small BWP; '1' indicates a BWP switching.<br>2) '0' indicates a non PDCCH monitoring periodicity switching; '1' indicates a PDCCH monitoring periodicity switching.<br>3) '0' indicates a search space/CORESET/candidate deactivation; '1' indicates a search space/CORESET/candidate activation.<br>4) '1' indicates a CSI report.<br>5) a specific TCI state or QCL type indicator<br>6) '1' indicates a TCI activation/deactivation.<br>7) '0' indicates PDCCH skipping; '1' indicates non PDCCH skipping.<br>8) '0' indicates to decrease a certain number of antenna ports or the maximum number of MIMO layers; '1' indicates to increase a certain number |

TABLE 7-continued

| Fields in DCI | Configuration | Another possible Configuration |
|---|---|---|
| | | of antenna ports or the maximum number of MIMO layers; etc. The field can be also used to indicate at least one of the above-mentioned triggering states of the information related to the above mentioned functionalities non-simultaneously. |

In some implementations, at least one of the fields in Table 7 can be used to indicate the another indication information according to the predefined resource set configured by MAC CE or RRC signaling. In some implementations, at least one of the fields in Table 7 can be used to indicate the current and another indication information according to the predefined resource set configured by MAC CE or RRC signaling. In some implementations, at least one of the fields in the DCI format 1_0 can be used for various configuration information simultaneously configured by RRC signaling. In some implementations, at least one of the fields with index of {1, 3, 4, 5, 6, 11} in the DCI format 1_0 can be used for indicating one of the various configuration information simultaneously configured by RRC signaling.

In some implementations, the presented another configuration information for one field in Table 6 and Table 7 are configurable. For example, one of the various configuration information is available for some cases or a subset of the various configuration information are available for some others cases. In some implementations, the fields indicating one or more configuration/triggering states in the DCI are configured by MAC CE or RRC signaling. In some implementations, the fields can simultaneously indicate both the current configuration information in Rel 15 and the various configuration information in Rel 16 for power saving purpose. In some implementations, the fields can indicate either the current configuration information in Rel 15 or the various configuration information in Rel 16 for power saving purpose based on the MAC CE or RRC signaling configuration. In this way, the resource overhead can be reduced compared with the scheme that adds the triggering states in current DCI format or designs a new DCI.

In some implementations, the structure of the fields in the DCI can be reused for the DCI to indicate at least one of the configuration information described above. In some implementations, at least one of the fields is included in the DCI with CRC scrambled by PS-RNTI or a specific configuration configured by RRC signaling. In some implementations, if the higher layer parameter configuration is used to enable the various configuration information and the DCI with CRC scrambled by PS-RNTI, the various configuration information is enabled to indicate another operation to the user device. In some implementations, if the higher layer parameter configuration is used to disable the various configuration information, the fields in the DCI do not indicate the various configuration information. In some implementations, if the higher layer parameter configuration is used to enable the various configuration information and the CRC of the DCI is not scrambled by PS-RNTI, the fields in the DCI do not indicate another configuration information. In some implementations, if the DCI is configured to enable the various configuration information of some fields of the DCI, all the other fields are included in this DCI transmission.

In some implementations, the user device is configured with a position information. In some implementations, the position information is used to configure the UE for extracting the triggering state from the DCI information bits. In some implementations, the interpretation of the triggering state of user device is associated with the position information. In some implementations, the position information includes at least one of a starting position, a length of the information, or an ending position of a data block for the user device. In some implementations, the position information includes the index to the block number. In some implementations, the position information includes the number of information bits of the data block or field and/or the size of the data block or field. In some implementations, the position information is configured by a higher layer signal. In some implementations, the higher layer signal includes a RRC signaling or MAC CE.

In some implementation, the user device is configured with one data block. In some implementations, a certain number of the fields of the current DCI format 0_1/1_1 in Release 15 are used to indicate various power saving information that includes the various configuration information discussed. In some implementation, the various power saving information is related to the above mentioned functionality indicators. In some implementation, a certain number of the fields of the DCI format 0_1/1_1 in Release 15 include information that can be used to trigger one or more trigger states discussed above. In some implementations, for the user device configured with the DCI, the one or more triggering states of the certain number of fields in the DCI format 0_1/1_1 in Release 15 are enabled by the predefined information in Rel 16 configured by MAC CE or RRC signaling. In some implementation, the predefined information includes at least one of a specific type of RNTI, a specific search space set, a specific search space type, a specific CORESET, a specific PDCCH candidates, a specific CCE AL, a specific timer, a specific PDCCH monitoring period, a specific time/frequency domain resource, a DRX On duration, or an active time. In some implementations, for the user device configured with the DCI, the one or more triggering states in Rel 16 and the original configuration information in Rel 15 of the certain number of fields in the DCI format 0_1/1_1 are used to provide indication simultaneously.

For example, a certain number of the fields in DCI format 1_1 in Rel 15 are used to indicate one or more triggering states for the user device if the DCI is scrambled by PS-RNTI or detected in a PS timer/duration configured by MAC CE or RRC signaling. In some implementations, the certain number of fields in DCI format 1_1 in Rel 15 are used to indicate one or more triggering states for the user device if the RNTI scrambling CRC of DCI format 1_1 in Rel 15 includes at least one of C-RNTI, CS-RNTI, MCS-C-RNTI, or TC-RNTI and the predefined information configured by MAC CE or RRC signal. In some implementations, the certain number of fields in DCI format 1_1 in Rel 15 are used to indicate one or more triggering states for the user device if the PUSCH is scheduled by MAC RAR. In some implementations, the one or more indication information/triggering states corresponding to a certain number of the fields in DCI format 1_1 in Rel 15 with CRC scrambled by C-RNTI are shown in Table 8. In some implementations, the various indication information of a certain number of the fields in DCI format 1_1 in Rel 15 are configurable by the MAC CE or RRC signaling. In some examples, the various indication information of a certain number of the fields in DCI format 1_1 in Rel 15 are configurable by the L1 signaling.

TABLE 8

| Fields in DCI format 1_1 in Rel 15 | Configuration information/ Triggering state in Rel 15 | Another possible Configuration information/Triggering state with predefined information in Rel 16 |
| --- | --- | --- |
| 1. Identifier for DCI formats | 1 bits- The value of this bit field is always set to 1, indicating a DL DCI format | The field can be also used to indicate at least one of the following triggering states simultaneously:<br>1) enabling another configuration information/triggering states of the other fields in this DCI;<br>2) BWP switching operation;<br>3) PDCCH monitoring periodicity switching operation;<br>4) PDCCH skipping;<br>5) specific TCI state or QCL type D<br>6) PDCCH monitoring operation in SCell etc.<br>The field can be also used to indicate at least one of the following triggering states non-simultaneously:<br>1) enabling another configuration information/triggering states of other fields in this DCI;<br>2) wake-up triggering state;<br>3) PDCCH monitoring periodicity switching operation;<br>4) long DRX cycle configuration;<br>5) PDCCH monitoring operation in SCell or PCell;<br>6) search space/CORESET/candidate activation/deactivation;<br>7) a specific TCI state/QCL type D; etc. |
| 2. Carrier indicator | 0 or 3 bits as defined in Subclause 10.1 of [5, TS 38.213] | The field can be also used to indicate at least one of the above mentioned triggering states in of the information related to the above mentioned functionalities simultaneously, e.g. if the carrier indicator indicates more than one carrier, the user device shall perform PDCCH monitoring in the active SCell. Otherwise, the user device shall perform PDCCH monitoring in the PCell. The field can be also used to indicate at least one of the above-mentioned triggering states in of the information related to the above mentioned functionalities non-simultaneously. |
| 3. Bandwidth part indicator | 0, 1 or 2 bits as determined by the number of DL BWPs $n_{BWP,RRC}$ configured by higher layers, excluding the initial DL bandwidth part. The bitwidth for this field is determined as $\lceil \log_2(n_{BWP}) \rceil$ bits, where $n_{BWP} = n_{BWP,RRC} + 1$ if $n_{BWP,RRC} \leq 3$, in which case the bandwidth part indicator is equivalent to the ascending order of the higher layer parameter BWP-Id; otherwise $n_{BWP} = n_{BWP,RRC}$, in which case the bandwidth part indicator is defined in Table 7.3.1.1.2-1 in TS 38.212; | The field can be also used to indicate at least one of the above mentioned triggering states in of the information related to the above mentioned functionalities simultaneously, e.g. if the field indicates a BWP larger than the initial BWP, the minimum value of k0 and the minimum value of A-CSI-RS trigger offset is larger than 0. otherwise, the minimum value of k0 and the the minimum value of A-CSI-RS trigger offset is equal to 0.<br>The field can be also used to indicate at least one of the above-mentioned triggering states of the information related to the above mentioned functionalities non-simultaneously. E.g., the CRC of the DCI format is scrambled by a PS-RNTI. If the field is only used to indicate |

TABLE 8-continued

| Fields in DCI format 1_1 in Rel 15 | Configuration information/ Triggering state in Rel 15 | Another possible Configuration information/Triggering state with predefined information in Rel 16 |
|---|---|---|
| 4. Frequency domain resource assignment | number of bits determined by the following, where $N_{RB}^{DL, BWP}$ is the size of the active DL bandwidth part: $N_{RBG}$ bits if only resource allocation type 0 is configured $\lceil \log_2(N_{RB}^{DL, BWP}(N_{RB}^{DL, BWP} + 1)/2) \rceil$ bits if only resource allocation type 1 is configured, or $\max(\lceil \log_2(N_{RB}^{DL, BWP}(N_{RB}^{DL, BWP} + 1)/2) \rceil, N_{RBG}) + 1$ bits if both resource allocation type 0 and 1 are configured. If both resource allocation type 0 and 1 are configured, the MSB bit is used to indicate resource allocation type 0 or resource allocation type 1, where the bit value of 0 indicates resource allocation type 0 and the bit value of 1 indicates resource allocation type 1. For resource allocation type 0, the $N_{RBG}$ LSBs provide the resource allocation For resource allocation type 1, the $\lceil \log_2(N_{RB}^{DL, BWP}(N_{RB}^{DL, BWP} + 1)/2 \rceil$ LSBs provide the resource allocation | BWP that the user device is needed to perform BWP switching. It the $N_{RB}^{DL, BWP}$ is smaller than the maximum number of RB in DL BWP, the reminding bits after $\lceil \log_2(N_{RB}^{DL, BWP}(N_{RB}^{DL, BWP} + 1)/2) \rceil$ bits and X padding bits(if required) can be also transmitted and used to indicate at least one of the following indications: (wherein X is used to align the bit width with the maximum length of this field.) 1) 1 bit- Wake-up, go-to-sleep or skipping triggering states; 2) 2~4 bits- PDCCH skipping/sleeping duration or the number of skipping DRX monitoring; 3) 1~2 bits - BWP indicator or BWP switching; 4) N1 bits- CCE AL/search space/CORESET/candidate activation/ deactivation; (wherein N1 > 1.) 5) N2 bits - information of time domain resource allocation; (wherein N2 > 1) 6) N3 bits - Triggering RS transmission; (wherein N3 ≥ 1) 7) N4 bits - PDCCH monitoring periodicity switching; (wherein N4 ≥ 2) 8) N5 bits - spatial information adaptation; (wherein N5 ≥ 1) 9) 1~2 bits- a PDCCH monitoring operation in SCell or PCell; 10) 1~2 bits - QCL information indication; 11) 2 bits - TCI states/QCL type indicator; 12) 1 bits - CSI report; etc. |
| 5. Time domain resource assignment | 0, 1, 2, 3, or 4 -bits The bitwidth for this field is determined as $\lceil \log_2(1) \rceil$ bits, where I is the number of entries in the higher layer parameter pdsch-TimeDomainAllocationList if the higher layer parameter is configured; otherwise I is the number of entries in the default table. The field value m of the DCI provides a row index m + 1 to an allocation table. The indexed row defines the slot offset Ko, the start and length indicator SLIV, or directly the start symbol S and the allocation length L, and the PDSCH mapping type to be assumed in the PDSCH reception | The field can be also used to indicate the following triggering states simultaneously: 4 bits - indicates the row index of another time domain resource allocation tables configured by RRC signaling. The field can be also used to indicate the following triggering states non-simultaneously: 1) 4 bits - indicates the row index of another time domain resource allocation tables configured by RRC signaling; 2) 4 bits - indicates the table index of multiple time domain resource allocation tables configured by RRC signaling; |
| 6. VRB-to-PRB mapping | 0 or 1 0 bit if only resource allocation type 0 is configured or if interleaved VRB-to-PRB mapping is not configured by high layers; 1 bit according to Table 7.3.1.1.2-33 in TS | The field can be also used to indicate at least one of the following triggering states simultaneously: 1) '0' indicates a non BWP switching or switching to a default/initial/small BWP; '1' indicates a BWP switching. |

TABLE 8-continued

| Fields in DCI format 1_1 in Rel 15 | Configuration information/ Triggering state in Rel 15 | Another possible Configuration information/Triggering state with predefined information in Rel 16 |
|---|---|---|
| | 38.212 otherwise, only applicable to resource allocation type 1. | 2) '0' indicates a non PDCCH monitoring periodicity switching; '1' indicates a PDCCH monitoring periodicity switching.<br>3) '0' indicates a search space/CORESET/candidate deactivation; '1' indicates a search space/CORESET/candidate activation.<br>4) '1' indicates a CSI report.<br>5) a specific TCI state or QCL type indicator<br>6) '1' indicates a TCI activation/deactivation.<br>7) '0' indicates PDCCH skipping; '1' indicates non PDCCH skipping.<br>8) '0' indicates to decrease a certain number of antenna ports or the maximum number of MIMO layers; '1' indicates to increase a certain number of antenna ports or the maximum number of MIMO layers; etc. |
| 7. PRB bundling size indicator | 0 bit if the higher layer parameter prb-BundlingType is not configured or is set to 'static', or 1 bit if the higher layer parameter prb-BundlingType is set to 'dynamic' | The field can be reused to indicate the information in Rel 15 or the information in Rel 16. |
| 8. Rate matching indicator | 0, 1, or 2 bits according to higher layer parameters rateMatchPatternGroup1 and rateMatchPatternGroup2, where the MSB is used to indicate rateMatchPatternGroup1 and the LSB is used to indicate rateMatchPatternGroup2 when there are two groups. | The field can be reused to indicate the information in Rel 15 or the information in Rel 16. |
| 9. ZP CSI-RS trigger | 0, 1, or 2 bits - The bitwidth for this field is determined as $\lceil \log_2(n_{ZP} + 1) \rceil$ bits, where $n_{ZP}$ is the number of ZP CSI-RS resource sets in the higher layer parameter zp-CSI-RS-Resource. | The field can be reused to indicate the information in Rel 15 or the information in Rel 16. |
| 10. Modulation and coding scheme for transport block 1 | 5 bits - indicates the index of Table 5.1.3.1-1/2/3 to determine the modulation order ($Q_m$) and target code rate (R) in TS 38.214 | The field can be reused to indicate the information in Rel 15. Or the field can be also used to indicate at least one of the above mentioned triggering states in of the information related to the above mentioned functionalities simultaneously, e.g. if the spectrum efficiency ($Q_m *R$) is larger than a $Thrd_{SE}$ the user device shall switching BWP to a larger BWP.<br>The field can be also used to indicate at least one of the above mentioned triggering states of the information related to the above mentioned functionalities non-simultaneously. |
| 11. New data indicator for transport block 1 | 1 bit | The field can be reused to indicate the information in Rel 15. The field can be also used to indicate at least one of the following triggering states simultaneously:<br>If there is a new transmission, the field indicates at least one of the |

TABLE 8-continued

| Fields in DCI format 1_1 in Rel 15 | Configuration information/Triggering state in Rel 15 | Another possible Configuration information/Triggering state with predefined information in Rel 16 |
| --- | --- | --- |
| | | following:<br>1) PDCCH monitoring in SCell;<br>2) BWP switching;<br>3) PDCCH monitoring periodicity switching.<br>4) a search space/CORESET/candidate deactivation.<br>5) CSI report;<br>6) a specific TCI state or QCL type indicator<br>7) non PDCCH skipping<br>8) a search space/CORESET/candidate activation.<br>9) adjust the spatial domain value; etc.<br>Otherwise, the field indicates at least one of the following:<br>1) PDCCH monitoring in SCell.<br>2) BWP switching.<br>3) PDCCH monitoring periodicity switching;<br>4) a search space/CORESET/candidate activation.<br>5) CSI report;<br>6) another specific TCI state or QCL type indicator<br>10) PDCCH skipping; etc.<br>The field can be also used to indicate at least one of the above mentioned triggering states of the information related to the above mentioned functionalities non-simultaneously. |
| 12. Redundancy version for transport block 1 | 2 bits | The field can be reused to indicate the information in Rel 15. If there is a new transmission, the field indicates at least one of the following non-simultaneously:<br>1) PDCCH monitoring in SCell.<br>2) BWP switching.<br>3) PDCCH monitoring periodicity switching;<br>4) a search space/CORESET/candidate deactivation;<br>5) CSI report;<br>6) a specific TCI state or QCL type indicator<br>7) non PDCCH skipping<br>8) a search space/CORESET/candidate activation/deactivation.<br>The spatial information adaptation; etc. |
| 13. Modulation and coding scheme for transport block 2 | 5 bits - indicates the index of Table 5.1.3.1-1/2/3 to determine the modulation order ($Q_m$) and target code rate (R) in TS 38.214 | If the CRC of the DCI format is scrambled by a PS-RNTI or the DCI format is transmitted in the predefined resource set, this field shall be not included.<br>Or if the CRC of the DCI format is scrambled by a PS-RNTI or the DCI format is transmitted in the predefined resource set, this field shall be used to indicate the indication information about the above mentioned functionalities. |
| 14. New data indicator for transport block 2 | 1 bit | If the CRC of the DCI format is scrambled by a PS-RNTI or the DCI format is transmitted in the predefined resource set, this field shall be not included.<br>Or if the CRC of the DCI format is scrambled by a PS-RNTI or the |

TABLE 8-continued

| Fields in DCI format 1_1 in Rel 15 | Configuration information/ Triggering state in Rel 15 | Another possible Configuration information/Triggering state with predefined information in Rel 16 |
|---|---|---|
| | | DCI format is transmitted in the predefined resource set, this field shall be used to indicate the indication information about the above mentioned functionalities. |
| 15. Redundancy version for transport block 2 | 2 bits as defined in Table 7.3.1.1.1-2 in TS 38.212 | If the CRC of the DCI format is scrambled by a PS-RNTI, this field shall be not included. Or if there is a new transmission, the field indicates at least one of the following:<br>1) PDCCH monitoring in SCell.<br>2) BWP switching.<br>3) a PDCCH monitoring periodicity switching to a frequent PDCCH monitoring behavior.<br>4) a search space/CORESET/candidate deactivation.<br>5) a CSI report;<br>6) a specific TCI state or QCL type indicator<br>7) non PDCCH skipping<br>8) a search space/CORESET/candidate activation/deactivation.<br>9) The spatial information adaptation; |
| 16. HARQ process number | 4 bits | If there is a new transmission, the field indicates at least one of the following:<br>1) PDCCH monitoring in SCell.<br>2) BWP switching.<br>3) a PDCCH monitoring periodicity switching to a frequent PDCCH monitoring behavior.<br>4) a search space/CORESET/candidate deactivation.<br>5) a CSI report;<br>6) a specific TCI state or QCL type indicator<br>7) non PDCCH skipping<br>8) a search space/CORESET/candidate activation/deactivation.<br>9) The spatial information adaptation; |
| 17. Downlink assignment index | 4 bits if more than one serving cell are configured in the DL and the higher layer parameter pdsch-HARQ-ACK-Codebook = dynamic, where the 2 MSB bits are the counter DAI and the 2 LSB bits are the total DAI; 2 bits if only one serving cell is configured in the DL and the higher layer parameter pdsch-HARQ-ACK-Code book = dynamic, where the 2 bits are the counter DAI; 0 bits otherwise | If there are no data configuration, the field indicates at least one of the following:<br><br>1) PDCCH monitoring in SCell.<br>2) BWP switching.<br>3) a PDCCH monitoring periodicity switching.<br>4) a search space/CORESET/candidate activation/deactivation.<br>5) a CSI report;<br>6) a specific TCI state or QCL type indicator<br>7) non PDCCH skipping<br>8) a search space/CORESET/candidate activation/deactivation.<br>9) the spatial information adaptation. |
| 18. TPC command for scheduled PUCCH | 2 bits - is a TPC command value active UL BWP b of carrier f of the primary cell c that the UE detects for PUCCH transmission occasion i | If the TPC is not adjusted at this time, the field indicates at least one of the following non-simultaneously:<br>1) PDCCH monitoring in SCell.<br>2) BWP switching. |

TABLE 8-continued

| Fields in DCI format 1_1 in Rel 15 | Configuration information/ Triggering state in Rel 15 | Another possible Configuration information/Triggering state with predefined information in Rel 16 |
|---|---|---|
| | | 3) a PDCCH monitoring periodicity switching. 4) a search space/CORESET/candidate activation/deactivation. 5) a CSI report; 6) a specific TCI state or QCL type indicator 7) non PDCCH skipping 8) a search space/CORESET/candidate activation/deactivation. the spatial information adaptation; etc |
| 19. PUCCH resource indicator | 3 bits is mapped to values of a set of PUCCH resource indexes, as defined in Table 9.2.3-2 in TS 38.213, provided by ResourceList for PUCCH resources from a set of PUCCH resources provided by PUCCH-ResourceSet with a maximum of eight PUCCH resources. | If there are no PUCCH transmission, the field indicates at least one of the following: 1) PDCCH monitoring in SCell. 2) BWP switching. 3) a PDCCH monitoring periodicity switching. 4) a search space/CORESET/candidate activation/deactivation. 5) a CSI report; 6) a specific TCI state or QCL type indicator 7) non PDCCH skipping 8) a search space/CORESET/candidate activation/deactivation. 9) the spatial information adaptation. |
| 20. PDSCH-to-HARQ_feedback timing indicator | 0, 1, 2, or 3 bits as defined in Subclause 9.2.3 of [5, TS 38.213]. The bitwidth for this field is determined as $\lceil \log_2(I) \rceil$ bits, where I is the number of entries in the higher layer parameter dl-DataToUL-ACK. | The field can be reused to indicate the information in Rel 15 or the information in Rel 16. |
| 21. Antenna port(s) | 4, 5, or 6 bits as defined by Tables 7.3.1.2.2-1/2/3/4 in TS 38.212. The antenna ports $\{p_0, \ldots, p_{v-1}\}$ shall be determined according to the ordering of DMRS port(s) given by Tables 7.3.1.2.2-1/2/3/4 in TS 38.212. | The field can be reused to indicate the information in Rel 15. Or if the CRC of the DCI format is scrambled by a PS-RNTI or the DCI format is transmitted in the predefined resource set, this field shall be used to indicate a set of antenna ports number or a antenna ports number from the multiple or single list of antenna ports number configured by RRC signaling respectively. |
| 22. Transmission configuration indication | 0 bit if higher layer parameter tci-PresentInDCI is not enabled; otherwise 3 bits as defined in Subclause 5.1.5 of [6, TS38.214] | The field can be reused to indicate the information in Rel 15. Or if the CRC of the DCI format is scrambled by a PS-RNTI or the DCI format is transmitted in the predefined resource set, this field shall be used to indicate a set of TCI states or a TCI state from the multiple or single list of antenna ports number configured by RRC signaling respectively. |
| 23. SRS request | 2 bits as defined by Table 7.3.1.1.2-24 for UEs not configured with SUL in the cell; 3 bits for UEs configured SUL in the cell where the first bit is the non-SUL/SUL indicator as defined in Table 7.3.1.1.1-1 and the second and third bits are defined by Table 7.3.1.1.2-24. This bit | The field can be reused to indicate the information in Rel 15. Or if the CRC of the DCI format is scrambled by a PS-RNTI or the DCI format is transmitted in the predefined resource set, this field shall be used to indicate a subset of SRS request information or SRS request from the multiple or |

TABLE 8-continued

| Fields in DCI format 1_1 in Rel 15 | Configuration information/ Triggering state in Rel 15 | Another possible Configuration information/Triggering state with predefined information in Rel 16 |
|---|---|---|
| | field may also indicate the associated CSI-RS according to Subclause 6.1.1.2 of [6, TS 38.214]. | single list of antenna ports number configured by RRC signaling respectively. |
| 24. CBG transmission information (CBGTI) | 0, 2, 4, 6, or 8 bits as defined in Subclause 5.1.7 of [6, TS38.214], determined by the higher layer parameters maxCodeBlockGroupsPerTransportBlock and Number-MCS-HARQ-DL-DCI for the PDSCH. | If the CRC of the DCI format is scrambled by a PS-RNTI, this field shall be not included. Or if the CRC of the DCI format is scrambled by a PS-RNTI or the DCI format is transmitted in the predefined resource set, this field shall be used to indicate a wake up operation or other indication information related to the above mentioned functionalities. |
| 25. CBG flushing out information (CBGFI) | 0 or 1 bit as defined in Subclause 5.1.7 of [6, TS38.214], determined by higher layer parameter codeBlockGroupFlushIndicator. | If the CRC of the DCI format is scrambled by a PS-RNTI, this field shall be not included. Or if the CRC of the DCI format is scrambled by a PS-RNTI or the DCI format is transmitted in the predefined resource set, this field shall be used to indicate a wake up operation or other indication information related to the above mentioned functionalities. |
| 26. DMRS sequence initialization | 1 bit | The field can be reused to indicate the information in Rel 15. Or if the CRC of the DCI format is scrambled by a PS-RNTI or the DCI format is transmitted in the predefined resource set, this field shall be used to indicate a wake up operation. |

In some implementations, at least one of the fields in Table 8 can be used to indicate the another indication information according to the predefined resource set configured by MAC CE or RRC signaling. In some implementations, at least one of the fields in Table 8 can be used to indicate the current and another indication information according to the predefined resource set configured by MAC CE or RRC signaling. In some implementations, at least one of the fields in DCI format 1_1 except for the fields with index of {13, 14, 15, 24, 25} is used for the various configuration information simultaneously configured by RRC signaling. In some implementations, at least one of the fields with index of {1, 2, 3, 4, 5, 6, 10, 11} in Table 8 in DCI format 1_1 is used for various configuration information simultaneously configured by RRC signaling. In some implementations, the field of Modulation and coding scheme for TB 2, New data indicator for TB 2, Redundancy version for TB 2, CBG transmission information, and CBG flushing information are not included in the enhanced DCI format 1_1 if the predefined configuration is configured by RRC.

For example, a certain number of the fields in DCI format 0_1 in Rel 15 are used to indicate one or more triggering states for the user device if the DCI is scrambled by PS-RNTI or detected in a PS timer/duration configured by MAC CE or RRC signaling. In some implementations, the certain number of fields in DCI format 0_1 in Rel 15 are used to indicate one or more triggering states for the user device if the RNTI scrambling CRC of DCI format 0_1 in Rel 15 includes at least one of C-RNTI, CS-RNTI, MCS-C-RNTI, or TC-RNTI and the predefined information configured by MAC CE or RRC signaling. In some implementations, the certain number of fields in DCI format 0_1 in Rel 15 are used to indicate one or more triggering states for the user device if the PUSCH is scheduled by MAC RAR. The one or more indication information/triggering states corresponding to a certain number of the fields in DCI format 0_1 in Rel 15 with CRC scrambled by C-RNTI are shown in Table 9. In some implementations, the various indication information of a certain number of the fields in DCI format 0_0 in Rel 15 are configurable by the MAC CE or RRC signaling. In some examples, the various indication information of a certain number of the fields in DCI format 0_1 in Rel 15 are configurable by the L1 signaling.

TABLE 9

| Fields in DCI format 0_1 in Rel 15 | Configuration information/Triggering state in Rel 15 | Another possible Configuration information/Triggering state with predefined information under a predefined configuration in Rel 16 |
|---|---|---|
| 1. Identifier for DCI formats | 1 bits-The value of this bit field is always set to 0, indicating an UL DCI format | The field can be also used to indicate at least one of the following triggering states simultaneously: 1) enabling another configuration information/triggering states of the other fields in this DCI; |

TABLE 9-continued

| Fields in DCI format 0_1 in Rel 15 | Configuration information/Triggering state in Rel 15 | Another possible Configuration information/Triggering state with predefined information under a predefined configuration in Rel 16 |
|---|---|---|
| | | 2) BWP switching operation;<br>3) PDCCH monitoring periodicity switching operation;<br>4) PDCCH skipping;<br>5) specific TCI state or QCL type D<br>6) PDCCH monitoring operation in SCell etc.<br>7) The field can be also used to indicate at least one of the following triggering states non-simultaneously:<br>8) enabling another configuration information/triggering states of other fields in this DCI;<br>9) wake-up triggering state;<br>10) PDCCH monitoring periodicity switching operation;<br>11) long DRX cycle configuration;<br>12) PDCCH monitoring operation in SCell or PCell;<br>13) search space/CORESET/candidate activation/deactivation;<br>14) a specific TCI state/QCL type D; etc. |
| 2. Carrier indicator | 0 or 3 bits, as defined in Subclause 10.1 of [5, TS38.213] | The field can be also used to indicate at least one of the above mentioned triggering states of the information related to the above mentioned functionalities simultaneously, e.g. if the carier indicator indicates more than one carrier, the user device shall perform PDCCH monitoring in the active SCell. Otherwise, the user device shall perform PDCCH monitoring in the PCell.<br>The field can be also used to indicate at least one of the above mentioned triggering states of the information related to the above mentioned functionalities non-simultaneously. |
| 3. UL/SUL indicator | 0 bit for UEs not configured with SUL in the cell or UEs configured with SUL in the cell but only PUCCH carrier in the cell is configured for PUSCH transmission; 1 bit for UEs configured with SUL in the cell as defined in Table 7.3.1.1.1-1 in TS 38.212. | The field can be also used to indicate at least one of the following triggering states simultaneously:<br>1) '0' indicates a non BWP switching or switching to a default/initial/small BWP; '1' indicates a BWP switching.<br>2) '0' indicates a non PDCCH monitoring periodicity switching; '1' indicates a PDCCH monitoring periodicity switching.<br>3) '0' indicates a search space/CORESET/candidate deactivation; '1' indicates a search space/CORESET/candidate activation.<br>4) '1' indicates a CSI report.<br>5) a specific TCI state or QCL type indicator<br>6) '1' indicates a TCI activation/deactivation.<br>7) '0' indicates PDCCH skipping; '1' indicates non PDCCH skipping.<br>8) '0' indicates to decrease a certain number of antenna ports or the maximum number of MIMO layers; '1' indicates to increase a certain number of antenna ports or the maximum number of MIMO layers; etc.<br>The field can be also used to indicate at least one of the above mentioned triggering states of the information related to the above mentioned functionalities non-simultaneously. |
| 4. Bandwidth part indicator | 0, 1 or 2 bits as determined by the number of UL BWPs $n_{BWP,RRC}$ configured by higher layers, excluding the initial UL bandwidth part. The bitwidth for this field is determined as $\lceil \log_2(n_{BWP}) \rceil$ bits, where $n_{BWP} = n_{BWP,RRC} + 1$ if $n_{BWP,RRC} \leq 3$, in which case the bandwidth part indicator is equivalent to the ascending order of the higher layer parameter BWP-Id; | The field can be also used to indicate at least one of the above mentioned triggering states of the information related to the above mentioned functionalities simultaneously, e.g. if the field indicates a BWP larger than the initial BWP, the minimum value of k0 and the minimum value of A-CSI-RS trigger offset is larger than 0. otherwise, the the minimum value of k0 and the minimum value of A-CSI-RS trigger offset is equal to 0.<br>The field can be also used to indicate at least one of the above mentioned triggering states of the information related to the above mentioned functionalities non-simultaneously. E.g., the CRC |

TABLE 9-continued

| Fields in DCI format 0_1 in Rel 15 | Configuration information/Triggering state in Rel 15 | Another possible Configuration information/Triggering state with predefined information under a predefined configuration in Rel 16 |
| --- | --- | --- |
| | otherwise $n_{BWP} = n_{BWP,RRC}$, in which case the bandwidth part indicator is defined in Table 7.3.1.1.2-1 in TS 38.212; | of the DCI format is scrambled by a PS-RNTI. If the field is only used to indicate BWP that the user device is needed to perform BWP switching. |
| 5. Frequency domain resource assignment | number of bits determined by the following, where $N_{RB}^{UL,BWP}$ is the size of the active UL bandwidth part: $N_{RBG}$ bits if only resource allocation type 0 is configured, where $N_{RBG}$ is defined in Subclause 6.1.2.2.1 of [6, TS 38.214], $\lceil \log_2(N_{RB}^{UL,BWP}(N_{RB}^{UL,BWP} + 1)/2) \rceil$ bits if only resource allocation type 1 is configured, or $\max(\lceil \log_2(N_{RB}^{UL,BWP}(N_{RB}^{UL,BWP} + 1)/2) \rceil, N_{RBG}) + 1$ bits if both resource allocation type 0 and 1 are configured. | If the $N_{RB}^{UL,BWP}$ is smaller than the maximum number of RB in DL BWP, the reminding bits after $\lceil \log_2(N_{RB}^{UL,BWP}(N_{RB}^{UL,BWP} + 1)/2) \rceil$ bits and X padding bits (if required) can be also transmitted and used to indicate at least one of the following indications: (wherein X is used to align the bit width with the maximum length of this field.)<br>1) 1 bit-Wake-up, go-to-sleep or skipping triggering states;<br>2) 2~4 bits-PDCCH skipping/sleeping duration or the number of skipping DRX monitoring;<br>3) 1~2 bits-BWP indicator or BWP switching;<br>4) N1 bits-CCE AL/search space/CORESET/candidate activation/deactivation; (wherein N1 > 1.)<br>5) N2 bits-information of time domain resource allocation; (wherein N2 > 1)<br>6) N3 bits-Triggering RS transmission; (wherein N3 ≥ 1)<br>7) N4 bits-PDCCH monitoring periodicity switching; (wherein N4 ≥ 2)<br>8) N5 bits-spatial information adaptation; (wherein N5 ≥ 1)<br>9) 1~2 bits-a PDDCH monitoring operation in SCell or PCell;<br>10) 1~2 bits-QCL information indication;<br>11) 2 bits-TCI states/QCL type indicator;<br>12) 1 bits-CSI report; etc. |
| 6. Time domain resource assignment | 0, 1, 2, 3, or 4 bits-The bitwidth for this field is determined as $\lceil \log_2(I) \rceil$ bits, where I is the number of entries in the higher layer parameter pusch-TimeDomainAllocationList if the higher layer parameter is configured; otherwise I is the number of entries in the default table. The field value m of the DCI provides a row. index m + 1 to an allocation table. The indexed row defines the slot offset $K_2$, the start and length indicator SLIV, or directly the start symbol S and the allocation length L, and the PUSCH mapping type to be applied in the PUSCH transmission. | The field can be also used to indicate the following triggering states simultaneously:<br>4 bits-indicates the row index of another time domain resource allocation tables configured by RRC signaling.<br>The field can be also used to indicate the following triggering states non-simultaneously:<br>1) 4 bits-indicates the row index of another time domain resource allocation tables configured by RRC signaling;<br>2) 4 bits-indicates the table index of multiple time domain resource allocation tables configured by RRC signaling; |
| 7. Frequency hopping flag | 0 or 1 bit<br>0 bit if only resource allocation type 0 is configured or if the higher layer parameter frequencyHopping is not configured;<br>1 bit according to Table 7.3.1.1.1-3 otherwise, only applicable to resource allocation type 1, as defined in Subclause 6.3 of [6, TS 38.214]. | The field can be also used to indicate at least one of the following triggering states simultaneously:<br>1) '0' indicates a non BWP switching or switching to a default/initial/small BWP; '1' indicates a BWP switching.<br>2) '0' indicates a non PDCCH monitoring periodicity switching; '1' indicates a PDCCH monitoring periodicity switching.<br>3) '0' indicates a search space/CORESET/candidate deactivation; '1' indicates a search space/CORESET/candidate activation.<br>4) '1' indicates CSI report.<br>5) a specific TCI state or QCL type indicator<br>6) '1' indicates a TCI activation/deactivation.<br>7) '0' indicates PDCCH skipping; '1' indicates non PDCCH skipping. |

TABLE 9-continued

| Fields in DCI format 0_1 in Rel 15 | Configuration information/Triggering state in Rel 15 | Another possible Configuration information/Triggering state with predefined information under a predefined configuration in Rel 16 |
|---|---|---|
| 8. Modulation and coding scheme | 5 bits-indicates the index of Table 5.1.3.1-1/2/3 to determine the modulation order ($Q_m$) and target code rate (R) in TS 38.214 | 8) '0' indicates to decrease a certain number of antenna ports or the maximum number of MIMO layers; '1' indicates to increase a certain number of antenna ports or the maximum number of MIMO layers; etc.<br>The field can be also used to indicate at least one of the above mentioned triggering states of the information related to the above mentioned functionalities simultaneously, e.g. if the spectrum efficiency (Qm *R) is larger than a $Thrd_{SE}$ the user device shall switching BWP to a larger BWP.<br>The field can be also used to indicate at least one of the above mentioned triggering states of the information related to the above mentioned functionalities non-simultaneously. |
| 9. New data indicator | 1 bit | The field can be also used to indicate at least one of the following triggering states simultaneously:<br>If there is a new transmission, the field indicates at least one of the following:<br>1) PDCCH monitoring in SCell;<br>2) BWP switching;<br>3) PDCCH monitoring periodicity switching.<br>4) a search space/CORESET/candidate deactivation.<br>5) CSI report;<br>6) a specific TCI state or QCL type indicator<br>7) non PDCCH skipping<br>8) a search space/CORESET/candidate activation.<br>9) adjust the spatial domain value; etc.<br>Otherwise, the field indicates at least one of the following:<br>8) PDCCH monitoring in SCell.<br>9) BWP switching.<br>10) PDCCH monitoring periodicity switching;<br>11) a search space/CORESET/candidate activation.<br>12) CSI report;<br>13) another specific TCI state or QCL type indicator<br>14) PDCCH skipping; etc.<br>The field can be also used to indicate at least one of the above mentioned triggering states of the information related to the above mentioned functionalities non-simultaneously. |
| 10. Redundancy version | 2 bits as defined in Table 7.3.1.1.1-2 in TS 38.212 | If there is a new transmission, the field indicates at least one of the following non-simultaneously:<br>1) PDCCH monitoring in SCell.<br>2) BWP switching.<br>3) PDCCH monitoring periodicity switching;<br>4) a search space/CORESET/candidate deactivation;<br>5) CSI report;<br>6) a specific TCI state or QCL type indicator<br>7) non PDCCH skipping<br>8) a search space/CORESET/candidate activation/deactivation.<br>9) The spatial information adaptation; etc. |
| 11. HARQ process number | 4 bits | If there is a new transmission, the field indicates at least one of the following non-simultaneously:<br>1) PDCCH monitoring in SCell.<br>2) BWP switching.<br>3) a PDCCH monitoring periodicity switching to a frequent PDCCH monitoring behavior.<br>4) a search space/CORESET/candidate deactivation.<br>5) a CSI report;<br>6) a specific TCI state or QCL type indicator<br>7) non PDCCH skipping<br>8) a search space/CORESET/candidate activation/deactivation;<br>9) The spatial information adaptation; etc. |

TABLE 9-continued

| Fields in DCI format 0_1 in Rel 15 | Configuration information/Triggering state in Rel 15 | Another possible Configuration information/Triggering state with predefined information under a predefined configuration in Rel 16 |
|---|---|---|
| 12. 1st downlink assignment index | 1 or 2 bits-<br>1 bit for semi-static HARQ-ACK codebook;<br>2 bits for dynamic HARQ-ACK codebook. | The field can be reused to indicate the information in Rel 15 or the information in Rel 16. |
| 13. 2nd downlink assignment index | 0 or 2 bits<br>2 bits for dynamic HARQ-ACK codebook with two HARQ-ACK sub-codebooks;<br>0 bit otherwise. | If the CRC of the DCI format is scrambled by a PS-RNTI or the DCI format is transmitted in the predefined configuration, this field shall be not included.<br>Or if the CRC of the DCI format is scrambled by a PS-RNTI or the DCI format is transmitted in the predefined resource set, this field shall be used to indicate a wake up operation or other indication information related to the above mentioned functionalities. |
| 14. TPC command for scheduled PUSCH | 2 bits-is a TPC command value active UL BWP b of carrier f of the primary cell c that the UE detects for PUCCH transmission occasion i | If the TPC is not adjusted at this time, the field indicates at least one of the following non-simultaneously:<br>1) PDCCH monitoring in SCell.<br>2) BWP switching.<br>3) a PDCCH monitoring periodicity switching.<br>4) a search space/CORESET/candidate activation/deactivation.<br>5) a CSI report;<br>6) a specific TCI state or QCL type indicator<br>7) non PDCCH skipping<br>8) a search space/CORESET/candidate activation/deactivation.<br>the spatial information adaptation; etc |
| 15. SRS resource indicator | $\left\lceil \log_2\left( \sum_{k=1}^{\min\{L_{max},N_{SRS}\}} \binom{N_{SRS}}{k} \right) \right\rceil$<br>or $\lceil \log_2(N_{SRS}) \rceil$ bits, where $N_{SRS}$ is the number of configured SRS resources in the SRS resource set associated with the higher layer parameter usage of value 'codeBook' or 'nonCodeBook', and $L_{max}^{PUSCH}$ is the maximum number of supported layers for the PUSCH. | The field can be reused to indicate the information in Rel 15 or the information in Rel 16. |
| 16. Precoding information and number of layers | 0~6 bits-number of bits determined by the specification in TS 38.212. | The field can be reused to indicate the information in Rel 15.<br>Or if the CRC of the DCI format is scrambled by a PS-RNTI or the DCI format is transmitted in the predefined resource set, this field shall be used to indicate a set of precoding information and/or MIMO layers number or a precoding information and/or MIMO layers number from the multiple or single list of precoding information and/or MIMO layers number parameters configured by RRC signaling respectively. |
| 17. Antenna ports | 2~5 bits-number of bits determined by the description in TS 38.212. | The field can be reused to indicate the information in Rel 15.<br>Or if the CRC of the DCI format is scrambled by a PS-RNTI or the DCI format is transmitted in the predefined resource set, this field shall be used to indicate a set of antenna ports number or a antenna ports number from the multiple or single list of antenna ports number configured by RRC signaling respectively. |
| 18. SRS request | 2 bits as defined by Table 7.3.1.1.2-24 for UEs not configured with SUL in the cell; 3 bits for UEs configured SUL in the cell where the first bit is the non-SUL/SUL indicator as defined in Table 7.3.1.1.1-1 | The field can be reused to indicate the information in Rel 15.<br>Or if the CRC of the DCI format is scrambled by a PS-RNTI or the DCI format is transmitted in the predefined resource set, this field shall be used to indicate a subset of SRS request information or SRS request from the multiple or single list of antenna ports number configured by RRC |

TABLE 9-continued

| Fields in DCI format 0_1 in Rel 15 | Configuration information/Triggering state in Rel 15 | Another possible Configuration information/Triggering state with predefined information under a predefined configuration in Rel 16 |
|---|---|---|
| | and the second and third bits are defined by Table 7.3.1.1.2-24. This bit field may also indicate the associated CSI-RS according to Subclause 6.1.1.2 of [6, TS 38.214]. | signaling respectively. |
| 19. CSI request | 0, 1, 2, 3, 4, 5, or 6 bits determined by higher layer parameter reportTriggerSize. | The field can be reused to indicate the information in Rel 15. Or if the CRC of the DCI format is scrambled by a PS-RNTI or the DCI format is transmitted in the predefined resource set, this field shall be used to indicate a subset of CSI request information or CSI request from the multiple or single list of antenna ports number configured by RRC signaling respectively. |
| 20. CBG transmission information (CBGTI) | 0, 2, 4, 6, or 8 bits determined by higher layer parameter maxCodeBlockGroupsPerTransportBlock for PUSCH. | If the CRC of the DCI format is scrambled by a PS-RNTI, this field shall be not included. |
| 21. PTRS-DMRS association | 0/2 bits-number of bits determined as description in TS 38.212. | The field can be reused to indicate the information in Rel 15. Or if the CRC of the DCI format is scrambled by a PS-RNTI or the DCI format is transmitted in the predefined resource set, this field shall be used to indicate a wake up operation or other indication information related to the above mentioned functionalities. |
| 22. beta_offset indicator | 0 if the higher layer parameter betaOffsets = semiStatic; otherwise 2 bits as defined by Table 9.3-3 in TS 38.213. | The field can be reused to indicate the information in Rel 15. Or if the CRC of the DCI format is scrambled by a PS-RNTI or the DCI format is transmitted in the predefined resource set, this field shall be used to indicate a wake up operation or other indication information related to the above mentioned functionalities. |
| 23. DMRS sequence initialization | 0 bit if transform precoder is enabled; 1 bit if transform precoder is disabled | The field can be reused to indicate the information in Rel 15. Or if the CRC of the DCI format is scrambled by a PS-RNTI or the DCI format is transmitted in the predefined resource set, this field shall be used to indicate a wake up operation or other indication information related to the above mentioned functionalities. |
| 24. UL-SCH indicator | 1 bit. A value of "1" indicates UL-SCH shall be transmitted on the PUSCH and a value of "0" indicates UL-SCH shall not be transmitted on the PUSCH. A UE is not expected to receive a DCI format 0_1 with UL-SCH indicator of "0" and CSI request of all zero(s). | The field can be reused to indicate the information in Rel 15. Or if the CRC of the DCI format is scrambled by a PS-RNTI or the DCI format is transmitted in the predefined resource set, this field shall be used to indicate a wake up operation or other indication information related to the above mentioned functionalities. |

In some implementations, at least one of the fields in Table 8 can be used to indicate the another indication information according to the predefined resource set configured by MAC CE or RRC signaling. In some implementations, at least one of the fields in Table 8 can be used to indicate the current and another indication information according to the predefined resource set configured by MAC CE or RRC signaling. In some implementations, at least one of the fields in DCI format 0_1 except for the fields with index of {13, 14, 15, 24, 25} is used for the various configuration information simultaneously configured by RRC signaling. In some implementations, at least one of the fields with index of {1, 2, 3, 4, 5, 6, 10, 11} in Table 9 in DCI format 0_1 is used for the various configuration information simultaneously configured by RRC signaling. In some implementations, the field of CBG transmission information is not included in the enhanced DCI format 0_1 if the predefined configuration is configured by RRC.

In some implementations, the presented various configuration information for one field in Table 8 and Table 9 are configurable. For example, one of the various configuration information is available for some cases or a subset of the various configuration information are available for another cases. In some implementations, the fields indicating another configuration/triggering states in the DCI are configured by MAC CE or RRC signaling. In some implementations, the fields can simultaneously indicate both the current configuration information in Rel 15 and the various configuration information for Rel 16 or power saving purpose. In some implementations, the fields can indicate either the current configuration information in Rel 15 or the various configuration information for Rel 16 for power saving purpose based on the MAC CE or RRC signaling configuration. In this way, the resource overhead can be reduced compared with the scheme that adds the triggering states in current DCI format or designs a new DCI.

In some implementations, the structure of the fields in the DCI can be reused for the DCI indicating at least one of the configuration information described above. In some implementations, at least one of the fields is not included in the DCI with CRC scrambled by PS-RNTI or a specific configuration configured by RRC signaling. In some implementations, if the higher layer parameter configuration is used to enable the various configuration information and the DCI with CRC scrambled by PS-RNTI, the various configuration information is not enabled to indicate the user device another operation. In some implementations, if the higher layer parameter configuration is used to disable the various configuration information, the fields in the DCI do not indicate another configuration information. In some implementations, if the higher layer parameter configuration is used to enable the various configuration information and the CRC of the DCI is not scrambled by PS-RNTI, the fields in the DCI do not indicate another configuration information. In some implementations, if the DCI is configured to enable various configuration information of some fields, the other fields are not included in this DCI transmission.

In some implementations, the user device is configured with position information. In some implementations, the position information is used to configure the UE for extracting the triggering state from the DCI information bits. In some implementations, the interpretation of the triggering state of the user device is associated with the position information. In some implementations, the position information includes at least one of a starting position, a length of the information, or an ending position of a data block for the user device. In some implementations, the position information includes the index to the block number. In some implementations, the position information includes the number of information bits of the data block/field or the size of the data block/field. In some implementations, the position information is configured by a higher layer signal. In some implementations, the higher layer signal includes a RRC signaling or MAC CE.

In some implementation, the group of N user devices is configured with M data blocks. In some implementations, N and M are natural positive numbers and equal to each other. In some implementations, a certain number of the fields of the current DCI format 2_0/2_1/2_2/2_3 in Release 15 are used to indicate power saving information that includes various configuration information discussed above. In some implementations, the power saving information is related to the above mentioned functionality indicators. In some implementations, a certain number of the fields of the DCI format 2_0/2_1/2_2/2_3 in Release 15 include the information that can be used to trigger one or more trigger states as discussed above. In some implementations, for the user device configured with the DCI, the one or more triggering states of the certain number of fields in the DCI format 2_0/2_1/2_2/2_3 in Release 15 are enabled by the predefined information in Rel 16 configured by MAC CE or RRC signaling. In some implementations, the predefined information includes at least one of a specific type of RNTI, a specific search space set, a specific search space type, a specific CORESET, a specific PDCCH candidates, a specific CCE AL, a specific timer, a specific PDCCH monitoring period, a specific time/frequency domain resource, a DRX On duration, or an active time. In some implementations, for the user device configured with the DCI, the one or more triggering states in Rel 16 and the original configuration information in Rel 15 of the certain number of fields in the DCI format 2_0/2_1/2_2/2_3 are used to provide indication simultaneously.

For example, a certain number of the fields in DCI format 2_0 in Rel 15 are used to indicate one or more triggering states for the user device if the DCI is scrambled by PS-RNTI or detected in a PS timer/duration configured by MAC CE or RRC signaling. In some implementations, the certain number of SFIs in DCI format 2_0 in Rel 15 are used to indicate one or more triggering states for the certain number of user devices if the RNTI scrambling CRC of DCI format 2_0 in Rel 15 is PS-RNTI or if the RNTI scrambling CRC of DCI format 2_0 in Rel 15 is SFI-RNTI and a predefined information configured by the MAC CE or RRC signaling for a group of user devices. In some implementations, the certain number of SFIs (slot format indicator) in DCI format 2_0 in Rel 15 are used to indicate one or more triggering states for a certain number of user devices when the PUSCH is scheduled by MAC RAR. In some implementations, the one or more indication information/triggering states corresponding to a certain number of the fields in DCI format 2_0 in Rel 15 with CRC scrambled by SFI-RNTI are shown in Table 10. In some examples, the various indication information of a certain number of the fields in DCI format 2_0 in Rel 15 are configurable by the MAC CE or RRC signaling. In some examples, the various indication information of a certain number of the fields in DCI format 2_0 in Rel 15 are configurable by the L1 signaling

TABLE 10

| Fields in DCI format 2_0 in Rel 15 | Configuration information/ Triggering state in Rel 15 | Another possible Configuration information/Triggering state with predefined information in Rel 16 |
| --- | --- | --- |
| Slot format indicator 1, Slot format indicator 2, . . . , Slot format indicator N | The size of DCI format 2_0 is configurable by higher layers up to 128 bits, according to description in TS 38.213 | It can indicate a certain number of triggering states of the information related to the above mentioned functionalities by indicating the reserved entries from 56 to 254 in Table 11.1.1-1 in TS 38.213. e.g. the field is used to indicate the wake-up or go-to-sleep triggering states: In some implementations, the entry of 56 can be used to indicate a go-to-sleep triggering state, the entry of 57 can be used to indicate a wake-up triggering state. e.g. the field is used to indicate the TDRA triggering states: |

TABLE 10-continued

| Fields in DCI format 2_0 in Rel 15 | Configuration information/ Triggering state in Rel 15 | Another possible Configuration information/Triggering state with predefined information in Rel 16 |
|---|---|---|
| | | In some implementations, and the entry of $S1 \sim (S1 + 2^4 - 1)$ can be used to indicate a wake-up triggering state and the row index of time domain resource allocation table configured by MAC CE or RRC signaling, In some implementations, the entry of $S2 \sim (S2 + 2^3 - 1)$ can be used to indicate one or more the minimum values of A-CSI-RS trigger offset value from the set of $\{0, 1, 2, 3, 4, 16, 24\}$ or a subset configured by MAC CE or RRC signaling including at least QCL-Type D property. In some implementations, the entry of $S3 \sim (S3 + 2^5 - 1)$ can be used to indicate one or more A-SRS trigger offset value from the set of $\{1 \sim 32\}$ slots or a subset configured by MAC CE or RRC signaling including at least QCL-Type D property. In some implementations, the entry of $S4 \sim (S4 + 2^3 - 1)$ can be used to indicate one or more k1 values from the set of slot timing values $\{1 \sim 8\}$ or a subset configured by MAC CE or RRC signaling. Wherein S1, S2, S3, S4 are all integers and not smaller than 56. |

For example, a certain number of the fields in DCI format 2_1 in Rel 15 are used to indicate one or more triggering states for the user device if the DCI is scrambled by PS-RNTI or detected in a PS timer/duration configured by MAC CE or RRC signaling. In some implementations, the certain number of fields in DCI format 2_1 in Rel 15 are used to indicate one or more triggering states for N user devices if the RNTI scrambling CRC of DCI format 2_1 in Rel 15 is PS-RNTI or if the RNTI scrambling CRC of DCI format 2_1 in Rel 15 is INT-RNTI and a predefined information configured by the MAC CE or RRC signaling for a group of user devices. In some implementations, the certain number of fields in DCI format 2_1 in Rel 15 are used to indicate one or more triggering states for the user device if the PUSCH is scheduled by MAC RAR. The one or more indication information/triggering states corresponding to a certain number of the fields in DCI format 2_1 in Rel 15 with CRC scrambled by INT-RNTI are shown in Table 11. In some examples, the various indication information of a certain number of the fields in DCI format 2_1 in Rel 15 are configurable by the MAC CE or RRC signaling. In some examples, the various indication information of a certain number of the fields in DCI format 2_1 in Rel 15 are configurable by the L1 signaling

TABLE 11

| Fields in DCI format 2_1 in Rel 15 | Configuration information/ Triggering state in Rel 15 | Another possible Configuration information/Triggering state with predefined information in Rel 16 |
|---|---|---|
| Pre-emption indication 1, Pre-emption indication 2, . . . , Pre-emption indication N. | The size of DCI format 2_1 is configurable by higher layers up to 126 bits, according to Subclause 11.2 of [5, TS 38.213]. Each pre-emption indication is 14 bits. | It can indicate a certain number of triggering states of the indication information related to the above mentioned functionalities in the pre-emption indication. |

For example, a certain number of the fields in DCI format 2_2 in Rel 15 are used to indicate one or more triggering states for the user device if the DCI is scrambled by PS-RNTI or detected in a PS timer/duration configured by MAC CE or RRC signaling. In some implementations, the certain number of fields in DCI format 2_2 in Rel 15 are used to indicate one or more triggering states for the user device if the RNTI scrambling CRC of DCI format 2_2 in Rel 15 is PS-RNTI or if the RNTI scrambling CRC of DCI format 2_2 in Rel 15 is TPC-PUSCH-RNTI or TPC-PUCCH-RNTI and a predefined information configured by the MAC CE or RRC signaling for a group of user devices. In some implementations, the certain number of fields in DCI format 2_2 in Rel 15 are used to indicate one or more triggering states for the user device if the PUSCH is scheduled by MAC RAR. In some implementations, the one or more indication information/triggering states corresponding to a certain number of the fields in DCI format 2_2 in Rel 15 with CRC scrambled by TPC-PUSCH-RNTI or TPC-PUCCH-RNTI are shown in Table 12. In some implementations, the various indication information of a certain number of the fields in DCI format 2_2 in Rel 15 is configurable by the MAC CE or RRC signaling. In some implementations, the various indication information of a certain number of the fields in DCI format 2_2 in Rel 15 are configurable by the L1 signaling

TABLE 12

| Fields in DCI format 2_2 in Rel 15 | Configuration information/ Triggering state in Rel 15 | Another possible Configuration information/Triggering state with predefined information in Rel 16 |
|---|---|---|
| block number 1, block number 2, . . . , block number N | the following fields defined for each block: Closed loop indicator - 0 or 1 bit. TPC command -2 bits | It can indicate a certain number of triggering states of the indication information related to the above mentioned functionalities in each block. |

For example, a certain number of the fields in DCI format 2_3 in Rel 15 are used to indicate other triggering state(s) for the user device if the DCI is scrambled by PS-RNTI or detected in a PS timer/duration configured by MAC CE or RRC signaling. In some implementations, the certain number of fields in DCI format 2_3 in Rel 15 are used to indicate one or more triggering states for the user device if the RNTI scrambling CRC of DCI format 2_3 in Rel 15 is PS-RNTI or if the RNTI scrambling CRC of DCI format 2_3 in Rel 15 is TPC-SRS-RNTI and a predefined information configured by the MAC CE or RRC signaling for a group of user devices. In some implementations, the certain number of fields in DCI format 2_3 in Rel 15 are used to indicate one or more triggering states for the user device if the PUSCH is scheduled by MAC RAR. The one or more indication information/triggering states corresponding to a certain number of the fields in DCI format 2_3 in Rel 15 with CRC scrambled by TPC-SRS-RNTI are shown in Table 13. In some implementations, the various indication information of a certain number of the fields in DCI format 2_3 in Rel 15 are configurable by the MAC CE or RRC signaling. In some implementations, the various indication information of a certain number of the fields in DCI format 2_3 in Rel 15 are configurable by the L1 signaling

TABLE 13

| Fields in DCI format 2_3 in Rel 15 | Configuration information/ Triggering state in Rel 15 | Another possible Configuration information/Triggering state with predefined information in Rel 16 |
|---|---|---|
| block number 1, block number 2, . . . , block number B for srs-TPC-PDCCH-Group = typeA | the following fields defined for the block: SRS request - 0 or 2 bits. TPC command number 1, TPC command number 2, . . . , TPC command number N, where each TPC command applies to a respective UL carrier provided | It can indicate a certain number of triggering states of the indication information related to the above mentioned functionalities in each TPC command block. |

TABLE 13-continued

| Fields in DCI format 2_3 in Rel 15 | Configuration information/ Triggering state in Rel 15 | Another possible Configuration information/Triggering state with predefined information in Rel 16 |
|---|---|---|
| block number 1, block number 2, . . . , block number B for srs-TPC-PDCCH-Group = typeB | by higher layer parameter cc-IndexInOneCC-Set the following fields defined for each block: SRS request - 0 or 2 bits. The presence of this field is according to the definition in Subclause 11.4 of [5, TS38.213]. If present, this field is interpreted as defined by Table 7.3.1.1.2-24. TPC command -2 bits | It can indicate a certain number of triggering states of the information related to the above mentioned functionalities in each block. E.g. the SRS request field can indicate a go-to-sleep triggering states including sleeping duration or skipping duration, and a wake-up triggering state including RS transmission or time domain resource allocation etc.. The TPC command field can indicate a combination of a certain number of triggering statesof the indication information related to the above mentioned functionalities. |

In some implementations, the presented various configuration information for one field in Table 11, Table 12 and Table 13 are configurable. For example, one of the various configuration information is available for some cases or a subset of the various configuration information are available for another cases. In some implementations, the fields indicating one or more configuration/triggering states in the DCI are configured by MAC CE or RRC signaling. In some implementations, the fields can simultaneously indicate both the current configuration information in Rel 15 and the various configuration information in Rel 16 for power saving purpose. In some implementations, the fields can indicate either the current configuration information in Rel 15 or the various configuration information in Rel 16 for power saving purpose based on the MAC CE or RRC signaling configuration. In some implementations, the resource overhead can be reduced compared with the scheme that adds the triggering states in current DCI format or designs a new DCI.

In some implementations, the structure of the fields in the DCI can be reused for the DCI indicating at least one of the configuration information as described above. In some implementations, at least one of the fields is not included in the DCI with CRC scrambled by PS-RNTI or a specific configuration configured by RRC signaling. In some implementations, if the higher layer parameter configuration is used to enable the various configuration information and the DCI with CRC scrambled by PS-RNTI, the various configuration information is enabled to indicate the user device another operation. In some implementations, if the higher layer parameter configuration is used to disable the another configuration information, the fields in the DCI do not indicate another configuration information. In some implementations, if the higher layer parameter configuration is used to enable the another configuration information and the CRC of the DCI is not scrambled by PS-RNTI, the fields in the DCI do not indicate the various configuration information. In some implementations, if the DCI is configured to enable another configuration information of some fields, all the other fields are not included in this DCI transmission.

In some implementations, the user device is configured with position information. In some implementations, the position information is used to configure the UE for extracting the triggering state from the DCI information bits. In some implementations, the interpretation of the triggering state of user device is associated with the position information. In some implementations, the position information includes at least one of a starting position, a length of the information, or an ending position of a data block for the user device. In some implementations, the position information includes the index to the block number. In some implementations, the position information includes the number of information bits of the data block/field or the size of the data block/field. In some implementations, the position information is configured by a higher layer signal. In some implementations, the higher layer signal includes a RRC signaling or MAC CE.

In some implementations, the DCI formats of PDCCH enhancement for URLLC scenario is used for power saving state. In some implementations, the user device receives the URLLC data block for the power saving state by the RNTI type scrambling the CRC of the data block or the higher layer parameters. In some implementations, the fields of the data block for URLLC scenario are redefined for the power saving state. In some implementations, the fields of the triggering states for the user device under the power saving state are added in the data block for URLLC scenario.

In some implementations, there is no larger data transmission under the power saving state which is the same as the URLLC scenario, so the data block, namely enhanced DCI format 0_1/1_1, for URLLC scenario is benefit for transmitting the control information of the power saving state.

In some implementations, the user device is configured with position information. In some implementations, the position information is used to configure the UE for extracting the triggering state from the DCI payload. In some implementations, the interpretation of the triggering state of user device is associated with the position information. In some implementations, the position information includes at least one of a starting position, or an ending position of a data block. In some implementations, the position information includes the index to the block number. In some implementations, the position information includes the bit width of the data block or the size of the data block field. In some implementations, the position information is configured by a higher layer signal. In some implementations, the higher layer signaling includes a RRC signal or MAC CE.

In some implementations, if the field of 'new data indicator' indicates a new data transmission in a current DCI format as described above, the fields of 'redundancy version' and 'HARQ process number' can be redefined for single user device under power saving state. In some implementations, the DCI for a single user device under the power saving state as described above can add another field of 'Identifier for DCI formats of power saving state'.

In some implementations, when a downlink control signaling transmission has been received in a predefined resource set, the user device perform one or more subsequent behaviors according to the indication information/triggering states in the DCI in the subsequent predefined resource set. In some implementations, the subsequent behavior is wake-up to perform PDCCH monitoring if the indicator in DCI indicates a wake-up. In some implementations, the subsequent behavior is not wake-up, sleeping, or skipping PDCCH monitoring during a predefined duration. In some implementations, a predefined duration is a sleeping duration configured by DCI or MAC CE or RRC signaling. In some implementations, a predefined duration is a subsequent active time or a subsequent DRX On duration or a duration of N subsequent DRX cycles. In some implementations, N is a natural positive number. In some implementations, if a downlink control signaling transmission has not been received in the predefined resource set, the user device performs PDCCH monitoring behavior in the subsequent predefined resource set. In some implementations, the subsequent predefined resource set may be different from the predefined resource set according to the indication information in DCI.

In some implementations, if a downlink control signaling transmission has been received in the predefined resource set, the user device performs the subsequent behavior according to the indication information/triggering states in the DCI in the subsequent predefined resource set. In some implementations, the subsequent behavior is wake-up to perform PDCCH monitoring. In some implementations, if a downlink control signal transmission has not been received in the predefined resource set, the user device performs PDCCH monitoring behavior in the subsequent predefined resource set. In some implementations, the subsequent predefined resource set may be different from the predefined resource set according to the indication information in DCI.

In some implementations, the predefined resource set is a default/initial/defected/small/dominant BWP. In some implementations, a defected BWP is a BWP with the bandwidth that is smaller than the other BWPs in Rel 15. In some implementations, the predefined resource set is a specific BWP. In some implementations, the specific BWP is different from the configured BWP for a user device in Rel 15. In some implementations, the predefined resource set is a specific serving cell. In some implementations, the predefined resource set is a PCell. In some implementations, the predefined resource set is PCell and SCell. In some implementations, the predefined resource set is P1 serving cells. In some implementations, P1 is a natural positive number and is not larger than 4. In some implementations, the predefined resource set is a specific state serving cell. In some implementations, a specific state is neither an activated state nor a deactivated state. In some implementations, the predefined resource set is a specific serving cell. In some implementations, the specific serving cell is different from the configured serving cell for a user device in Rel 15. In some implementations, the predefined resource set is a specific CORESET. In some implementations, the predefined resource set is a subset of all CORESETs in Rel 15. In some implementations, the predefined resource set is a specific CORESET. In some implementations, the specific CORESET is different from the configured CORESET for a user device in Rel 15. In some implementations, the predefined resource set is a subset of all CCE ALs in Rel 15. In some implementations, the predefined resource set is a specific search space in Rel 15. In some implementations, the predefined resource set is a subset of all search spaces in Rel 15. In some implementations, the predefined resource set is a specific search space set. In some implementations, the specific search space set is different from the configured search space set for a user device in Rel 15. In some implementations, the predefined resource set is a specific search space type in Rel 15. In some implementations, the predefined resource set is a timer. In some implementations, the predefined resource set is a specific timer. In some implementations, the specific timer is different from the configured timer related to DRX or BWP for a user device in Rel 15. In some implementations, the predefined resource set is a preparation period. In some implementations, the predefined resource set is a P2 PDCCH monitoring occasions. In some implementations, P2 is a natural positive number. In some implementations, the predefined resource set is a specific duration for monitoring the control signal. In some implementations, the specific duration is different from the PDCCH occasion configured by RRC signaling for a user device in Rel 15. In some implementations, the predefined resource set is a set of PDCCH candidates. In some implementations, the predefined resource set is a first type of RNTI. In some implementations, the first type of RNTI includes at least one of C-RNTI, CS-RNTI, MCS-C-RNTI, PS-RNTI, or TC-RNTI. In some implementations, the predefined resource set is a second type of RNTI. In some implementations, the first type of RNTI includes at least one of SFI-RNTI, INT-RNTI, TPC-PUSCH-RNTI, TPC-PUCCH-RNTI, TPC-SRS-RNTI, or PS-RNTI. In some implementations, PS-RNTI is a new RNTI in Rel-16. In some implementation, PS-RNTI is a UE specific RNTI. In some implementation, PS-RNTI is a UE group-specific RNTI.

In some implementations, a DCI transmitted in active time or a UE-specific DCI is configured with a specific BWP, and the a DCI transmitted in inactive time or a UE group-specific DCI is configured with another specific BWP. In some implementations, a DCI transmitted in active time or a UE-specific DCI is configured with a specific CORESET, and the a DCI transmitted in inactive time or a UE group-specific DCI is configured with another specific CORESET. In some implementations, a DCI transmitted in active time or a UE-specific DCI is configured with a specific subset of CORESET, and the a DCI transmitted in inactive time or a UE group-specific DCI is configured with another specific subset of CORESET. In some implementations, a DCI transmitted in active time or a UE-specific DCI is configured with a specific search space, and the a DCI transmitted in inactive time or a UE group-specific DCI is configured with another specific search space. In some implementations, a DCI transmitted in active time or a UE-specific DCI is configured with a specific search space set, and the a DCI transmitted in inactive time or a UE group-specific DCI is configured with another specific search space set. In some implementations, a DCI transmitted in active time or a UE-specific DCI is configured with a specific serving cells, and the a DCI transmitted in inactive time or a UE group-specific DCI is configured with another specific serving cells. In some implementations, a DCI transmitted in active time or a UE-specific DCI is configured with a specific subset of PDCCH candidates, and the a DCI transmitted in inactive time or a UE group-specific DCI is configured with another specific subset of PDCCH candidates. In some implementations, a DCI transmitted in active time or a UE-specific DCI is configured with a specific subset of CCE AL, and the a DCI transmitted in inactive time or a UE group-specific DCI is configured with another specific subset of CCE AL.

For example, in some implementations, the predefined resource set is a specific timer configured by MAC CE or RRC signaling. In some implementations, the indication information in the DCI is used to indicate at least two triggering states of wake-up and not wake up/go-to-sleep. In some implementations, if a downlink control signaling transmission carrying the DCI has been received before the specific timer expired or stopped, the user device wakes up or does not wake up according to the indication of the DCI. In some implementations, if a downlink control signaling transmission carrying the DCI has not been received until the specific timer expired or stopped, the user device wakes up and performs PDCCH monitoring in a subsequent DRX on duration or active time.

For example, in some implementations, the predefined resource set is a specific resource set that includes at least one of a specific BWP, a CORESET, a search space type, a PDCCH candidate, or a specific TCI state configured by MAC CE or RRC signaling. In some implementations, the DCI only indicates a wake-up rather than a go-to-sleep or not wake-up. In some implementations, if the downlink control signaling transmission carrying the DCI with CRC scrambled by PS-RNTI has been received, the user device wakes up and performs PDCCH monitoring in the subsequent DRX on duration or active time. In some implementations, if the downlink control signaling transmission carrying the DCI with CRC scrambled by PS-RNTI has not been received in the specific resource, the user device wakes up and performs PDCCH monitoring in a subsequent DRX on duration or active time.

For example, the predefined resource set is a PS-RNTI and/or a specific resource set that includes at least one of the following: a specific BWP, a CORESET, a search space type, a PDCCH candidate, or a specific TCI state configured by MAC CE or RRC signaling. In some implementations, the DCI only indicates a wake-up rather than a go-to-sleep or not wake-up. In some implementations, if the downlink control signal transmission carrying the DCI with CRC scrambled by PS-RNTI has been received, the user device wakes up and performs PDCCH monitoring in a subsequent DRX on duration or active time. In some implementations, if the downlink control signal transmission carrying the DCI with CRC scrambled by PS-RNTI has not been received in the specific resource, the user device wakes up and performs PDCCH monitoring in the subsequent DRX on duration or active time.

In some implementations, a DCI transmitted in active time or a UE-specific DCI is configured with at least one of the CCE AL{1, 2, 4, 8, 16}. In some implementations, a DCI transmitted in inactive time or a UE group-common DCI is configured with at least one of the CCE AL{4, 8, 16}. In some implementations, the DCI transmitted in active time is configured with at least one and at most three of the list of UE-specific CORESETs per BWP per Scell. In some implementations, the DCI transmitted in inactive time or a UE group-common DCI is configured with at least one and at most three of the list of common CORESETs per BWP per Scell. In some implementations, the DCI transmitted in active time or a UE-specific DCI is configured with at least one and at most ten of the list of UE-specific search space per BWP per Scell, and the DCI transmitted in inactive time or a UE group-common DCI is configured with at least one and at most ten of the list of common search space per BWP per Scell. In some implementations, the PDCCH monitoring occasions of the DCI transmitted in active time or a UE-specific DCI is configured per BWP per Scell by RRC signaling or MAC CE with the same PDCCH monitoring occasion parameters in Rel 15, and the PDCCH monitoring occasions of the DCI transmitted in inactive time or a UE group-common DCI is configured per BWP per Scell with the same PDCCH monitoring occasion parameters in Rel 15 or a predefined monitoring duration configured by RRC signaling or MAC CE. Wherein the predefined monitoring duration is one of the duration values between {1~m−1} slots with a periodicity m before a DRX On duration with an offset to determine the start monitoring position. Wherein m is an positive integer and smaller than the length of DRX Off. In some implementations, a predefined time offset is used to indicate a time gap that the user device shall stop monitoring PDCCH if the time gap between the current time and the beginning of DRX On duration is not larger than the predefined time offset.

In some implementations, for a single user device, the fields indicating triggering states of power saving state are at least one of the new fields or redefined fields as described above. In some implementations, the DCI format for a single user device as described above is only used within the active time. In some implementations, the CRC of the DCI format for a single user device as described above is scrambled by a PS-RNTI or RNTIs in Rel 15 within the active time. In some implementations, the DCI format for multiple user devices are only used outside the active time.

In some implementations, the DCI format (e.g., a new DCI format, or an existing fall-back DCI format as described above) for a single user device is used outside the active time. In some implementations, the DCI format (e.g., an existing fall-back DCI format, an existing non fall-back DCI format, or an existing DCI format for URLLC scenario as described above) for a single user device is used inside the active time.

In some implementations, the DCI format for a single user device can be a combination of one or more fields of the existing fields in an existing fall-back DCI format, an existing non fall-back DCI format, or an existing DCI format for URLLC scenario as described above. In some implementations, the new additional fields and the redefined fields in the DCI format (e.g., an existing fall-back DCI format, an existing non fall-back DCI format, or an existing DCI format for URLLC scenario as described above) for a single user device is mapped into higher layer parameters. In some implementations, the new additional fields and the redefined fields in the DCI format (e.g., an existing fall-back DCI format, an existing non fall-back DCI format, or an existing DCI format for URLLC scenario as described above) for a single user device is not mapped into higher layer parameters.

Figure 5:
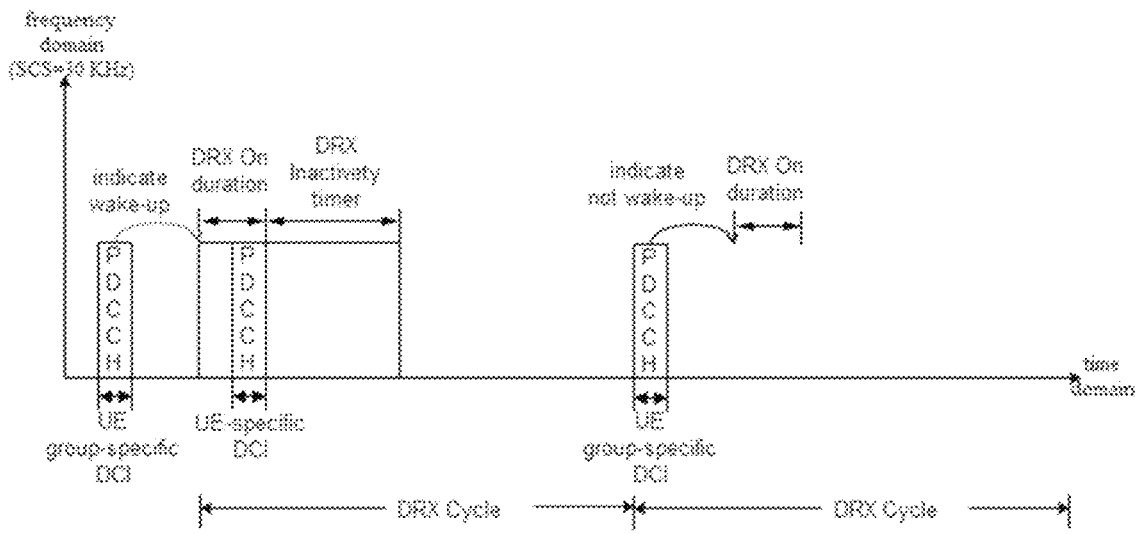
FIG. 5 illustrates a diagram of control signal scheduling on a time domain in accordance with some embodiments of the present disclosure.

Referring to FIG. 5, a diagram of control signal scheduling on a time domain is shown according to some example embodiments. In some implementations, with DRX configuration, active time represents DRX On duration and the duration of DRX inactivity timer. In some implementations, the UE group-specific DCI is transmitted in inactive time, and the UE-specific DCI is transmitted in active time. In some implementations, the UE group-specific DCI is a new DCI or an enhanced UE group-common DCI format 2_0/2_1/2_2/2_3. In some implementations, the UE-specific DCI is a new DCI, an enhanced DCI format 0_0/1_0/0_1/1_1, or an enhanced DCI format 1_1 for URLLC scenario.

Figure 6:
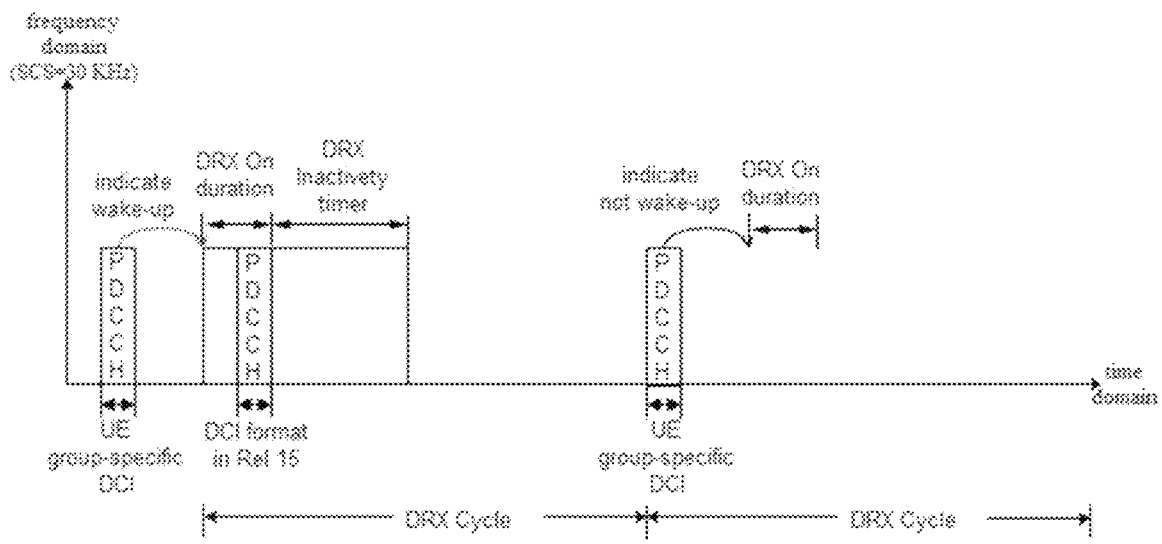
FIG. 6 illustrates a diagram of control signal scheduling on a time domain in accordance with some embodiments of the present disclosure.

Referring to FIG. 6, a diagram of control signal scheduling on a time domain is shown according to some example embodiments. In some implementations, with DRX configuration, active time represents DRX On duration and the duration of DRX inactivity timer. In some implementations, the UE group-specific DCI is transmitted in/during inactive time. In some implementations, the DCI format in Rel 15 is transmitted in/during active time. In some implementations, the UE group-specific DCI is a new DCI or an enhanced UE group-common DCI format 2_0/2_1/2_2/2_3.

Figure 7:
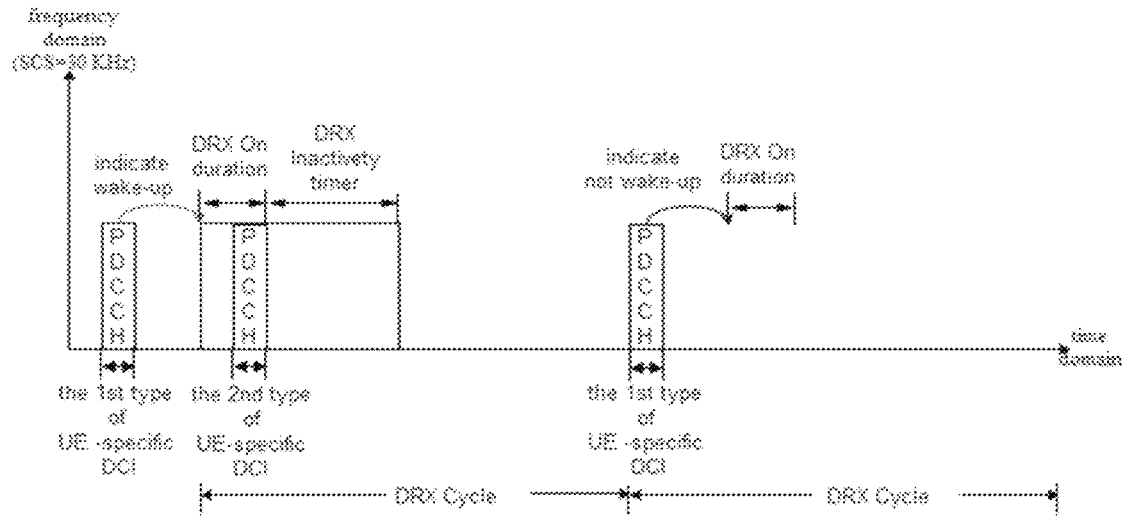
FIG. 7 illustrates a diagram of control signal scheduling on a time domain in accordance with some embodiments of the present disclosure.

Referring to FIG. 7, a diagram of control signal scheduling on a time domain is shown according to some example embodiments. In some implementations, with DRX configuration, active time represents DRX On duration and the duration of DRX inactivity timer. In some implementations, the first type of UE-specific DCI is transmitted in/during inactive time, and the second type of UE-specific DCI is transmitted in/during inactive time. In some implementations, the first type of UE-specific DCI is a new DCI in Rel 15. In some implementations, the second type of UE-specific DCI is a new DCI or an enhanced DCI format 0_0/1_0/0_1/1_1 in Rel 15.

Figure 8:
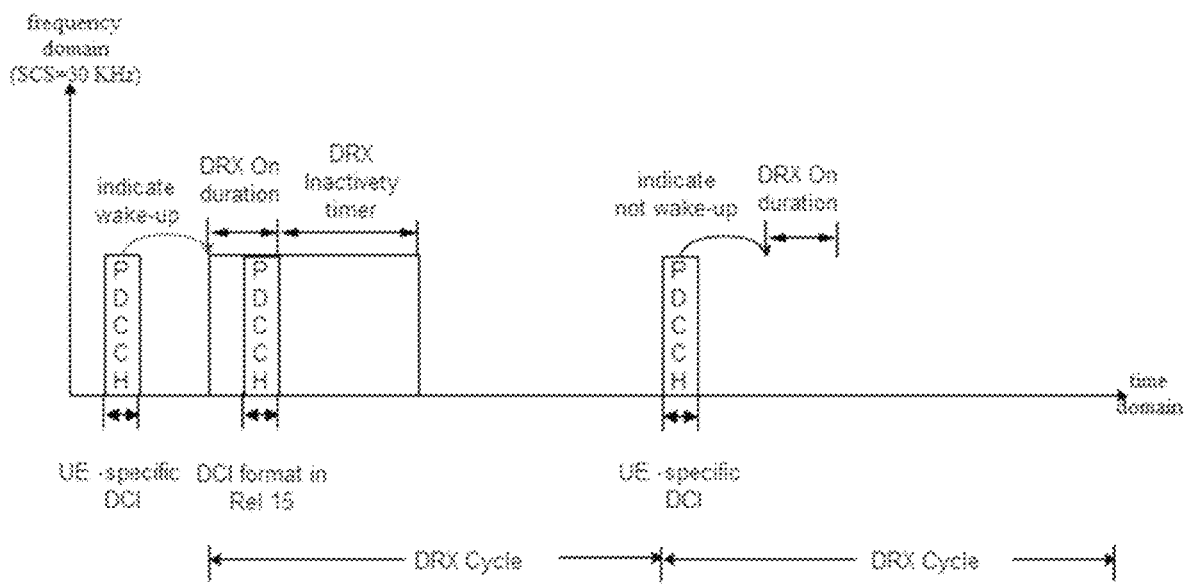
FIG. 8 illustrates a diagram of control signal scheduling on a time domain in accordance with some embodiments of the present disclosure.

Referring to FIG. 8, a diagram of control signal scheduling on a time domain is shown according to some example embodiments. In some implementations, with DRX configuration, active time represents DRX On duration and the duration of DRX inactivity timer. In some implementations, the UE-specific DCI is transmitted in inactive time. In some implementations, the UE-specific DCI is a new DCI or enhanced DCI format 0_0/1_0 in Rel 15.

Figure 9:
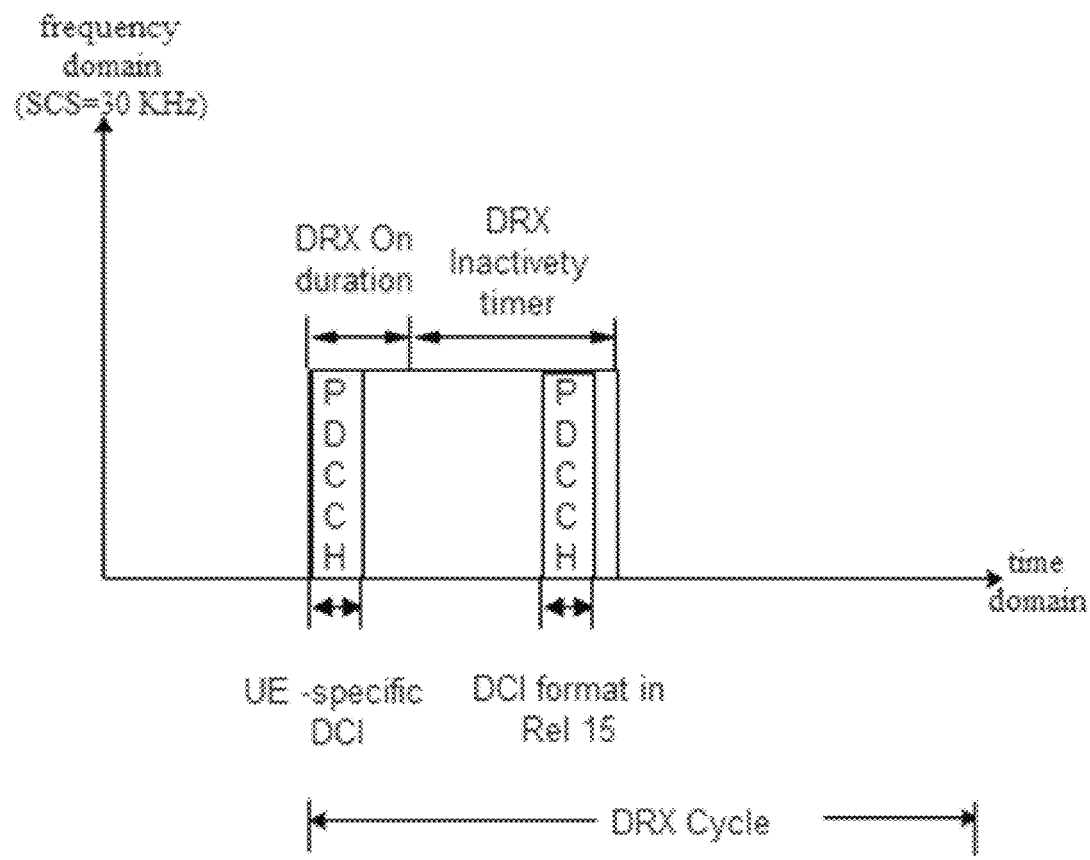
FIG. 9 illustrates a diagram of control signal scheduling on a time domain in accordance with some embodiments of the present disclosure.

Referring to FIG. 9, a diagram of control signal scheduling on a time domain is shown according to some example embodiments. In some implementations, with DRX configuration, active time represents DRX On duration and the duration of DRX inactivity timer. In some implementations, the UE-specific DCI is transmitted in active time. In some implementations, the UE-specific DCI is a new DCI or an enhanced DCI format 0_0/1_0/0_1/1_1 in Rel 15.

In some implementations, with DRX configuration, active time represents DRX On duration and the duration of DRX inactivity timer. In some implementations, the UE group-specific DCI is transmitted in/during inactive time and active time. In some implementations, the UE group-specific DCI is a new DCI or an enhanced UE group-common DCI format 2_0/2_1/2_2/2_3.

In some implementations, with DRX configuration, active time represents DRX On duration and the duration of DRX inactivity timer. In some implementations, the UE-specific DCI is transmitted in/during inactive time and active time. In some implementations, the UEspecific DCI is a new DCI or an enhanced DCI format 0_0/1_0/0_1/1_1 in Rel 15.

In some implementations, time domain resource allocation is indicated in the DCI as described above. In some implementations, the TDRA parameters subset includes several number of TDRA parameters in the set of {the minimum value of k0, the minimum value of k1, the minimum value of k2, the minimum value of A-CSI-RS trigger offset, the minimum value of A-SRS trigger offset}. In some implementations, the total number of TDRA parameter subsets P is not larger than 31.

In some implementations, a UE group-specific DCI or a DCI transmitted in inactive time carries an indication of at least one of a TDRA parameters subset or a UE-specific DCI. In some implementations, a DCI transmitted in active time carries an indication of the same TDRA parameters subset. For example, the UE group-specific DCI transmitted in inactive time includes the indication of the subset of {the minimum value of k0, the minimum value of k2} that is {1, 1}, and the UE-specific DCI transmitted in active time also comprises the indication of the subset of {the minimum value of k0, the minimum value of k2} that is {2, 2}.

In some implementations, a UE group-specific DCI or a DCI transmitted in inactive time is expected to carry the indication of a first TDRA parameters subset, and a UE-specific DCI or a DCI transmitted in active time is expected to carry the indication of a second TDRA parameters subset indication information. In some implementations, at least one of TDRA parameter in the set {the minimum value of k0, the minimum value of k1, the minimum value of k2, the minimum value of A-CSI-RS trigger offset, the minimum value of A-SRS trigger offset} is included in both the first TDRA parameters subset and the second TDRA parameters subset. For example, the UE group-specific DCI transmitted in inactive time includes an indication of the subset of {the minimum value of k0} that is {1}, and the UE-specific DCI transmitted in active time also includes an indication of the subset of {the minimum value of k0, the minimum value of k1, the minimum value of k2} that is {1, 1, 1}. In some implementations, the total number of TDRA parameters in the first TDRA parameters subset is larger than that in the second TDRA parameters subset. For example, the UE group-specific DCI transmitted in inactive time includes an indication of the subset of {the minimum value of k0, the minimum value of k2, the minimum value of A-CSI-RS trigger offset} that is {1, 1, 1}, and the UE-specific DCI transmitted in active time also includes an indication of the subset of {the minimum value of k0, the minimum value of k1} that is {1, 1}. In some implementations, the total number of TDRA parameters in the first TDRA parameters subset is smaller than that in the second TDRA parameters subset. For example, in some implementations, the TDRA parameters in the first TDRA parameters subset is all included in the second TDRA parameters subset. For example, the UE group-specific DCI transmitted in inactive time includes an indication of the subset of {the minimum value of k0} that is {1}, and the UE-specific DCI transmitted in active time also comprises the indication of the subset of {the minimum value of k0, the minimum value of k1} that is {1, 1}. In some implementations, the total number of TDRA parameters in the first TDRA parameters subset is equal to that in the second TDRA parameters subset. For example, the UE group-specific DCI transmitted in inactive time includes an indication of the subset of {the minimum value of k0, the minimum value of A-CSI-RS trigger offset} that is {1, 1}, and the UE-specific DCI transmitted in active time also includes an indication of the subset of {the minimum value of k0, the minimum value of k1} that is {1, 1}. In some implementations, all of the TDRA parameters in the first TDRA parameters subset is different from that in the second TDRA parameters subset. For example, the UE group-specific DCI transmitted in inactive time includes an indication of the subset of {the minimum value of k0, minimum value of A-CSI-RS trigger offset} that is {1, 1}, and the UE-specific DCI transmitted in active time also includes the indication of the subset of {the minimum value of k1, the minimum value of k2} that is {1, 1}. In some implementations, the total number of parameters in the first TDRA parameters subset is larger than that in the second TDRA parameters subset. In some implementations, the total number of parameters in the first TDRA parameters subset is smaller than that in the second TDRA parameters subset. In some implementations, the total number of parameters in the first TDRA parameters subset is equal to that in the second TDRA parameters subset.

In some implementations, a UE group-specific DCI or a DCI transmitted in inactive time does not carry an indication of the TDRA parameters, and a UE-specific DCI or a DCI transmitted in active time carries the indication of one of the TDRA parameters subset indication information. For example, the UE group-specific DCI transmitted in inactive time does not include the indication of TDRA parameters, and the UE-specific DCI transmitted in active time includes the indication of the subset of {the minimum value of k1, the minimum value of k2} that is {1, 1}.

In some implementations, a UE group-specific DCI or a DCI transmitted in inactive time carries one of the TDRA parameters subset, and a UE-specific DCI or a DCI transmitted in active time does not carry the TDRA parameters. For example, the UE group-specific DCI transmitted in inactive time includes an indication of the subset of {the minimum value of k1, the minimum value of k2} that is {1, 1}, and the UE-specific DCI transmitted in active time does not include the indication of TDRA parameters.

In some implementations, the TDRA parameters set of {the minimum value of k0, the minimum value of k1, the minimum value of k2, the minimum value of A-CSI-RS trigger offset, the minimum value of A-SRS trigger offset} is divided into P subsets or pairs $\{S_1, \ldots, S_P\}$ with the $i^{th}$ subset/pair including $N_{si}$ TDRA parameters {parameter $N_1, \ldots$, parameter $N_{si}$}. In some implementations, both P and $N_{si}$ are positive integers, and the total number of TDRA parameters in all the subsets is not larger than 5.

In some implementations, a UE group-specific DCI or a DCI transmitted in inactive time carries the indication of one of the TDRA parameters subset, and a UE-specific DCI or a DCI transmitted in active time also carries an indication of the same TDRA parameters subset. For example, the UE group-specific DCI transmitted in inactive time includes the indication of the subset of {the minimum value of k0, the minimum value of k2} that is {1, 1}, and the UE-specific DCI transmitted in active time also includes the indication of the subset of {the minimum value of k0, the minimum value of k2} that is {2, 2}.

In some implementations, a UE group-specific DCI or a DCI transmitted in inactive time carries an indication of a first TDRA parameters subset, and a UE-specific DCI or a DCI transmitted in active time carries an indication of a second TDRA parameters subset indication information. For example, the UE group-specific DCI transmitted in inactive time includes an indication of the subset of {the minimum value of k0} that is {1}, and the UE-specific DCI transmitted in active time also includes an indication of the subset of {the minimum value of k1, the minimum value of k2} that is {1, 1}. In some implementations, the total number of parameters in the first TDRA parameters subset is larger than that in the second TDRA parameters subset. For example, the UE group-specific DCI transmitted in inactive time includes the indication of the subset of {the minimum value of k1, the minimum value of k2} that is {1, 1}, and the UE-specific DCI transmitted in active time also includes the indication of the subset of {the minimum value of k0} that is {1}. In some implementations, the total number of parameters in the first TDRA parameters subset is smaller than that in the second TDRA parameters subset. For example, the UE group-specific DCI transmitted in inactive time includes the indication of the subset of {the minimum value of k0, the minimum value of k2} that is {1, 1}, and the UE-specific DCI transmitted in active time also includes the indication of the subset of {the minimum value of k1, the minimum value of A-CSI-RS trigger offset, the minimum value of A-SRS trigger offset} that is {1, 1, 1}. In some implementations, the total number of parameters in the first TDRA parameters subset is equal to that in the second TDRA parameters subset. For example, the UE group-specific DCI transmitted in inactive time includes the indication of the subset of {the minimum value of k0, the minimum value of k2} that is {1, 1}, and the UE-specific DCI transmitted in active time also includes the indication of the subset of {the minimum value of k1, the minimum value of A-CSI-RS trigger offset} that is {1, 1}.

In some implementations, the values of the TDRA parameters in a first subset in a UE group-specific DCI or in a DCI transmitted in inactive time and the values of the TDRA parameters in a second subset in a UE-specific DCI or in a DCI transmitted in active time are different or same with each other.

In some implementations, a wireless network device (e.g., a gNB) chooses a power saving techniques/parameters set1 {PS-config1, ..., PS-configQ1} from a set of power saving techniques/parameters sets {PS-config1, PS-config2, PS-config3, ..., PS-configQ} and sends set1 to one or more user devices by RRC signaling. In some implementations, the user device supports the power saving capability/functionality in the set1. In some implementations, the subsequent procedures are as followings:

In some implementations, the gNB or network selects a power saving techniques/parameters set2 from the set1 based on the RRC signaling configuration and sends set2 to one or more user devices by MAC CE. In some implementations, if a predefined resource set or a predefined configuration configured by RRC signaling, the gNB sends UE a DCI to indicate one of the PS-config from the set2 configured by MAC CE. In some implementations, the user device obtains indication information from the DCI if a downlink control signaling has received in the predefined resource set.

In some implementations, the gNB or network transmits a DCI to one or more user devices to indicate one of the PS-config from the set1 or a subset of the PS-config from the set1 configured by the RRC signaling. In some implementations, the user device obtains the parameters related to power saving indicated by the DCI if a downlink control signaling has received in the predefined resource set.

In some implementations, if a predefined configuration by RRC signaling configured by RRC signaling is used to indicate one or more user devices to receive a downlink control signaling, the configuration information as described above may provide indication to the user device.

In some implementations, a UE receives the DCI in the predefined resource set configured by MAC CE or RRC signaling. In some implementations, the DCI for a user device represents a PDCCH-based power saving signal/channel. In some implementations, the DCI is a UE-specific DCI format with CRC scrambled by PS-RNTI or C-RNTI, MCS-C-RNTI, TC-RNTI or CS-RNTI in current NR Rel-15 specification.

In some implementations, the power saving state is a state defined by at least one of there is no DL/UL data scheduling or a sleep state or communication under DRX configuration for UE, there is inside active time or outside active time with C-DRX configuration, or there is inside active time of PDCCH monitoring or outside active time of PDCCH monitoring.

In some implementations, the user device receives the DCI related to power saving when the higher layer parameter configures the DCI format in the search space of a BWP in a serving cell. In some implementations, the higher layer parameter is a new added parameter or a new added field in RRC SearchSpace IE or PDCCH-Config IE to indicate a single user device to monitor or detect the DCI at the configured time and frequency location.

In some implementations, the active time represents a DRX On duration. In some implementations, the active time represents the duration of a DRX Inactivity timer running. In some implementations, the active time represents the DRX On duration and the subsequent duration of Inactivity timer running. In some implementations, the active time represents the DRX active time. In some implementations, the active time represents the duration of PDCCH monitoring periodicity. In some implementations, the active time represents the PDCCH monitoring occasion. In some implementations, the active time represents the PDCCH monitoring duration in a PDCCH monitoring periodicity. In some implementations, the active time represents the duration that needs to monitor PDCCH in Rel 15. In some implementations, the active time represents the duration that needs to monitor PDCCH.

In some implementations, the inactive time represents a duration of DRX-Off. In some implementations, the inactive time represents the duration before DRX On duration in a DRX cycle. In some implementations, the inactive time represents the DRX inactive time. In some implementations, the inactive time represents the duration of no PDCCH monitoring periodicity configuration. In some implementations, the inactive time represents duration of not PDCCH monitoring occasion. In some implementations, the inactive time represents the duration of no PDCCH monitoring behavior in Rel 15. In some implementations, the inactive time represents the duration of no PDCCH monitoring behavior.

In some implementations, a UE receive a downlink control signalling including indication information of one or more minimum values. In some implementations, the one or more minimum values are enabled after Thred1 slots/symbols. In some implementations, the Thred1 is an integer greater than 0. In some implementations, the indicate information includes at least one of bitmap information, or one or more minimum values, or index of parameter set, or index of pdsch-TimeDomainAllocationList, or index of pusch-TimeDomainAllocationList, or one or more index of minimum value set.

In some implementations, Thred1 value is one of the following:
 a. Thred1 value is a parameter configured by RRC.
 b. The said downlink control signalling is outside the active time, Thred1 value is greater than the slot offset between downlink control signalling and the first slot of Active time.
 c. Thred1 value is indicate by power saving signal.
 d. A set of Thred1 value is configured by RRC, downlink control signalling carries one index indicate the value.
 e. The Thred1 value is absent, the value is 1.
 f. Thred1 value is same as one of minimum value(s).
 g. Thred1 value is same as the maximum value of minimum value(s).
 h. Thred1 value is same as the minimum value of minimum value(s).

Wherein, minimum values after receive the said downlink control signalling and before minimum values enable is:
 a. Minimum value(s) is minimum value(s) before receiving the said downlink control signalling.
 b. Minimum value(s) is min{minimum value(s) before receiving the said downlink control signalling, minimum value(s) indicate by the said downlink control signalling}.
 c. Minimum value(s) is max{minimum value(s) before receiving the said downlink control signalling, minimum value(s) indicate by the said downlink control signalling}.
 d. Minimum value(s) is 1.
 e. Minimum value(s) 0.
 f. Minimum value(s) is the minimum k0 in active TDRA table.
 g. Minimum value(s) is the maximum k0 in active TDRA table.

In some implementations, an aperiodicTriggeringOffset set is a set that includes all available values of the aperiodic CSI-RS offset. In some implementations, the downlink control signalling carries the minimum value of at least one of k0, k2, aperiodic CSI-RS offset, aperiodic SRS offset, or k1. In some implementations, if the minimum value of the aperiodic CSI-RS offset is absent, the minimum value of the aperiodic CSI-RS offset is same or associate with the minimum value of k0. In some implementations, if the minimum value of the aperiodic SRS offset is absent, the minimum value of the aperiodic SRS offset is set to or associated with the minimum value of k2.

In some implementations, if a minimum value of an aperiodic CSI-RS offset is configured or indicated by the gNB, the minimum value of the aperiodic CSI-RS offset is configured or indicated as a predetermined value. In some implementations, if a minimum value of the aperiodic CSI-RS offset is not configured or indicated by the gNB, the minimum value of the aperiodic CSI-RS offset is associate with a minimum value of k0 and/or information of a quasi-co-location (QCL) Type.

In some implementations, if at least one of the aperiodic CSI-RS resource sets associated trigger states have the higher layer parameter qcl-Type set to 'QCL-TypeD' in the corresponding TCI states, the minimum value of the aperiodic CSI-RS offset is based on a parameter or indication of QCL-TypeD, otherwise, the minimum value of the aperiodic CSI-RS offset is based on a minimum value of k0 or RRC configuration information.

In some implementations, if the minimum value of an aperiodic CSI-RS offset is associate with the minimum value of k0, the minimum value of the aperiodic CSI-RS offset may be one of the following:
 (1) If SCS of DCI scheduling PDSCH is equal to the SCS of DCI trigger an aperiodic non zero power channel state information reference signal (NZP CSI-RS) resources set.
  ① If the minimum value of k0 is an entry in the aperiodicTriggeringOffset set, the minimum value of aperiodic CSI-RS offset is minimum value of k0.
  ② If the minimum value of k0 is not an entry in the aperiodicTriggeringOffset set.
   1) The minimum value of the aperiodic CSI-RS offset is the minimum entry in a subset of aperiodicTriggeringOffset set. In some implementations, all entries in the subset are greater than the minimum value of k0.
   2) The minimum value of the aperiodic CSI-RS offset is the maximum entry in a subset of aperiodicTriggeringOffset set. In some implementations, all entries in the subset are less than the minimum value of k0.

3) The minimum value of the aperiodic CSI-RS offset is the minimum value of k0.

(2) If SCS of DCI scheduling PDSCH is not equal to the SCS of DCI trigger an aperiodic non zero power channel state information reference signal (NZP CSI-RS) resources set. The minimum value of the aperiodic CSI-RS offset is associate with operation $\{\alpha_1 \cdot k0\ min+\beta_1, \gamma_1\}$, wherein, k0min is the minimum value of k0, $\alpha_1$ is greater than or equal to zero, $\beta_1$ is an integer greater than or equal to zero, $\gamma_1$ is integer greater than or equal to zero.

① The operation is one of the following: minimize, maximize, add, subtract, multiply, and divide.

② If operation $\{\alpha_1 \cdot k0\ min+\beta_1, \gamma_1\}$ is an entry in the aperiodicTriggeringOffset set. The minimum value of aperiodic CSI-RS offset is operation $\{\alpha_1 \cdot k0\ min+\beta_1, \gamma_1\}$.

③ If operation $\{\alpha_1 \cdot k0\ min+\beta_1, \gamma_1\}$ is not an entry in the aperiodicTriggeringOffset set.
  1) The minimum value of aperiodic CSI-RS offset is the minimum entry in a subset of aperiodicTriggeringOffset set, wherein all entries in the subset are greater than the operation $\{\alpha_1 \cdot k0\ min+\beta_1, \gamma_1\}$.
  2) The minimum value of aperiodic CSI-RS offset is the maximum entry in a subset of aperiodicTriggeringOffset set, wherein all entries in the subset are less than the operation $\{\alpha_1 \cdot k0\ min+\beta_1, \gamma_1\}$.
  3) The minimum value of aperiodic CSI-RS offset is operation $\{\alpha_1 \cdot k0\ min+\beta_1, \gamma_1\}$.

④ If SCS of DCI scheduling PDSCH is less than the SCS of DCI trigger an aperiodic non zero power channel state information reference signal (NZP CSI-RS) resources set.
  1) $\alpha_1$ is an integer greater than 1 (for example, $\alpha_1$ is $$\frac{2^{\mu_{DCI-CSI-RS}}}{2^{\mu_{DCI-PDSCH}}},$$

$\mu_{DCI-PDSCH}$ is subcarrier spacing configurations for DCI scheduling PDSCH, $\mu_{DCI-CSI-RS}$ is subcarrier spacing configurations for DCI trigger an aperiodic non zero power channel state information reference signal (NZP CSI-RS) resources set).
  2) $\beta_1$ is an integer greater than 0
  3) $\gamma_1$ is the maximum value in aperiodicTriggeringOffset set.

⑤ If SCS of DCI scheduling PDSCH is greater than the SCS of DCI trigger an aperiodic non zero power channel state information reference signal (NZP CSI-RS) resources set.
  1) $\alpha_1$ is an less than or equal to 1 and greater than 0.
  2) $\beta_1$ is 0.
  3) $\gamma_1$ is the maximum value in aperiodicTriggeringOffset set.

If the minimum value of the aperiodic SRS offset is configured or indicated by gNB, the minimum value of the aperiodic SRS offset has the value as indicated by the gNB, otherwise, the minimum value of the aperiodic SRS offset is associated with the minimum value of k2.

If the minimum value of the aperiodic SRS offset is associate with minimum value of k2, the minimum value of the aperiodic SRS offset is:

(1) If SCS of DCI scheduling PUSCH is equal to the SCS of DCI trigger an aperiodic SRS-ResourceSet. The minimum value of aperiodic SRS offset is the minimum value of k2.

(2) If SCS of DCI scheduling PUSCH is greater than the SCS of DCI trigger an aperiodic SRS-ResourceSet. The minimum value of aperiodic SRS offset is the minimum value of k2. Or the minimum value of SRS offset is operation $\{\alpha_2 \cdot k2\ min+\beta_2, \gamma_2\}$, k2 min is the minimum value of k2, $\alpha_2$ is less than or equal to 1 and greater than 0, $\beta_2$ is an integer greater than or equal to zero, $\gamma_2$ is integer greater than or equal to zero. The operation is one of the following: minimize, maximize, add, subtract, multiply, and divide.

(3) If SCS of DCI scheduling PUSCH is less than the SCS of DCI trigger an aperiodic SRS-ResourceSet. The minimum value of aperiodic SRS offset is operation $\{\alpha_2 \cdot k2\ min+\beta_2, \gamma_2\}$, wherein, k2 min is the minimum value of k2, $\alpha_2$ is greater than or equal to 1, $\beta_2$ is an integer greater than or equal to zero, $\gamma_2$ is integer greater than or equal to zero.

① $\alpha_2$ is $$\frac{2^{\mu_{DCI-SRS}}}{2^{\mu_{DCI-PUSCH}}},$$

$\mu_{DCI-PUSCH}$ is subcarrier spacing configurations for DCI scheduling PUSCH, $\mu_{DCI-SRS}$ is a subcarrier spacing configuration for DCI trigger an aperiodic SRS-ResourceSet.

② $\gamma_2$ is the maximum available value of aperiodic SRS offset configured by high layer (e.g., 32).

In some implementations, the downlink control signalling carries the bitmap information which indicates the minimum value of k0, k2, and/or k1. In some implementations, if the minimum value of the aperiodic CSI-RS offset is absent, the minimum value of the aperiodic CSI-RS offset is associated with the minimum value of k0. In some implementations, if the minimum value of the aperiodic SRS offset is absent, the minimum value of the aperiodic SRS offset is associated with the minimum value of k2.

In some implementations, the downlink control signaling is UE specific or component carrier specific.

A. If bit mapping information (e.g., sequence) has b0 bits and pdsch-TimeDomainAllocationList configured by RRC signal have p0 entries.
  1) If b0<p0, intercept part of entries in the pdsch-TimeDomainAllocationList or enable part of entries of the pdsch-TimeDomainAllocationList. Wherein, the method of interception include: intercept the first part entries of the pdsch-TimeDomainAllocationList (e.g., first b0 entries) or the last part entries of the pdsch-TimeDomainAllocationList (e.g., last b0 entries). Wherein, the method of enable part of entries include: enable the first part entries of the pdsch-TimeDomainAllocationList or enable the last part entries of the pdsch-TimeDomainAllocationList.
  2) If b0<p0, padding bit 0 or bit 1 before or after the bitmap sequence (information). Or repeat part of bitmap sequence. Wherein, the part of bitmap sequence is the first part bits or the last part bits of the bitmap sequence.
  3) If b0>p0, padding null entries before or after the pdsch-TimeDomainAllocationList. Or repeat some entries of the pdsch-TimeDomainAllocationList. Wherein, some entries is the first part or the last part of the pdsch-TimeDomainAllocationList.

4) If b0>p0, intercept some bits of the bitmap information, or enable a part of bits of the bitmap information. Wherein, the method of interception include: intercept the first part entries of the bitmap information (e.g., first b0 bits) or the last part entries of the bitmap information (e.g., last b0 bits). Wherein, the method of enable a part of bits include: enable the first part bits of the bitmap information or enable the last part bits of the bitmap information.

B. If bit mapping information has b2 bits and pusch-TimeDomainAllocationList configured by RRC signal have p2 entries.
  1) If b2<p2, intercept some entries of the pusch-TimeDomainAllocationList or enable some entries of the pusch-TimeDomainAllocationList. Wherein, the method of interception include: intercept the first part entries of the pusch-TimeDomainAllocationList (e.g., first b2 entries) or the last part entries of the pusch-TimeDomainAllocationList (e.g., last b2 entries). Wherein, the method of enable some entries include: enable first part entries of the pusch-TimeDomainAllocationList or enable last part entries of the pusch-TimeDomainAllocationList.
  2) If b2<p2, padding bit 0 or bit 1 before or after the bitmap sequence (e.g., information). Or repeat part of bitmap sequence. Wherein, the part of bitmap sequence is the first part bits or the last part bits of the bitmap sequence.
  3) If b2>p2, padding null entries before or after the pusch-TimeDomainAllocationList. Or repeat some entries of the pusch-TimeDomainAllocationList. Wherein, some entries is the first part or the last part of the pusch-TimeDomainAllocationList.
  4) If b2>p2, intercept some bits of the bitmap information, or enable part of bits of the bitmap information. Wherein, the method of interception include: intercept the first part entries in the bitmap information (e.g., first b2 bits) or the last part entries in the bitmap information (e.g., last b2 bits). Wherein, the method of enable part of bits include: enable the first part bits in the bitmap information or enable the last part bits in the bitmap information.

C. If bit mapping information has b1 bits and dl-DataToUL-ACK configured by RRC signal have p1 entries.
  1) If b1<p1, intercept some entries of the dl-DataToUL-ACK or enable some entries of the dl-DataToUL-ACK. Wherein, the method of interception include: intercept (choose) the first part entries of the dl-DataToUL-ACK (e.g., first b1 entries) or the last part entries of the dl-DataToUL-ACK (e.g., last b1 entries). Wherein, the method of enable some entries include: enable first part entries of the dl-DataToUL-ACK or enable last part entries of the dl-DataToUL-ACK.
  2) If b1<p1, padding bit 0 or bit 1 before or after the bitmap sequence (information). Or repetition part of bitmap sequence. Wherein, the part of bitmap sequence is the first part bits or the last part bits of the bitmap sequence.
  3) If b1>p1, padding null entries before or after the dl-DataToUL-ACK. Or repetition some entries of the dl-DataToUL-ACK. Wherein, some entries is the first part or the last part of the dl-DataToUL-ACK.
  4) If b1>p1, intercept some bits of the bitmap information, or enable a part of bits of the bitmap information. Wherein, the method of interception includes: intercept the first part entries of the bitmap information (e.g., first b1 bits) or the last part entries of the bitmap information (e.g., last b1 bits). Wherein, the method of enable a part of bits include: enable the first part bits of the bitmap information or enable the last part bits of the bitmap information.

In some implementations, the gNB determines a value of k0\k2\aperiodic CSI-RS offset\aperiodic SRS offset\k1 based on received downlink control signalling. In some implementations, the gNB determines information of BWP indicator and/or information of carrier indicator. In some implementations, the gNB sends a downlink control information to a UE. In some implementations, the downlink control information indicates the determined value.

In some implementations, the BWP indicator includes information of which BWP is activated. In some implementations, the carrier indicator includes information of which carrier is scheduled. In some implementations, the downlink control indicates the determined value indicated by at least one of the following approaches:

Approach 1: All pdsch-TimeDomainAllocationList for a UE configured with a specific index by RRC, wherein the specific index includes a large value of k0 (e.g., 20), and the specific index is sent to UE by gNB.

Approach 2: All pusch-TimeDomainAllocationList for a UE configured with a specific index by RRC, wherein the specific index includes a large value of k2 (e.g., 20), and the specific index is sent to UE by gNB.

Approach 3: gNB send a value of k0 and\or k2\aperiodic CSI-RS offset\aperiodic SRS offset\k1value greater than the corresponding minimum values.

In some implementations, if a BWP indicator indicates that a next active BWP is not the same as the active BWP at present, at least one of k0, k2, aperiodic CSI-RS offset, aperiodic SRS offset, or k1 is greater than or equal to a max value of {BWP switching delay, minimum value}. In some implementations, a BWP switching delay is the time after the UE receives a BWP switching request at a serving cell and before receiving PDSCH or transmitting PUSCH on the new BWP.

In some implementations, if a carrier indicator indicates that the carrier which is scheduled is not the carrier of scheduling DCI, at least one of k0, k2, aperiodic CSI-RS offset, aperiodic SRS offset, or k1 is greater than or equal to a max value of {carrier switching delay, minimum value}. In some implementations, a carrier switching delay is the time after the UE receiving a DCI indicate cross carrier scheduling request and before receiving PDSCH or transmitting PUSCH on the new carrier.

In some implementations, a gNB send a downlink control signal to a UE. In some implementations, the downlink control signal indicates k0>0. In some implementations, the slot allocated for the PDSCH is $$\left\lfloor n \cdot \frac{2^{\mu_{PDSCH}}}{2^{\mu_{PDCCH}}} \right\rfloor + \alpha_3 K_0.$$

In some implementations, n is the slot with the scheduling DCI, and $K_0$ is based on the numerology of PDSCH, and $\mu_{PDSCH}$ and $\mu_{PDCCH}$ are the subcarrier spacing configurations for PDSCH and PDCCH, $\alpha_3$ is greater than 0 (e.g., $$\alpha_3 = \left\lfloor \frac{2^{\mu_{PDSCH}}}{2^{\mu_{PDCCH}}} \right\rfloor.$$

In some implementations, a specific BWP has one or more of the following characteristic:
1) A BWP with the minimum BWP index, or maximum BWP index, or no BWP index
2) A BWP with the narrowest bandwidth, or the smallest PRB
3) A initial or default BWP
4) A specific BWP is same with BWP for SPS DL scheduling, or the BWP for SPS DL scheduling after DL SPS (semi-persistent scheduling) scheduling is actived or before DL SPS scheduling is released.
5) A specific BWP is same with the BWP for transmitting UL grant Type2, or is the BWP for transmitting UL grant Type2 after UL grant Type2 transmitting activation or before UL grant Type2 transmitting is released.
6) The specific BWP is configured a CORESET/search space set include DCI candidate, wherein the DCI candidate at least include one of DCI format which include information of wake up or go to sleep. Or, the specific BWP is configured CORESET/search space set include DCI format which include field or codepoint for wake up or go to sleep.
7) The specific BWP is not configured with the first kind of DCI set, wherein the first kind of DCI set include at least one of: DCI format 0_0, DCI format 0_1, DCI format 1_0, DCI format 1_1, DCI format 2_0, DCI format 2_1, DCI format 2_2, DCI format 2_3.
8) The PDCCH monitoring occasion configured for specific BWP is the time before DRX on duration.
9) The PDCCH monitoring occasion configured for specific BWP is disabled in DRX Active time.
10) Bandwidth part indicator field in DCI format 0_1 or DCI format 1_1 or scheduling DCI is not include the indication of the specific BWP, or, the specific BWP cannot dynamic indicated by DCI, or, the specific BWP cannot dynamic indicated by scheduling DCI.
11) The specific BWP is configured with minimum value of maximum MIMO layer, or is configured with minimum value of maximum receive/transmit antenna, or is configured with minimum value of maximum antenna port.
12) The specific BWP is configured with maximum value of minimum k0 or minimum k1 or minimum k2 or minimum aperiodic CSI-RS offset or minimum SRS offset.
13) for the first subcarrier spacing set, the PDCCH monitoring occasion configured on a specific BWP can be any n symbols in a slot,n is a positive integer.
   a. The first subcarrier spacing set include at least one of: 15 KHz, 30 KHz, 60 KHz, 120 KHz, and 240 KHz.
   b. The candidate set of n includes positive integers greater than or equal to 3.
14) specific BWP can be dynamically indicated by power saving DCI
15) specific BWP includes at least one search space, wherein the search space is associate with multiple control resource sets (CORESET)
16) specific BWP contains at least one search space, wherein the search space is associate with multiple active TCI (transmission configuration information) states
17) DMRS port receiving PDCCH on specific BWP has quasi co-location (quasi co-location) with SSB.

In some implementations, a specific BWP is activated under the following conditions:
1) Indicate by network side
2) UE in power saving state or low power state
3) Associate with UE assistance information
4) in the predefined time nodes, wherein the predefined time nodes include at least one of the following:
   a. BWP inactivity timer ends or terminates or a period of time after BWP inactivity timer is suspend
   b. Some time after default/initial/index minimum BWP is activated
   c. some time before the beginning of the DRX on duration period or some time after into DRX off.
   d. In a wake up signal or wake up indication
      a) units of some time can be symbol, slot, or millisecond
      b) 0 is included for a period of time;
5) related to predefined signaling or indication, wherein predefined signaling or indication include at least one of the following:
   a. Go to sleep signaling or indication
   b. non-wake up signaling or indication.
   In some implementations, if UE receives a go to sleep signaling or instruction, or a non-wake up signaling or instruction, UE switch to a specific BWP;

In some implementations, there may be conflict between the specific BWP and other business, such as:
1) specific BWP is not expected to be activated after DL SPS (semi-persistent scheduling) has been activated or before DL SPS has been released;
2) if the BWP for DL SPS is configured differently from the first parameter set of the specific BWP, specific BWP is not expected to be activated after DL SPS activation or before DL SPS release;
3) specific BWP activation is not expected to be activated after UL grant Type 2 transmission has been activated or before UL grant Type 2 transmission has been released;
4) if UL grant Type 1 transmission is configured, specific BWP is not expected to be activated;
5) if the BWP where UL grant Type 2 transmission is located is configured differently from the first parameter set of specific BWP, the specific BWP is not expected to be activated after UL grant Type 2 transmission is activated or before UL grant Type 2 transmission is released;
6) if the BWP where UL grant Type 1 is transmitted is configured differently from the first parameter set of specific BWP, the specific BWP is not expected to be activated;
7) after specific BWP is activated, DL SPS (semi-persistent scheduling) is terminated, released or suspended;
8) if the BWP for DL SPS is different from the first parameter set configuration of specific BWP, the scheduling of DL SPS (semi-persistent scheduling) will be terminated, released or suspended within a time offset of the activation of specific BWP;
   a. The time offset value can be positive or negative. That is, a DL SPS (semi-persistent scheduling) is terminated, released, or suspended before or after the activation of a specific BWP;
9) after specific BWP is activated, UL grant Type 1/2 transmission is terminated or released or suspended;
10) if the BWP where UL grant Type 1/2 transmission is located is different from the first parameter set configuration of specific BWP, the UL grant Type 1/2 transmission is terminated, released or suspended within a time offset of the activation of specific BWP;

a. The time offset value can be positive or negative, that is, before or after the activation of a particular BWP, the UL grant Type 1/2 transmission is terminated, released, or suspended
11) after DL SPS (semi-persistent scheduling) has been activated or before DL SPS scheduling has been released, gNB sends a new DL SPS scheduling activation signaling to schedule DL SPS on a specific BWP.
12) after UL grant Type 2 transmission is activated, or before UL grant Type 2 transmission is released, the gNB sends a new UL grant Type 2 transmission activation signal and transmits UL grant Type 2 on a specific BWP.

In some implementations, the specific CORESET has one of the following characteristics:
1) the candidate set of DCI in the search space associated with specific CORESET contains at least one DCI format including wake up or go to sleep information; Or, a specific CORESET associated search space that includes the DCI format that contains the wake up or go to sleep bit fields or codepoints.
2) the search space associated with specific CORESET cannot be configured with the first DCI set, where the first DCI set includes at least one of the following: DCI format 0_0, DCI format 0_1, DCI format 1_0, DCI format 1_1, DCI format 2_0, DCI format 2_1, DCI format 2_2, DCI format 2_3.
3) PDCCH monitoring time or search space valid time associated with specific CORESET is
   a. some time after BWP inactivity timer expire or terminate or suspend
   b. some time after the Default/initial/minimum index BWP is activated
   c. some time before the beginning of the DRX on duration or some time after the beginning of DRX off period
   d. receipt a go to sleep signal or instruction, or a non-wake up signal or instruction
      a) units of some time is one of: symbol, slot, or millisecond
      b) 0 is included for a period of time;
4) PDCCH monitoring occasion defined in search space which associated with specific CORESET is disabled during DRX Active Time;
5) the maximum number of MIMO layers configured on the BWP with specific CORESET is the minimum, or the maximum number of receiving/sending antennas is the minimum, or the maximum number of antenna ports is the minimum;
6) the minimum k0, or minimum k1, or minimum k2, or minimum aperiodic CSI-RS offset or minimum aperiodic SRS offset configured on BWP with specific CORESET is maximum;
7) PDCCH monitoring occasion defined in search space which associated with specific CORESET can be any n symbols in a slot,n is a positive integers.
   a. The first subcarrier spacing set includes at least one of 15 KHz, 30 KHz, 60 KHz, 120 KHz, and 240 KHz.
   b. The candidate set of n includes positive integers greater than or equal to 3.
8) specific CORESET is associate with multiple activated TCI (transmission configuration information) states
9) for specific CORESET, DMRS port receiving PDCCH has quasi co-location with SSB.

In some implementations, a CORESET contains two sets of TCI states, among which, two types of TCI states are related to at least one of the following factors:
1) State of DRX. The DRX state includes: DRX activation period, DRX dormant period. For example, in the DRX dormant period, UE may assume that the quasi co-location relationship of the DMRS port receiving PDCCH is related to the configuration information in the first TCI state set or part of the first TCI state set; During DRX activation, UE may assume that the quasi co-location relationship of the DMRS port receiving PDCCH is related to the configuration information in the second TCI state set or part of the TCI state set in the second TCI state set. For example, in the DRX dormant period, some TCI states in the first TCI state set or the first TCI state set can be activated; During DRX activation, the second TCI state set or part of the second TCI state set can be activated.
2) DCI signaling. Among them, DCI signaling can include go to sleep signaling, or wake up signaling, or non-go to sleep signaling, or non-wake up signaling. For example, after receiving a go to sleep or non-wake up signal or information, UE may assume that the quasi co-location relationship of the DMRS port receiving PDCCH is related to the configuration information in the first TCI state set or part of the first TCI state set; After receiving wake up or non-go to sleep signaling or information, UE may assume that the quasi co-location relationship of the DMRS port receiving PDCCH is related to the configuration information in the second TCI state set or part of the second TCI state set.
3) DCI format. For example, for the DCI format set of the first type, UE can assume that the quasi co-location relationship of the DMRS port receiving PDCCH is related to the configuration information in the first TCI state set or part of the TCI state set. For the second type of DCI format set, UE may assume that the quasi co-location relationship of the DMRS port receiving PDCCH is related to the configuration information in the second TCI state set or part of the TCI state set in the second TCI state set. The DCI format set of type 1 and type 2 can contain the same DCI format.
4) RNTI type. For example, for the first type of RNTI, UE can assume that the quasi co-location relationship of the DMRS port receiving PDCCH is related to the configuration information in the first TCI state set or part of the first TCI state set. For the second type of RNTI, UE can assume that the quasi co-location relationship of the DMRS port receiving PDCCH is related to the configuration information in the second TCI state set or part of the TCI state set. The type of RNTI in the first category and the type of RNTI in the second category can contain the same type of RNTI.
5) Predefined time node or predefined time range. For example, some time before DRX on duration, UE may assume that the quasi co-location relationship of the DMRS port receiving PDCCH is related to the configuration information in the first TCI state set or part of the first TCI state set. Otherwise, UE may assume that the quasi co-location relationship of the DMRS port receiving PDCCH is related to the configuration information in the second TCI state set or part of the second TCI state set. For example, some time before DRX on duration, the first TCI state set or part of the first TCI state set can be activated; Otherwise, the second TCI state set or part of the second TCI state set can be activated.

While various embodiments of the present solution have been described above, it should be understood that they have been presented by way of example only, and not by way of limitation. Likewise, the various diagrams may depict an example architectural or configuration, which are provided to enable persons of ordinary skill in the art to understand example features and functions of the present solution. Such persons would understand, however, that the solution is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described illustrative embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software module"), or any combination of these techniques. To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device.

A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the present solution.

Additionally, memory or other storage, as well as communication components, may be employed in embodiments of the present solution. It will be appreciated that, for clarity purposes, the above description has described embodiments of the present solution with reference to different functional units and processors. However, it will be apparent that any suitable distribution of functionality between different functional units, processing logic elements or domains may be used without detracting from the present solution. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the implementations described in this disclosure will be readily apparent to those skilled in the art, and the general principles defined herein can be applied to other implementations without departing from the scope of this disclosure. Thus, the disclosure is not intended to be limited to the implementations shown herein, but is to be accorded the widest scope consistent with the novel features and principles disclosed herein, as recited in the claims below.

What is claimed is:

1. A method, comprising:
   generating, by a wireless network device, a first type control signal, wherein the first type control signal carries a first set of indication information, the first set of indication information including a bandwidth part (BWP) indicator, a carrier indicator, a time domain resource scheduling indicator, and a transmission configuration indication (TCI) indicator;

generating, by the wireless network device, a second type control signal, wherein the second type control signal carries a second set of indication information, the second set of indication information including a wake-up indicator for indicating a wake-up state or a not wake-up state, wherein the second set of indication information corresponds to the bandwidth part BWP indicator and a secondary cell (SCell) operation indicator; and transmitting, by the wireless network device, the first type control signal to at least one wireless user device within an active time period; and transmitting, by the wireless network device, the second type control signal to the at least one wireless user device within an inactive time period.

2. The method of claim 1, wherein the first type control signal is transmitted to a single wireless user device and the second type control signal is transmitted to a group of wireless user devices.

3. The method of claim 1, wherein the first type control signal is associated with a first type of radio network temporary identifier (RNTI) and comprises a field that enables an indication; and the second type control signal is associated with a second type of RNTI.

4. A method, comprising:
receiving, by a wireless user device, from a wireless network device, a first type control signal within an active time period;
receiving, by the wireless user device, from the wireless network device, a second type control signal within an inactive time period,
wherein the first type control signal carries a first set of indication information, the first set of indication information including a bandwidth part (BWP) indicator, a carrier indicator, a time domain resource scheduling indicator, and a transmission configuration indication (TCI) indicator,
wherein the second type control signal carries a second set of indication information, the second set of indication information including a wake-up indicator for indicating a wake-up state or a not wake-up state,
wherein the second set of indication information corresponds to the bandwidth part BWP indicator and a secondary cell (SCell) operation indicator.

5. The method of claim 4, wherein the first type control signal is transmitted to a single wireless user device and the second type control signal is transmitted to a group of wireless user devices.

6. The method of claim 4, wherein the first type control signal is associated with a first type of radio network temporary identifier (RNTI) and comprises a field that enables an indication; and the second type control signal is associated with a second type of RNTI.

7. The method of claim 4, wherein upon not receiving the second type control signal on a predefined resource set, performing, by the wireless user device, a wake-up operation.

8. A wireless network device, comprising:
at least one processor, configured to generate a first type control signal, wherein the first type control signal carries a first set of indication information, the first set of indication information including a bandwidth part (BWP) indicator, a carrier indicator, a time domain resource scheduling indicator, and a transmission configuration indication (TCI) indicator;
generate a second type control signal, wherein the second type control signal carries a second set of indication information, the second set of indication information including a wake-up indicator for indicating a wake-up state or a not wake-up state, wherein the second set of indication information corresponds to the bandwidth part BWP indicator and a secondary cell (SCell) operation indicator; and
a transmitter, configured to transmit the first type control signal to at least one wireless user device within an active time period;
transmit the second type control signal to the at least one wireless user device within an inactive time period.

9. The wireless network device of claim 8, wherein the first type control signal is transmitted to a single wireless user device and the second type control signal is transmitted to a group of wireless user devices.

10. The wireless network device of claim 8, wherein the first type control signal is associated with a first type of radio network temporary identifier (RNTI) and comprises a field that enables an indication; and the second type control signal is associated with a second type of RNTI.

11. A wireless user device, comprising:
a receiver, configured to receive from a wireless network device, a first type control signal within an active time period, and a second type control signal within an inactive time period,
wherein the first type control signal carries a first set of indication information, the first set of indication information including a bandwidth part (BWP) indicator, a carrier indicator, a time domain resource scheduling indicator, and a transmission configuration indication (TCI) indicator,
wherein the second type control signal carries a second set of indication information, the second set of indication information including a wake-up indicator for indicating a wake-up state or a not wake-up state,
wherein the second set of indication information corresponds to the bandwidth part BWP indicator and a secondary cell (SCell) operation indicator.

12. The wireless user device of claim 11, wherein the first type control signal is transmitted to a single wireless user device and the second type control signal is transmitted to a group of wireless user devices.

13. The wireless user device of claim 11, wherein the first type control signal is associated with a first type of radio network temporary identifier (RNTI) and comprises a field that enables an indication; and the second type control signal is associated with a second type of RNTI.

14. The wireless user device of claim 11, wherein upon not receiving the second type control on a predefined resource set, performing, by the wireless user device, a wake-up operation.

* * * * *